(12) United States Patent
Chao et al.

(10) Patent No.: US 12,447,004 B2
(45) Date of Patent: Oct. 21, 2025

(54) SURGICAL FASTENER ASSEMBLIES AND METHODS

(71) Applicant: Arthrosurface, Inc., Franklin, MA (US)

(72) Inventors: Nam Chao, Bedford, MA (US); Steven W. Ek, Bolton, MA (US); Chris Baker, Boston, MA (US); Tim Brightman, Franklin, MA (US); Dan LeDuc, Franklin, MA (US)

(73) Assignee: Arthrosurface, Inc., Franklin, MA (US)

( * ) Notice: Subject to any disclaimer, the term of this patent is extended or adjusted under 35 U.S.C. 154(b) by 632 days.

(21) Appl. No.: 17/663,651

(22) Filed: May 16, 2022

(65) Prior Publication Data

US 2022/0362005 A1 Nov. 17, 2022

Related U.S. Application Data

(60) Provisional application No. 63/189,400, filed on May 17, 2021.

(51) Int. Cl.
*A61F 2/08* (2006.01)

(52) U.S. Cl.
CPC .......... *A61F 2/0811* (2013.01); *A61F 2/0805* (2013.01); *A61F 2002/0841* (2013.01);
(Continued)

(58) Field of Classification Search
CPC ........ A61F 2/08; A61F 2/0811; A61F 2/0805; A61B 17/84; A61B 17/846; A61B 17/06; A61B 17/068; A61B 17/064
See application file for complete search history.

(56) References Cited

U.S. PATENT DOCUMENTS 6,074,395 A * 6/2000 Trott .................... A61B 17/068
606/139
8,894,669 B2 * 11/2014 Nering .................. A61B 17/10
606/151

(Continued)

FOREIGN PATENT DOCUMENTS

EP 2437670 B1 4/2012
EP 3215025 B1 12/2020
(Continued)

*Primary Examiner* — Christopher J Beccia
(74) *Attorney, Agent, or Firm* — GOODWIN PROCTER LLP

(57) ABSTRACT

This disclosure includes fasteners for coupling an implant to tissue (e.g., soft-tissue and/or bone), fabric-like implants, and assemblies with fasteners pre-loaded with implants. The present implants generally comprise at least one flexible, fibrous layer that is substantially planar in a flattened state. In some embodiments of the present assemblies for delivery of a fastener, the assembly comprises fastener cartridge, a fibrous implant wrapped around a portion of the cartridge, a fastener extending through the implant, and an elongated shield disposed around the implant and the cartridge such that the implant is retained between the cartridge and the shield. Kits comprise a plurality of fasteners pre-loaded with implants. Some of the present kits also include one or more of the present fastener-delivery apparatuses or tools; for example, a plurality of pre-loaded fasteners with a single, reloadable tool; a plurality of tools each pre-loaded with a fastener that is pre-loaded with an implant; and/or a plurality of cartridges each pre-loaded with a fastener that is pre-loaded with an implant, and a common tool for use with the cartridges.

20 Claims, 36 Drawing Sheets

(52) U.S. Cl.
CPC ............. *A61F 2002/0858* (2013.01); *A61F 2002/0888* (2013.01); *A61F 2220/0016* (2013.01)

(56) References Cited

U.S. PATENT DOCUMENTS

| | | |
|---|---|---|
| 9,033,201 B2 | 5/2015 | Euteneuer |
| 9,113,977 B2 | 8/2015 | Euteneuer et al. |
| 9,198,750 B2 | 12/2015 | Kampen et al. |
| 9,314,331 B2 | 4/2016 | Euteneuer et al. |
| 9,370,356 B2 * | 6/2016 | Euteneuer ............. A61F 2/0811 |
| 9,414,841 B2 | 8/2016 | Euteneuer et al. |
| 9,566,063 B2 | 2/2017 | Euteneuer et al. |
| 9,855,037 B2 | 1/2018 | Euteneuer et al. |
| 9,993,247 B2 | 6/2018 | Euteneuer et al. |
| 10,105,211 B2 | 10/2018 | Euteneuer et al. |
| 10,123,796 B2 | 11/2018 | Westling et al. |
| 10,195,016 B2 | 2/2019 | Euteneuer et al. |
| 10,413,397 B2 | 9/2019 | Euteneuer et al. |
| 10,675,019 B2 | 6/2020 | Westling et al. |
| 11,051,932 B2 | 7/2021 | Euteneuer et al. |
| 11,116,623 B2 | 9/2021 | Euteneuer et al. |
| 11,298,123 B2 * | 4/2022 | Desai ................ A61B 17/0493 |
| 11,413,133 B2 | 8/2022 | Euteneuer et al. |
| 11,696,751 B2 | 7/2023 | Nguyen et al. |
| 2021/0052366 A1 | 2/2021 | Zenz-Olson et al. |
| 2021/0093443 A1 | 4/2021 | Van Kampen et al. |
| 2022/0273419 A1 | 9/2022 | Zenz-Olson |
| 2022/0338974 A1 | 10/2022 | Euteneuer et al. |
| 2022/0370066 A1 | 11/2022 | Westling et al. |
| 2022/0401627 A1 | 12/2022 | Barnes et al. |

FOREIGN PATENT DOCUMENTS

| | | |
|---|---|---|
| EP | 3397175 B1 | 11/2021 |
| WO | 2021183778 A1 | 9/2021 |
| WO | 2022132634 A1 | 6/2022 |

* cited by examiner

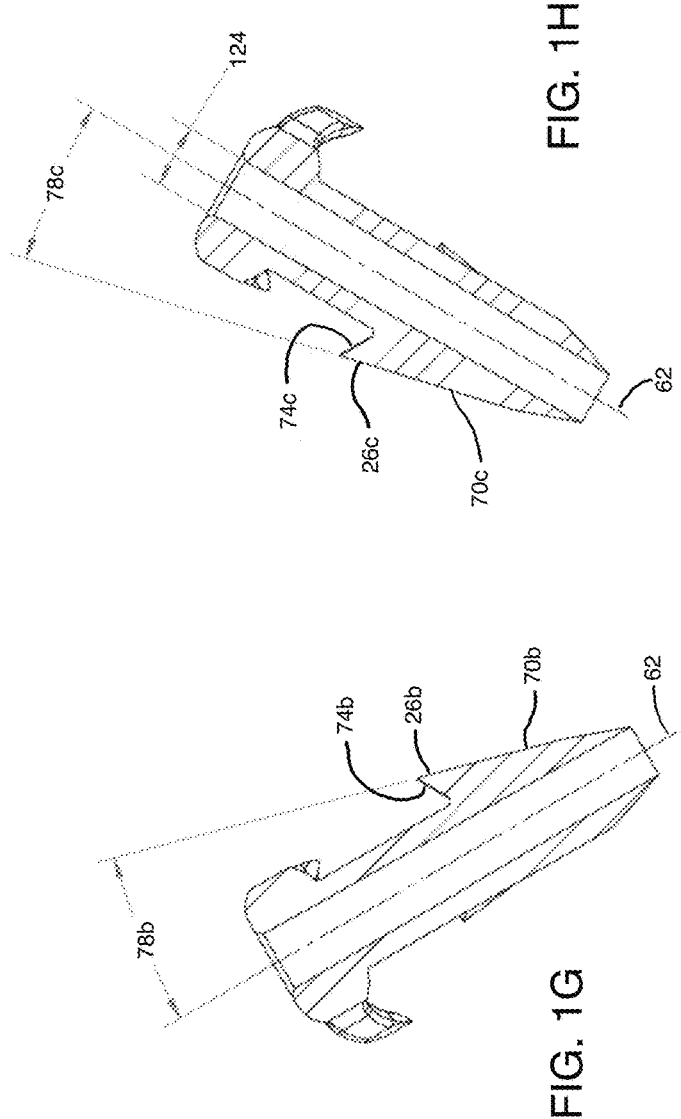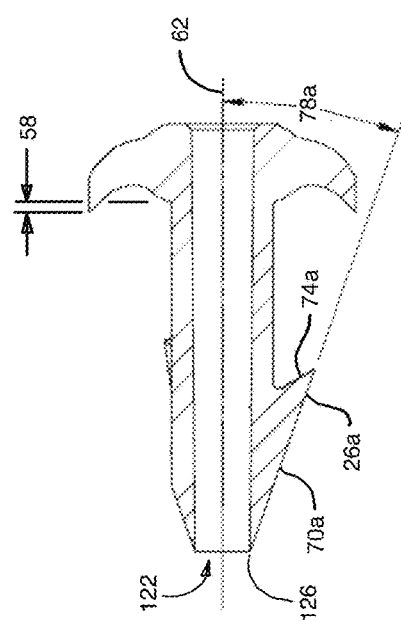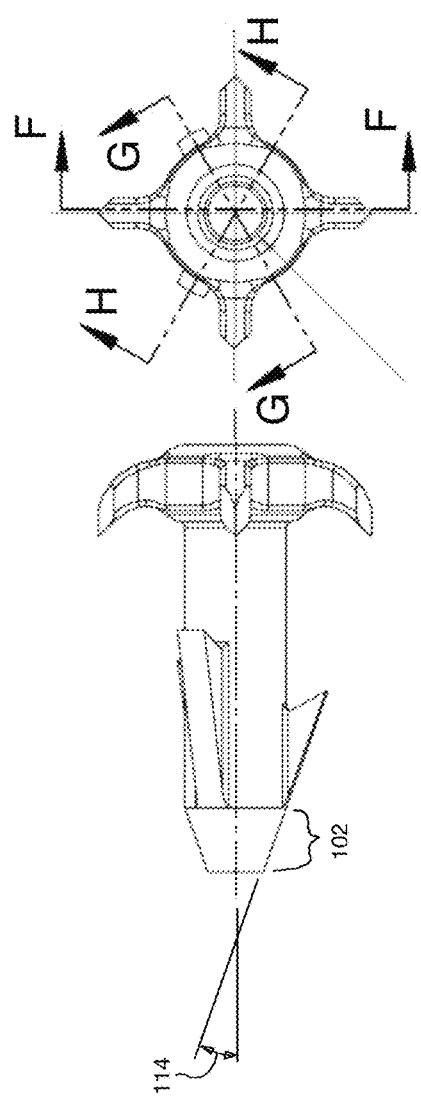

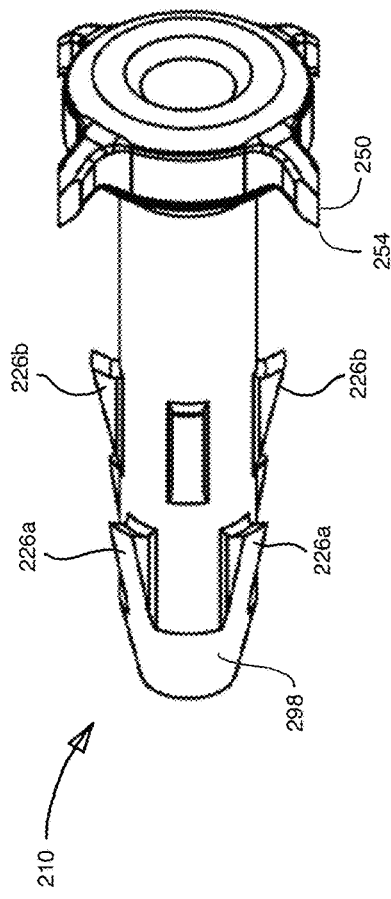
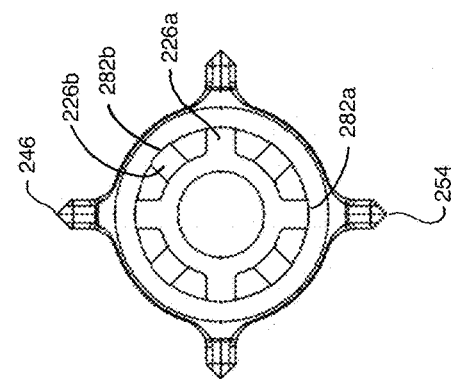
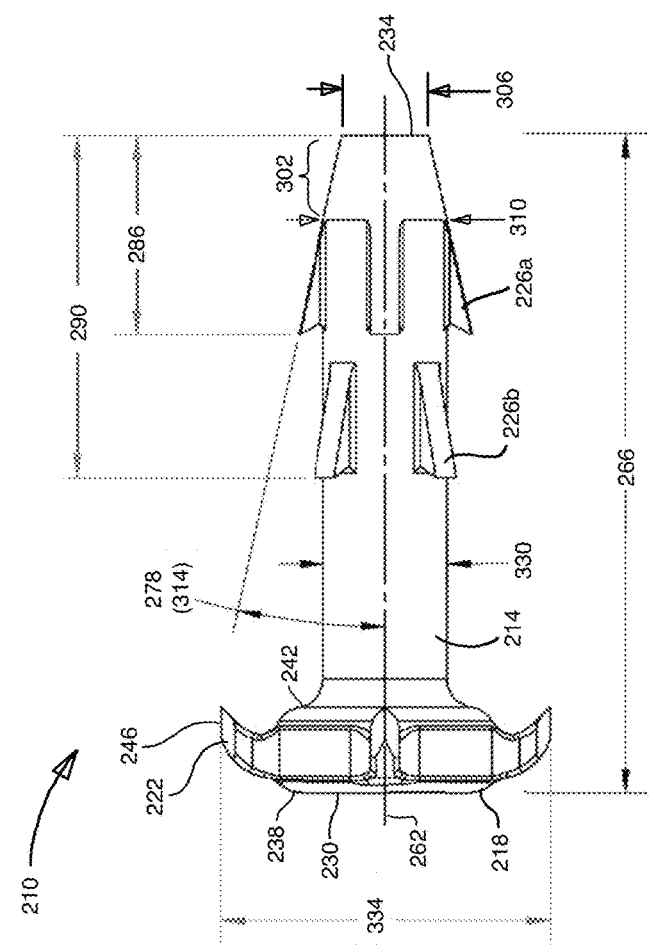
FIG. 2A
FIG. 2B
FIG. 2C

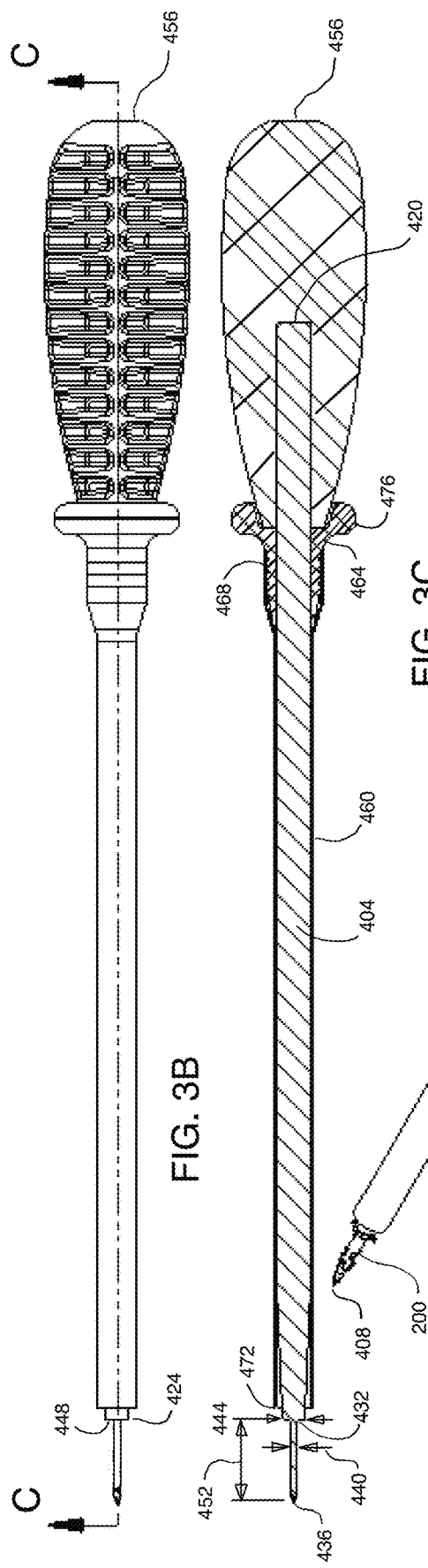
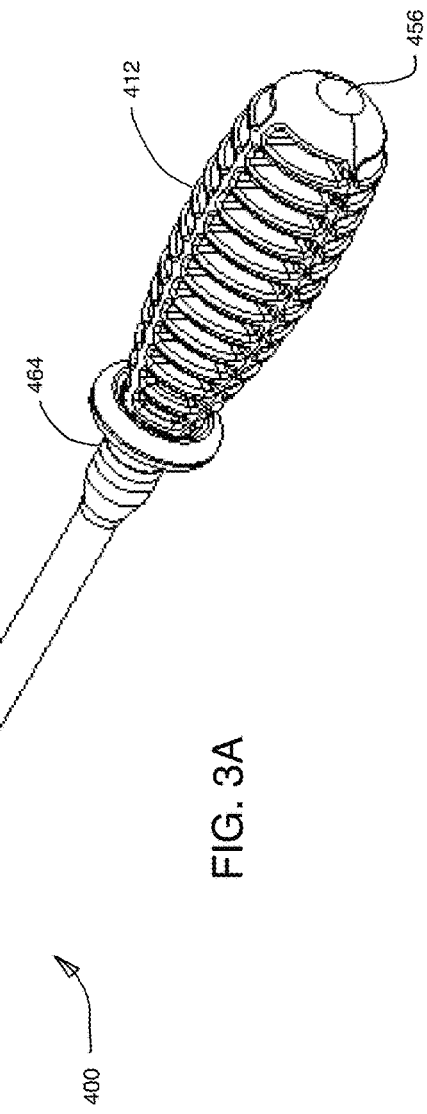
FIG. 3B
FIG. 3C
FIG. 3A

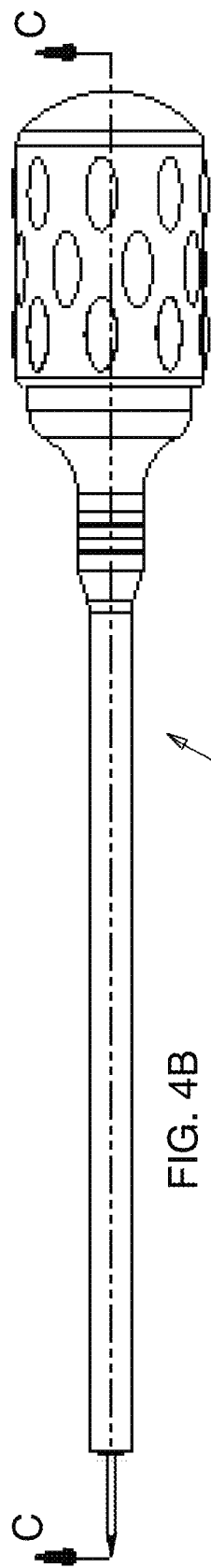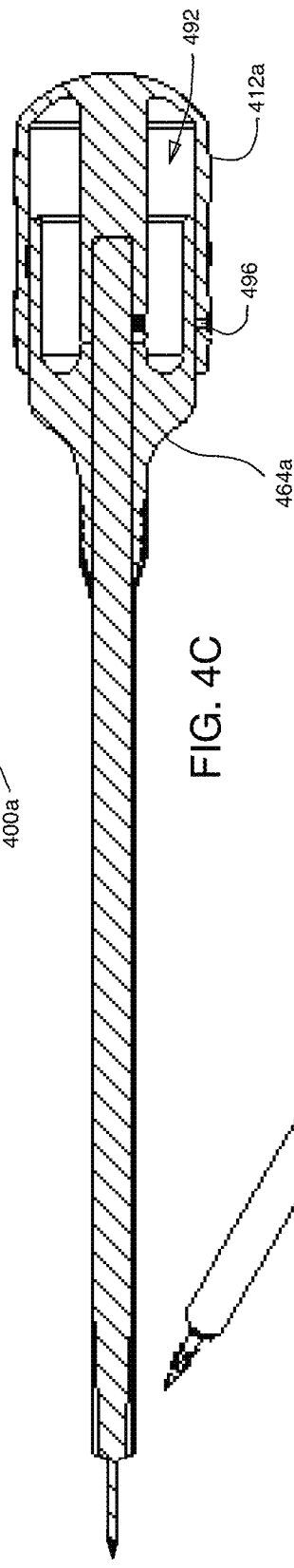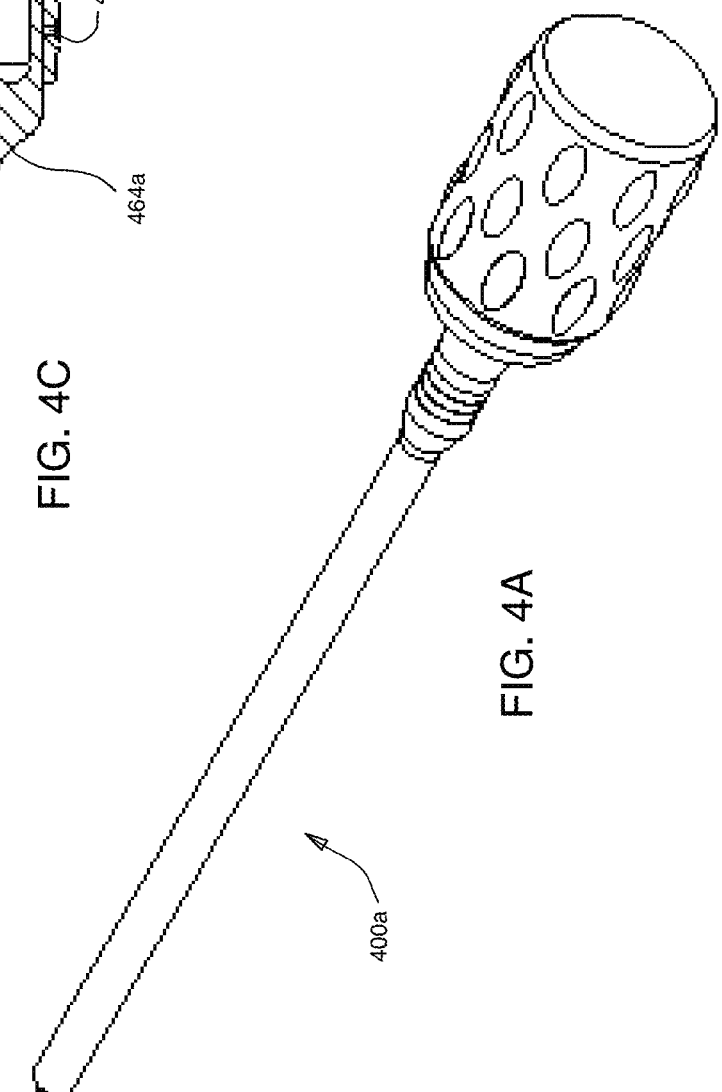

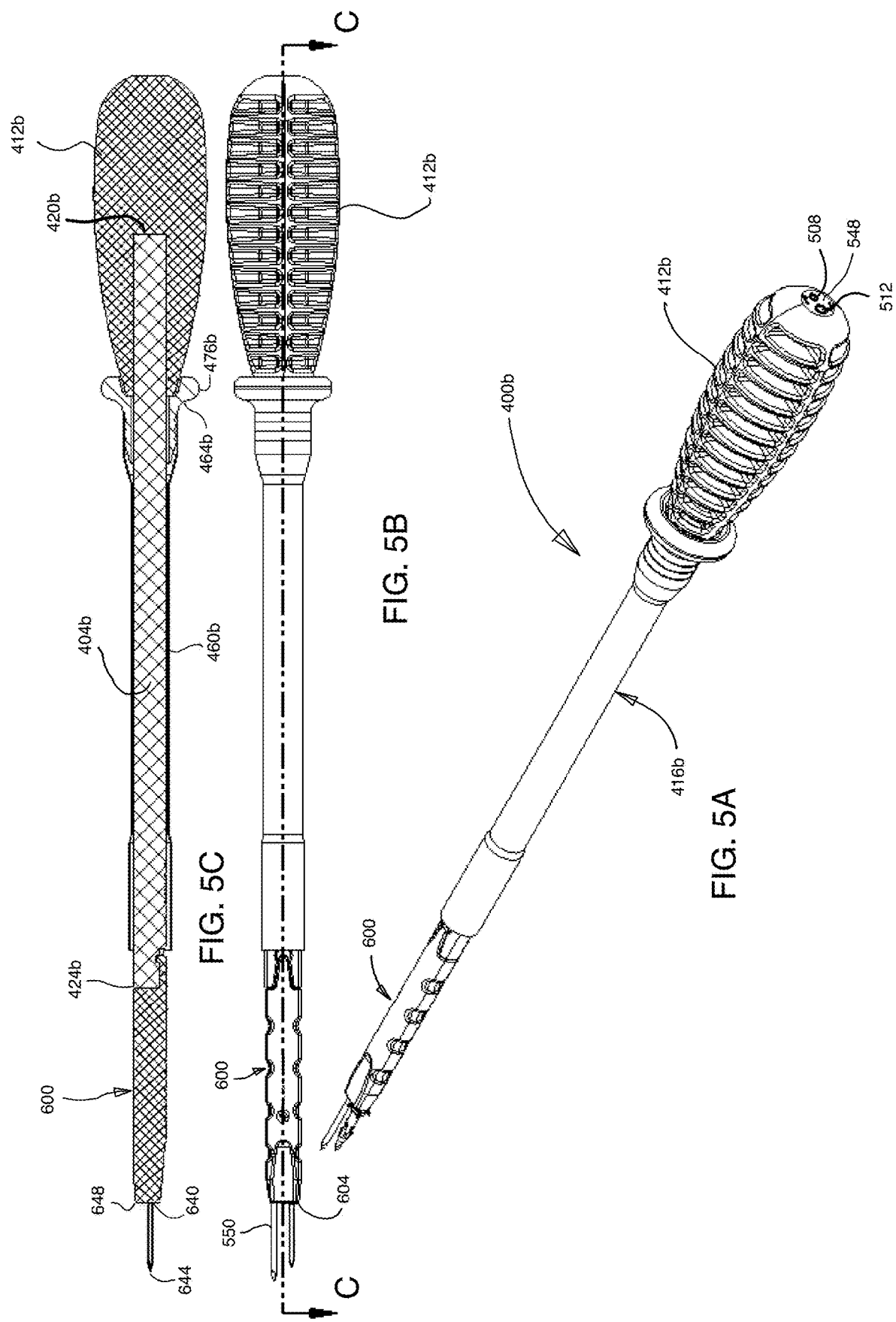

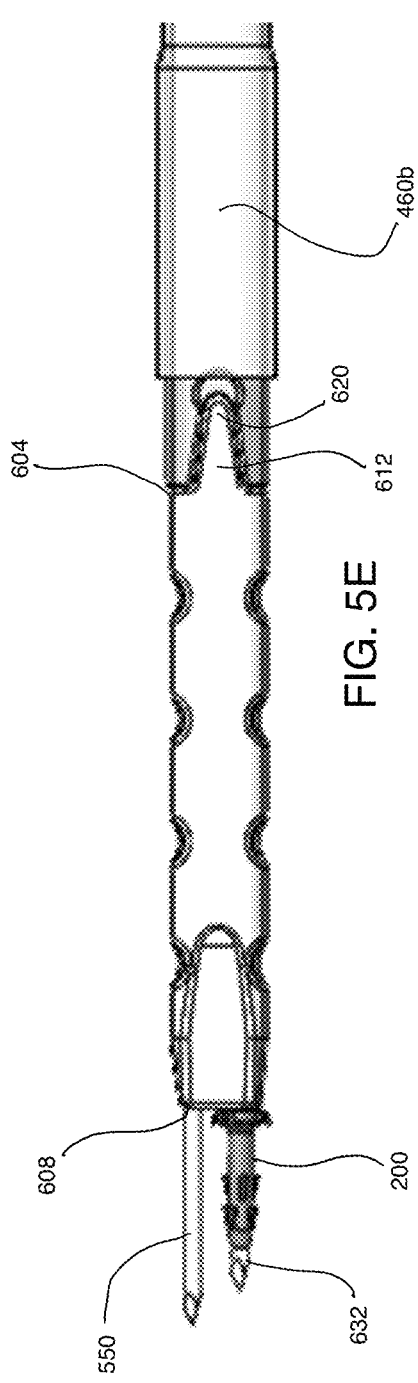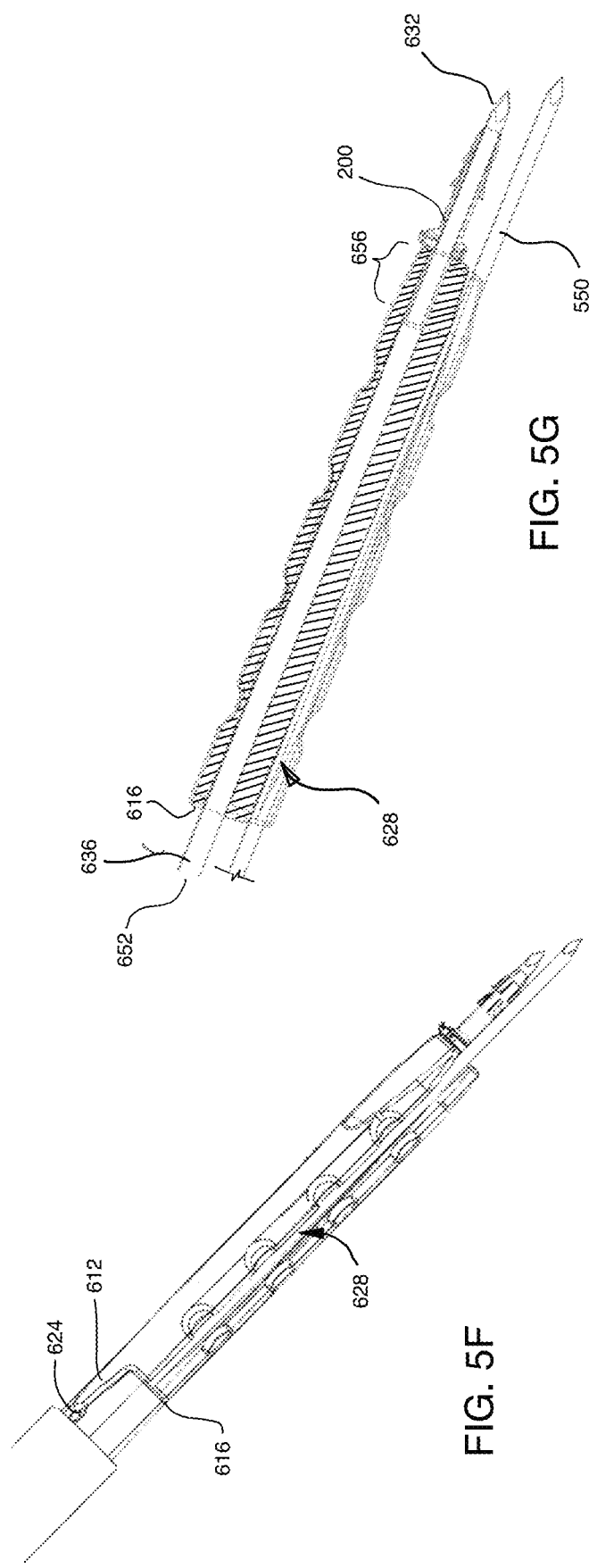
FIG. 5E
FIG. 5F
FIG. 5G

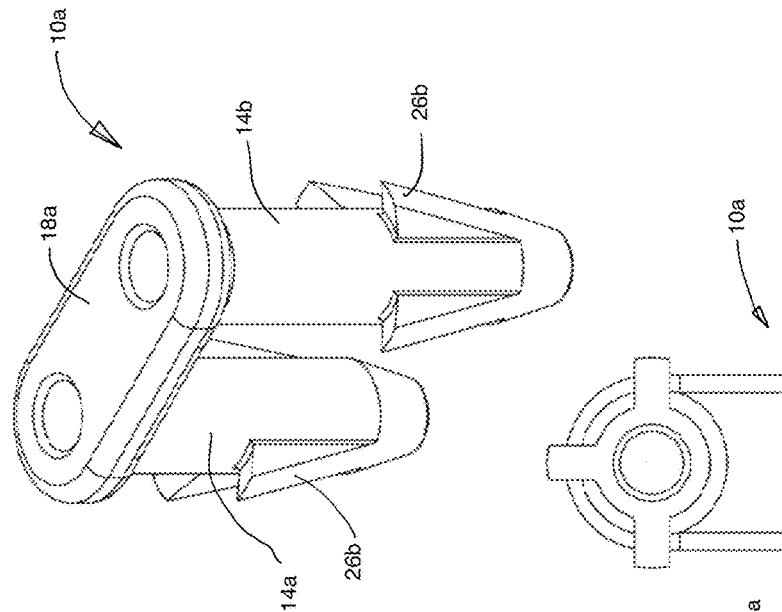
FIG. 6A
FIG. 6C
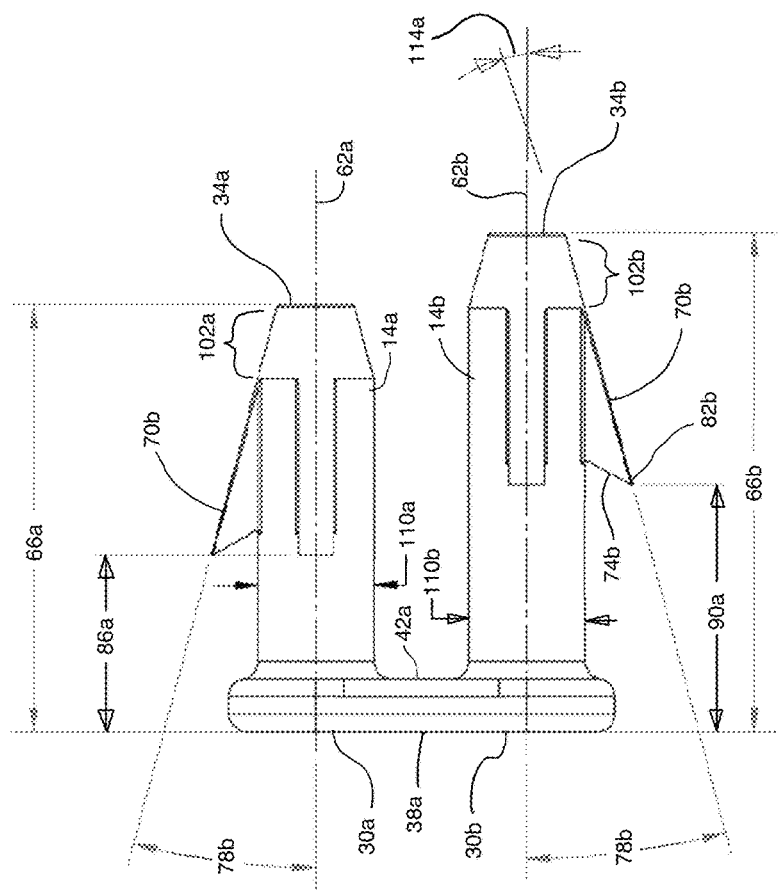
FIG. 6B

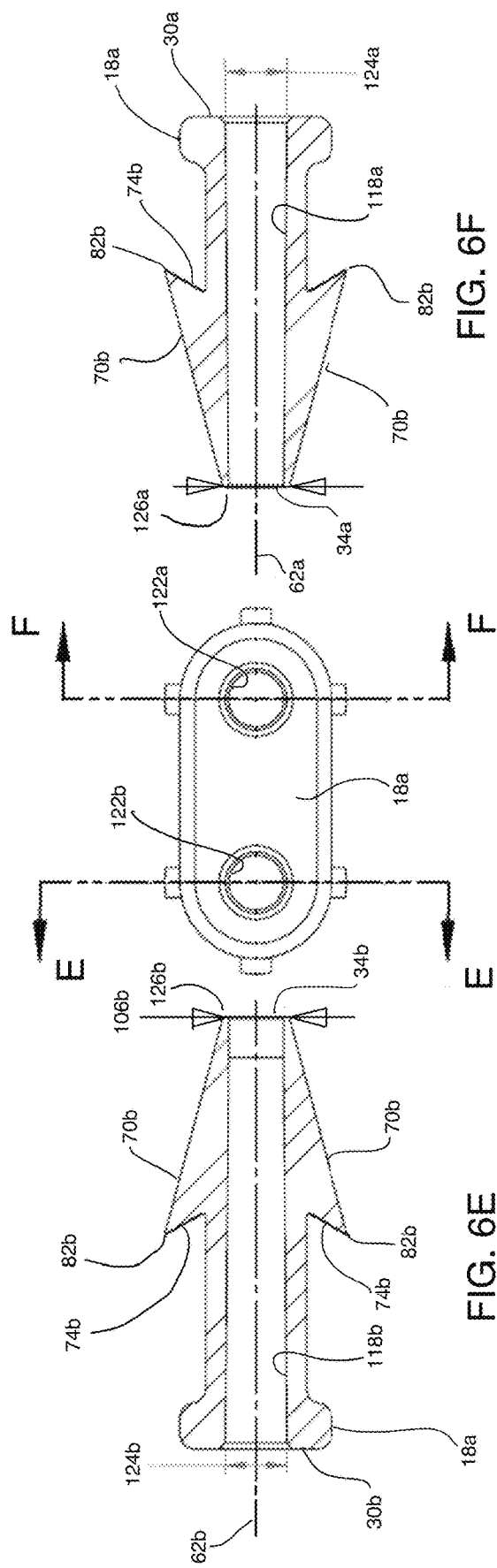

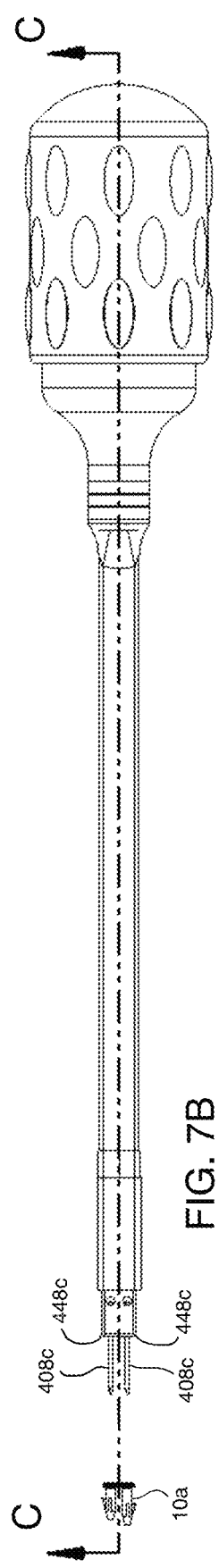
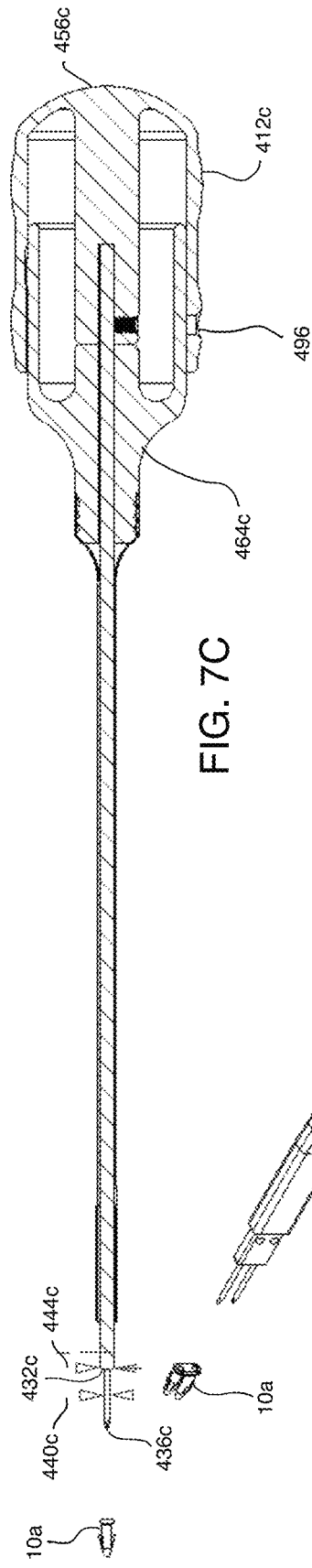
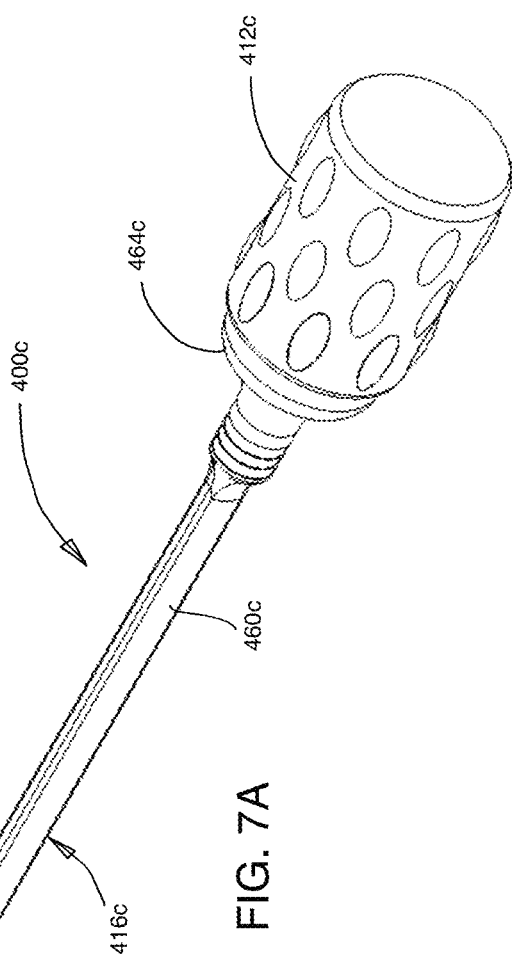
FIG. 7B
FIG. 7C
FIG. 7A

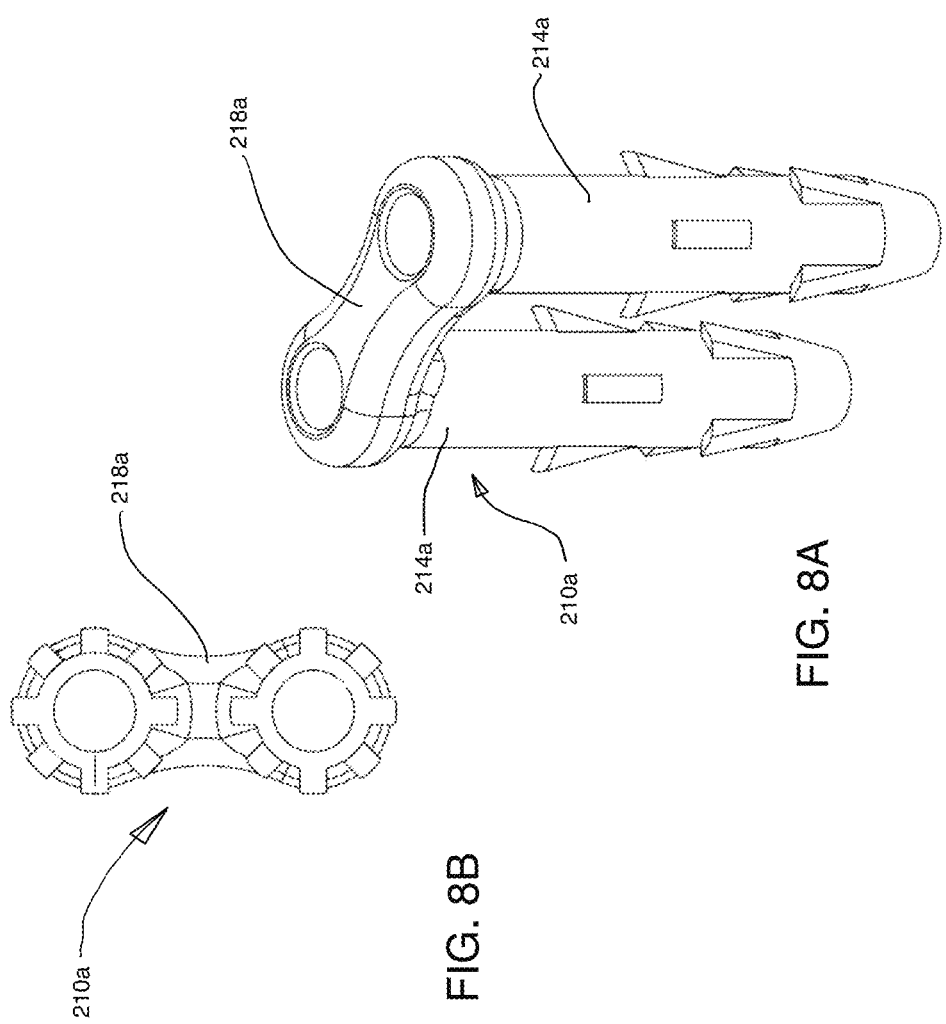

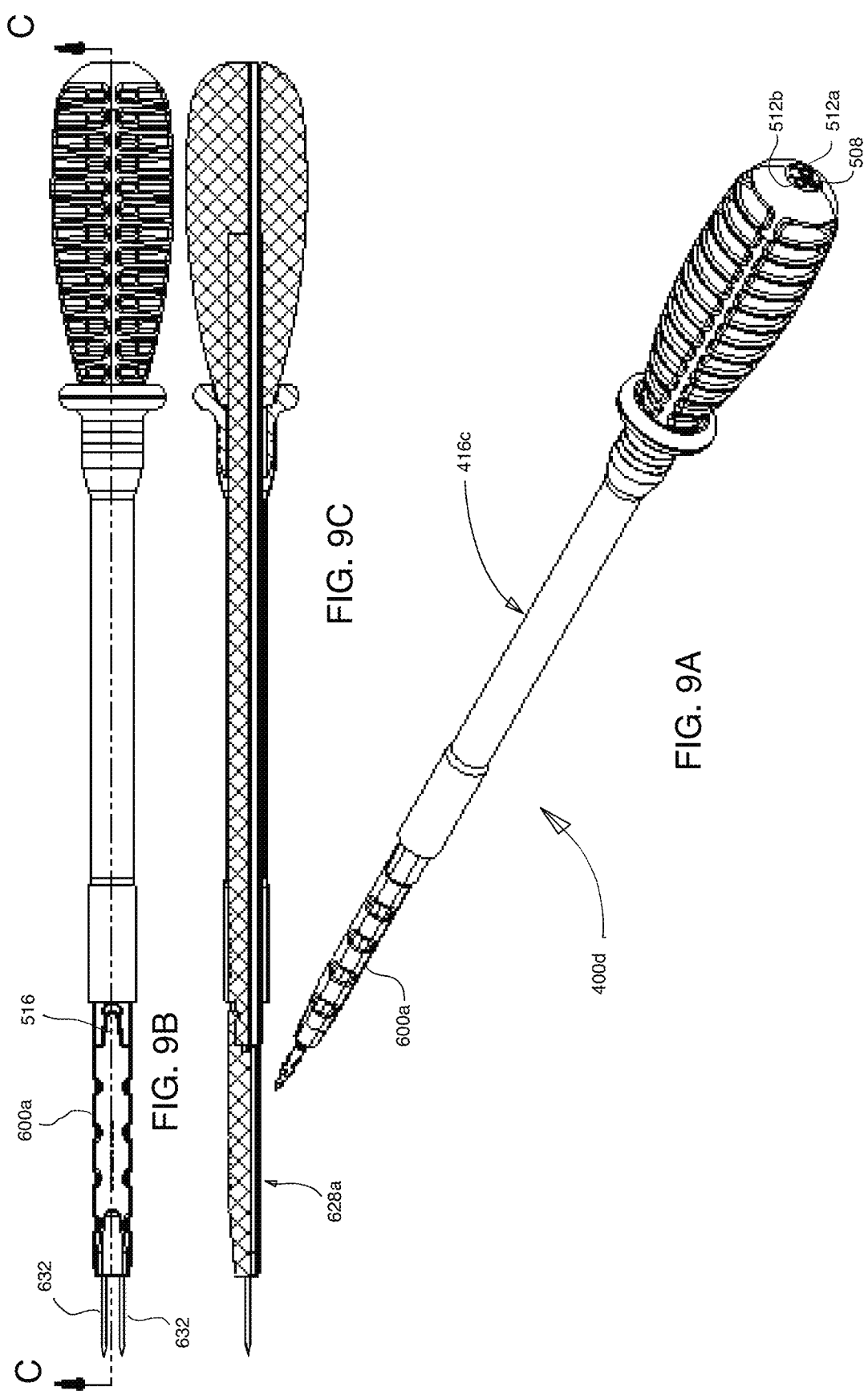

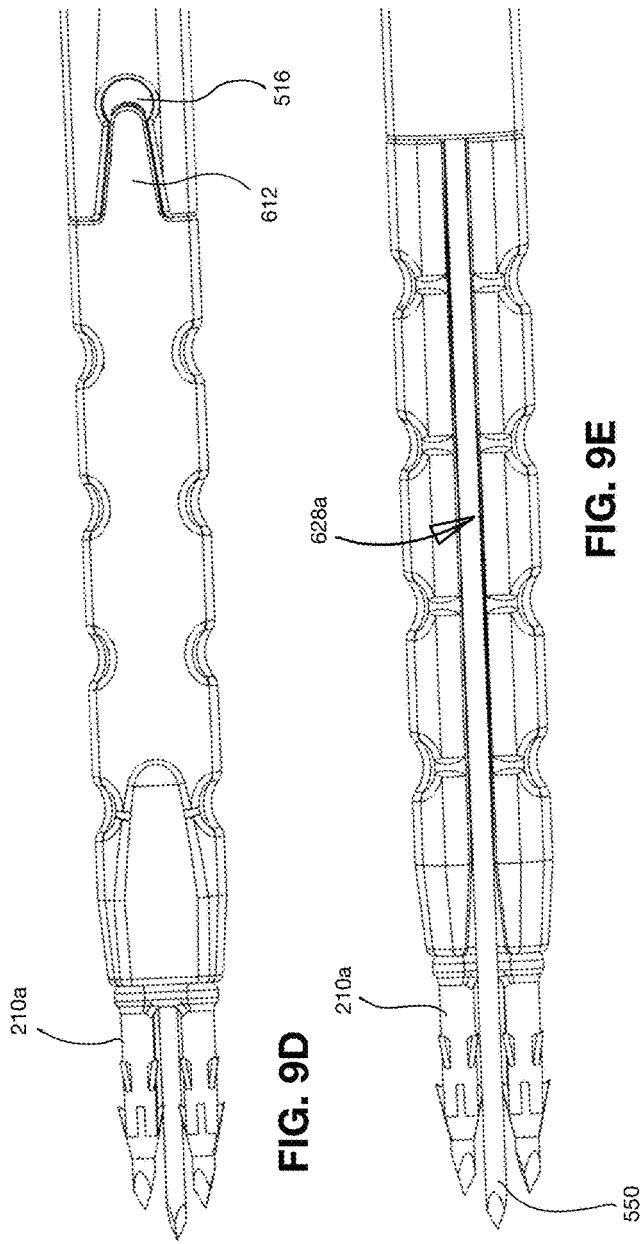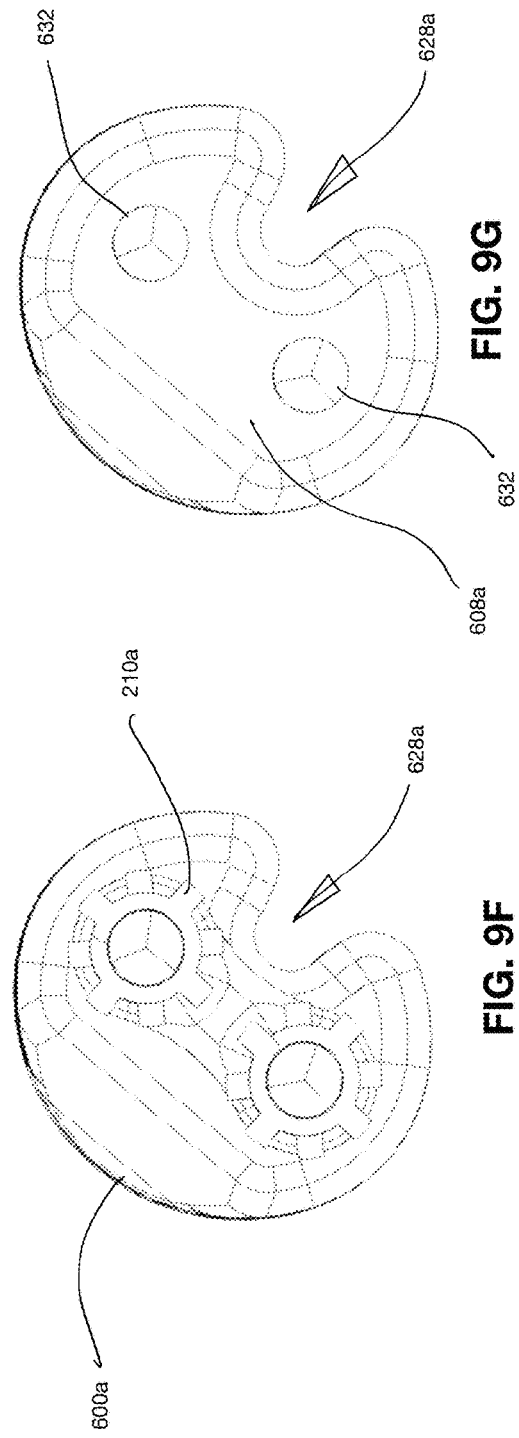
FIG. 9D  FIG. 9E  FIG. 9F  FIG. 9G

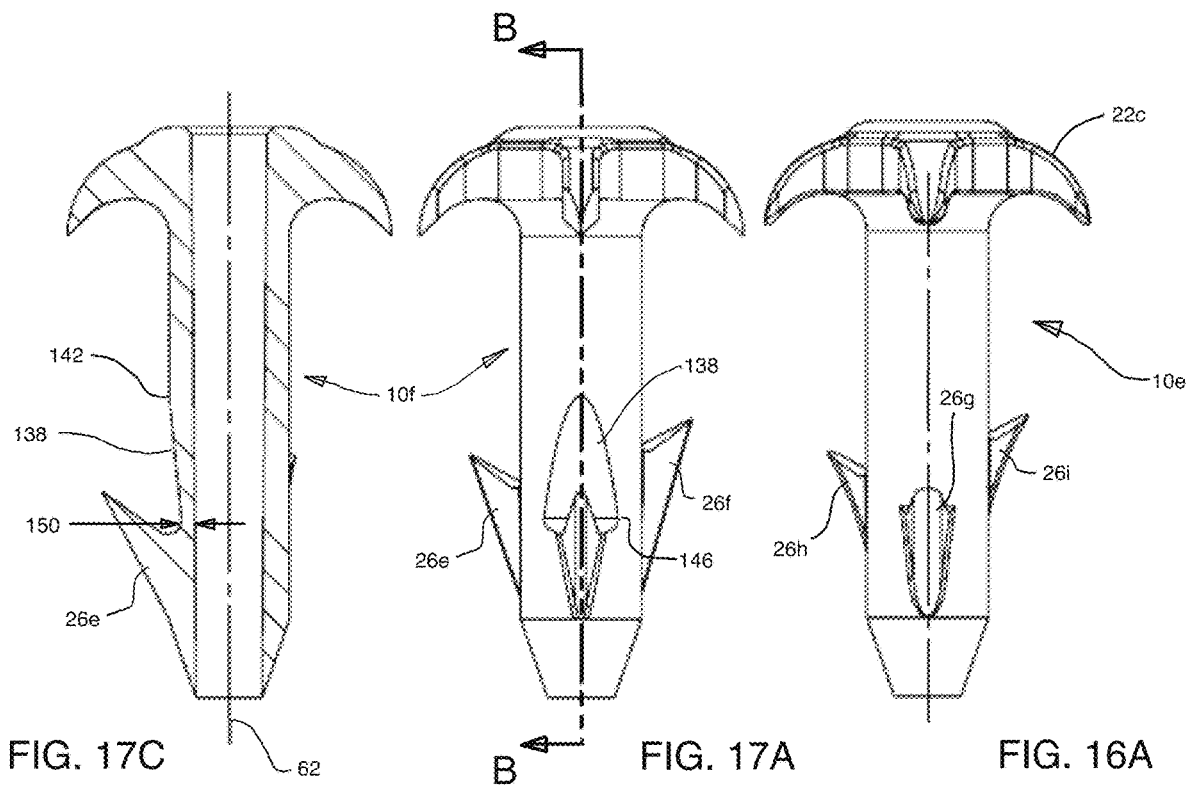
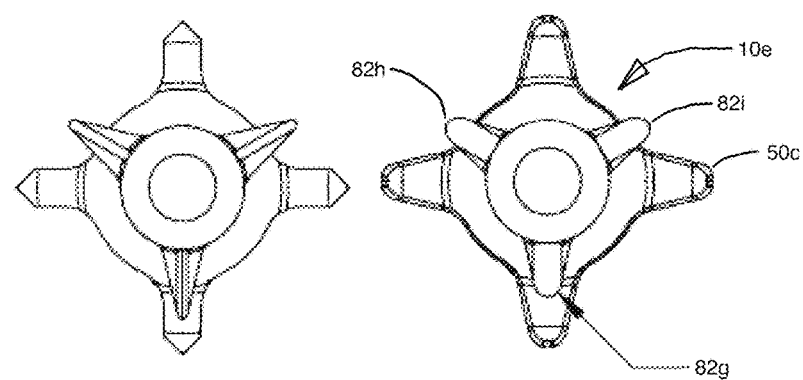
FIG. 17C FIG. 17A FIG. 16A
FIG. 17B FIG. 16B

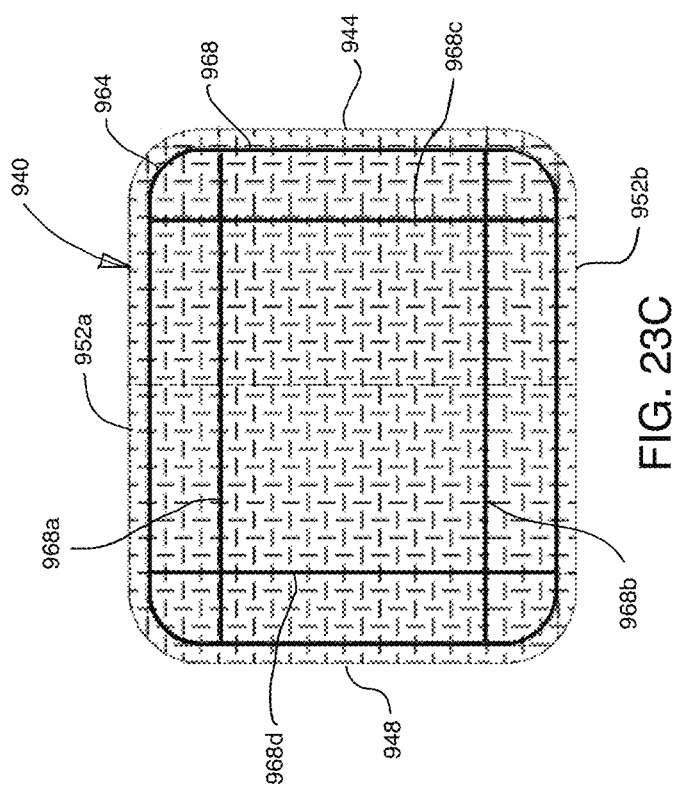
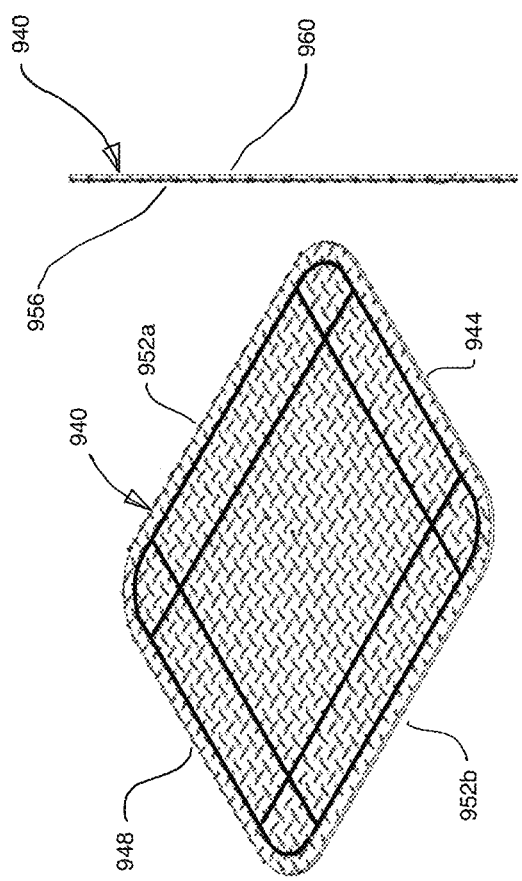
FIG. 23A
FIG. 23B
FIG. 23C

SURGICAL FASTENER ASSEMBLIES AND METHODS

CROSS-REFERENCE TO RELATED APPLICATION

This application claims the benefit of priority to U.S. Provisional Patent Application Ser. No. 63/189,400, filed May 17, 2021, hereby incorporated by reference in its entirety.

FIELD OF INVENTION

The present invention relates generally to surgical fasteners, more particularly, but not by way of limitation, to fasteners, tools, and methods for surgical repair of anatomical structures, such as tendons (e.g., the supraspinatus tendon, commonly known as the rotator cuff).

DESCRIPTION OF RELATED ART

Various surgical fasteners are known, such as for securing an implant, for example for repair of a tear in the supraspinatus tendon (which may be commonly referred to as a rotator cuff tear). For example, United States Patent Application No. US 2008/0188936 discloses certain examples of fasteners and implants for such repairs.

SUMMARY

This disclosure includes fasteners for coupling an implant to tissue (e.g., soft-tissue and/or bone), fabric-like implants, and assemblies with fasteners pre-loaded with implants. The present fasteners generally include at least one barbed shaft and an enlarged head spaced from a distal end of the shaft. Some of the present fasteners include two barbed shafts and an enlarged head spanning the two shafts. The present implants generally comprise at least one flexible, fibrous layer that is substantially planar in a flattened state. This disclosure also includes kits that comprise a plurality of fasteners pre-loaded with implants. Some of the present kits also include one or more of the present fastener-delivery apparatuses or tools; for example, a plurality of pre-loaded fasteners with a single, reloadable tool; a plurality of tools each pre-loaded with a fastener that is pre-loaded with an implant; and/or a plurality of cartridges each pre-loaded with a fastener that is pre-loaded with an implant, and a common tool for use with the cartridges. In some of the present embodiments, the implant comprises a woven layer, and a nonwoven layer coupled to the woven layer (e.g., via stitches). In some configurations of the present implants, the implant further comprises at least one suture leg (e.g., two suture legs each) coupled to the implant at a point that is closer to the second end edge than to the first end edge, the suture leg having a free portion that is configured to extend beyond the second end edge.

In some embodiments of the present assemblies for delivery of a fastener, the assembly comprises fastener cartridge, a fibrous implant wrapped around a portion of the cartridge, a fastener extending through the implant, and an elongated shield disposed around the implant and the cartridge such that the implant is retained between the cartridge and the shield. The implant is flexible and has a first end edge, a second end edge, and a pair of lateral edges extending between the first and second end edges, where the implant is substantially planar when in a flattened state (e.g., in which the first end edge is separated from the second end edge under a first tension of 5 Newtons (N) applied perpendicular to each of the end edges, and in which the lateral edges are separated from each other under a tension of 5 N applied perpendicular to each of the lateral edges).

In some embodiments of such assemblies, the cartridge includes a body with a proximal end, and a distal end, the proximal end configured to be removably coupled to a distal end of an apparatus to deliver a fastener coupled to the cartridge, and the cartridge comprises: a spike having a spike proximal end coupled to the distal end of the cartridge, and a spike distal end extending from the distal end of the cartridge, the spike proximal end having a transverse dimension that is smaller than a transverse dimension of the distal end of the cartridge such that a shoulder is defined at the spike proximal end, the shoulder configured to abut a head of a fastener received over the spike. In other embodiments of such assemblies, the cartridge includes a body with a proximal end, and a distal end, the proximal end configured to be removably coupled to a distal end of an apparatus to deliver a fastener coupled to the cartridge, and the cartridge comprises: a pair of spikes each having a spike proximal end coupled to the distal end of the cartridge, and a spike distal end extending from the distal end of the cartridge, the spike proximal end having a transverse dimension that is smaller than a corresponding transverse dimension of the distal end of the cartridge body such that a shoulder is defined at the spike proximal end, the shoulder configured to abut a head of a fastener received over the spikes.

The fastener is received over the spike(s) of the cartridge. In some embodiments in which the cartridge has a single spike, the fastener comprises: an elongated shaft having a shaft length extending from a shaft proximal end to a shaft distal end, and defining an internal passage extending along the shaft length; an enlarged head coupled to the proximal end of the shaft and abutting the shoulder of the cartridge; a plurality of outriggers extending from the enlarged head in a direction away from the internal passage; and a plurality of first barbs each extending along a portion of the shaft length, each first barb having a leading edge and trailing edge spaced from the proximal end of the shaft, the leading edge of each first barb being disposed between the trailing edge of that first barb and the distal end of the shaft; where the shaft, head, outriggers, and first and second barbs are defined by a unitary piece of polymer.

In other embodiments in which the cartridge has two spikes, the fastener comprises: a first elongated shaft having a first shaft length extending from a first shaft proximal end to a first shaft distal end, and defining an internal first passage extending along the first shaft length; a second elongated shaft having a second shaft length extending from a second shaft proximal end to a second shaft distal end, and defining an internal second passage extending along the second shaft length; an enlarged head coupled to the proximal ends of the first shaft and the second shaft, the had abutting the shoulder of the cartridge; a plurality of first barbs each extending along a portion of the first shaft length, each first barb having a leading edge and trailing edge spaced from the proximal end of the first shaft, the leading edge of each first barb being disposed between the trailing edge of that first barb and the first shaft distal end; a plurality of second barbs each extending along a portion of the second shaft length, each second barb having a leading edge and trailing edge spaced from the proximal end of the second shaft, the leading edge of each second barb being disposed between the trailing edge of that second barb and the second shaft distal end; and where the shafts, head, and barbs are defined by a unitary piece of polymer.

The elongated, tubular shield of the present assemblies is disposed over the implant, at least a portion of the fastener, and at least a portion of the cartridge, and the shaft of the fastener extends through the implant at a point that is closer to the first end edge than to the second end edge, a first portion of the implant extends proximally around at least a portion of the cartridge, and the first portion of the implant is disposed between the cartridge and the shield.

Some implementations of the present methods utilize one of the present assemblies and an apparatus having a distal end coupled to a proximal end of the fastener body, and the method comprises: inserting the shaft(s) of the fastener into a first portion of tissue (e.g., bone) of a patient; retracting the shield to a position that permits the second end edge of the implant to exit the shield; spreading the implant along a second portion of tissue (e.g., soft tissue such as tendon) of the patient; coupling the implant to the second portion of tissue; and decoupling the cartridge from the fastener such that the spike of the cartridge is removed from the internal passage of the shaft of the fastener. In some implementations, spreading the implant comprises pulling the first and/or second suture leg of the implant laterally away from the fastener.

Some embodiments of the present kits comprise a plurality of the present assemblies, for example, that are sterile and sealed in a package (e.g., a tray).

The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any embodiment of the present apparatuses, kits, and methods, the term "substantially" may be substituted with "within [a percentage] of" what is specified, where the percentage includes 0.1, 1, 5, and/or 10 percent.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, an apparatus or kit that "comprises," "has," "includes" or "contains" one or more elements possesses those one or more elements, but is not limited to possessing only those elements. Likewise, a method that "comprises," "has," "includes" or "contains" one or more steps possesses those one or more steps, but is not limited to possessing only those one or more steps.

Further, an apparatus, device or system that is configured in a certain way is configured in at least that way, but it can also be configured in other ways than those specifically described.

Any embodiment of any of the present apparatuses and methods can consist of or consist essentially of—rather than comprise/include/contain/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb.

Details associated with the embodiments described above and others are presented below.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers. The figures are drawn to scale (unless otherwise noted), meaning the sizes of the depicted elements are accurate relative to each other for at least the embodiment depicted in the figures.

FIG. 1D depicts a second side view of the fastener of FIG. 1A.

FIG. 1E depicts a proximal end view of the fastener of FIG. 1A.

FIGS. 1F-1H depict side cross-sectional views of the fastener of FIG. 1A, along the planes F-F, G-G, and H-H, respectively, of FIG. 1E.

FIG. 2A depicts a perspective view of a first embodiment of the present bone fasteners.

FIG. 2B depicts a distal end view of the fastener of FIG. 2A

FIG. 2C depicts a side view of the fastener of FIG. 2A.

FIG. 3A depicts a perspective view of a first embodiment of a tool for delivery of a fastener of FIG. 1A or FIG. 2A, with a fastener of FIG. 2A coupled to a distal end of the tool.

FIG. 3B depicts a side view of the tool of FIG. 3A, shown without the fastener of FIG. 2A.

FIG. 3C depicts a side cross-sectional view of the tool of FIG. 3A, along the plane C-C of FIG. 3B.

FIG. 4A depicts a perspective view of a second embodiment of a tool for delivery of a fastener of FIG. 1A or FIG. 2A, with a fastener of FIG. 2A coupled to a distal end of the tool.

FIG. 4B depicts a side view of the tool of FIG. 4A, shown without the fastener of FIG. 2A.

FIG. 4C depicts a side cross-sectional view of the tool of FIG. 4A, along the plane C-C of FIG. 4B.

FIG. 5A depicts a perspective view of a third embodiment of a tool for delivery of a fastener of FIG. 1A or FIG. 2A via a cartridge, with a fastener of FIG. 2A coupled to a distal end of the cartridge and the cartridge coupled to a distal end of the tool.

FIG. 5B depicts a side view of the tool of FIG. 5A, shown without the fastener of FIG. 2A.

FIG. 5C depicts a side cross-sectional view of the tool of FIG. 5A, along the plane C-C of FIG. 5B.

FIG. 5E depicts an enlarged side view of a fastener cartridge of the tool of FIG. 5A with a shield of the tool omitted.

FIG. 5F depicts an enlarged lower perspective view of the fastener cartridge of FIG. 5E.

FIG. 5G depicts a cutaway perspective view of the fastener cartridge of FIG. 5E.

FIG. 6A depicts a perspective view of a second embodiment of the present soft-tissue fasteners.

FIG. 6B depicts a side view of the fastener of FIG. 6A.

FIG. 6C depicts a distal end view of the fastener of FIG. 6A.

FIG. 6D depicts a proximal end view of the fastener of FIG. 6A.

FIGS. 6E and 6F depict side cross-sectional views of the fastener of FIG. 6A, along the planes E-E and F-F, respectively, of FIG. 6D.

FIG. 7A depicts a perspective view of an embodiment of a tool for delivery of a fastener of FIG. 6A, with a fastener of FIG. 6A coupled to a distal end of the tool.

FIG. 7B depicts a side view of the tool of FIG. 7A.

FIG. 7C depicts a side cross-sectional view of the tool of FIG. 7A, along the plane C-C of FIG. 7B.

FIG. 8A depicts a perspective view of a second embodiment of the present bone fasteners.

FIG. 8B depicts a distal end view of the fastener of FIG. 8A

FIG. 9A depicts a perspective view of an embodiment of a tool for delivery of a fastener of FIG. 8A via a cartridge, with a fastener of FIG. 8A coupled to a distal end of the cartridge, and the cartridge coupled to a distal end of the tool.

FIG. 9B depicts a side view of the tool of FIG. 9A.

FIG. 9C depicts a side cross-sectional view of the tool of FIG. 9A, along the plane C-C of FIG. 9B.

FIG. 9D depicts an enlarged first side view of a fastener cartridge of the tool of FIG. 9A.

FIG. 9E depicts an enlarged second side view of the fastener cartridge of the tool of FIG. 9A.

FIG. 9F depicts a distal end view of the tool of FIG. 9A, with the bone fastener coupled to the cartridge.

FIG. 9G depicts a distal end view of the tool of FIG. 9A, with the bone fastener omitted.

FIG. 16A depicts a side view of a sixth embodiment of the present soft-tissue fasteners.

FIG. 16B depicts a distal end view of the fastener of FIG. 16A.

FIG. 17A depicts a side view of a seventh embodiment of the present soft-tissue fasteners.

FIG. 17B depicts a distal end view of the fastener of FIG. 16A.

FIG. 17C depicts a side cross-sectional view of the fastener of FIG. 19A, taken along the plane C-C of FIG. 17A.

FIGS. 23A, 23B, and 23C depict perspective, end, and plan views, respectively, of a fibrous, fabric-like implant for use with the present fasteners.

DESCRIPTION OF ILLUSTRATIVE EMBODIMENTS

Figure 1A:
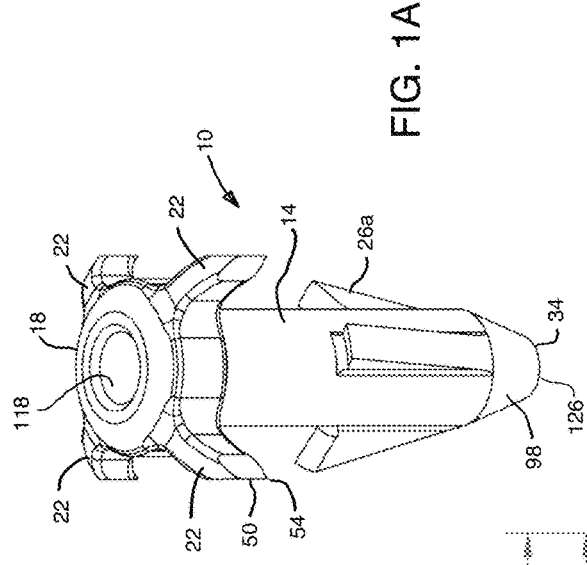
FIG. 1A depicts a perspective view of a first embodiment of the present soft-tissue fasteners.

Referring now to the drawings, and more particularly to FIGS. 1A-1H, shown therein and designated by the reference numeral 10 is one embodiment of the present soft-tissue fasteners. In the depicted example, fastener 10 is configured for coupling an implant to soft tissue, such as a tendon (e.g., the supraspinatus tendon or rotator cuff). As shown, fastener 10 comprises an elongated shaft 14, an enlarged head 18, a plurality of outriggers 22, and a plurality of barbs 26a, 26b, 26c.

Shaft 14 extends from a shaft proximal end 30 (and enlarged head 18) to a shaft distal end 34. Shaft distal end 34 is configured to be inserted (along with at least one of barbs 26a, 26b, 26c) into soft tissue of a patient such that the barbs resist removal of the fastener from the soft tissue. For example, in at least some uses, the distal end can first be inserted through an implant such that inserting the distal end into soft tissue couples the implant to the soft tissue. To that end, outriggers 22 each extend outward from head 18 to resist removal of such an implant over the head. Outriggers 22 can be particularly advantageous when the fastener is used in conjunction with a fibrous (e.g., woven) or fabric-like implant, the flexibility of which may otherwise (without outriggers) be more-susceptible to slipping over the head.

Figure 1B:
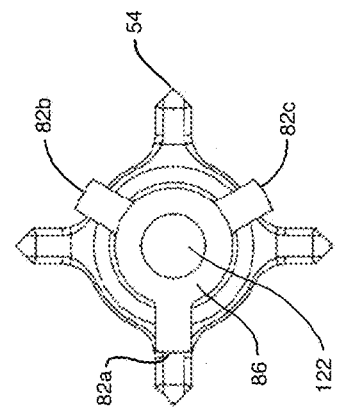
FIG. 1B depicts a distal end view of the fastener of FIG. 1A.
Figure 1C:
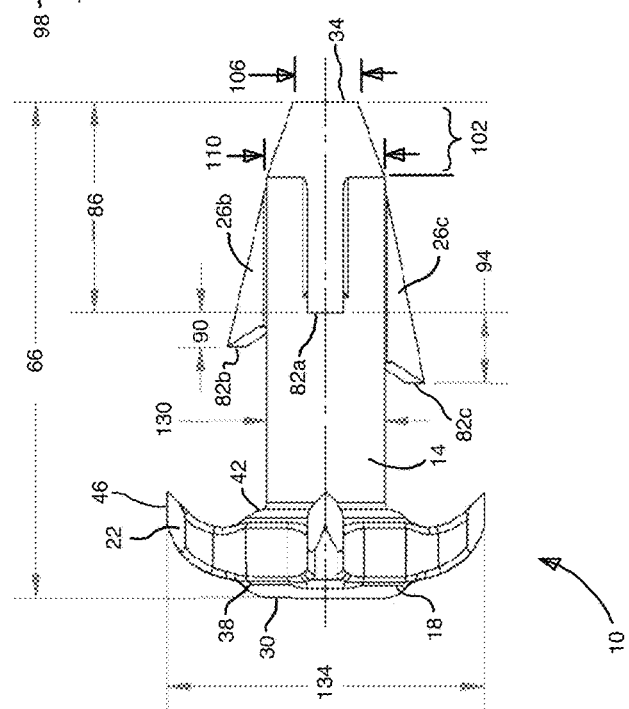
FIG. 1C depicts a first side view of the fastener of FIG. 1A.

As shown, head 18 includes a head proximal side 38, and a head distal side 42. In this configuration, at least a portion of the head distal side is longitudinally aligned with shaft proximal end 30, for example as shown in FIG. 1C.

In some embodiments, such as the one shown, a distal end 46 of each outrigger 22 tapers to an edge 50 and a point 54, which point is configured to assist with engaging an implant that is secured by fastener 10, for example by extending partially into or through the implant (e.g., between fibers of a fibrous implant). To further improve engagement with an underlying implant, outriggers 22 of the depicted embodiment are configured such that the respective distal ends—points 54—extend distally of the distal side (42) of head 18 by a distance 58 (FIG. 1F). Stated another way, when measured parallel to a central, longitudinal axis 62 of the shaft, each of the outrigger distal ends (points 54) is closer to shaft distal end 34 than is at least a portion of distal side 34 of head 18. Other embodiments omit edge 50 but retain point 54 and/or, instead of point 54, may include a rounded, flattened, or roughened distal end (e.g., which may still extend distally of head distal side 42). In the embodiment shown, outriggers 22 are disposed at equiangular intervals around the head. Specifically, four outriggers are disposed at angular intervals of 90 degrees. In other embodiments with a different number of outriggers and equiangular intervals, the equiangular intervals will necessarily also vary (e.g., three outriggers would be disposed at angular intervals of 120 degrees. In other embodiments, outriggers may be disposed at different angular intervals around the head; for example, if one outrigger 22 were omitted from fastener 10, it would leave three outriggers at 90 degree intervals. By way of example, a fastener so modified may be advantageous for use near an edge of an implant (e.g., so the two opposing outriggers separated by an angular interval of 180 degrees could be parallel to the implant edge and the third outrigger could extend inward away from the implant edge).

As shown, each of barbs 26a, 26b, 26c extends longitudinally along a portion of a length 66 of the shaft. In this configuration, each barb extends linearly along the shaft, but in other embodiments, the barbs may be helical or otherwise curved or angled along the shaft. Each of the barbs has a respective distal leading edge 70a, 70b, 70c, and a respective proximal trailing edge 74a, 74b, 74c that is spaced from shaft proximal end 30. For each barb, the leading edge faces distally (toward shaft distal end 34) and is disposed between the shaft distal end and the respective trailing edge. As shown, each of the leading edges is disposed at an acute angle relative to longitudinal axis 62 to facilitate insertion into tissue and/or an implant, and each of the trailing edges is also disposed at an acute angle relative to longitudinal axis 62 to resist removal of the fastener once inserted. In some embodiments, the leading edges of the barbs are disposed at different angles. For example, leading edge 70a of barb 26a is disposed at a first angle 78a, leading edge 70b of barb 26b is disposed at a second angle 78b that is smaller than first angle 78a, and leading edge 70c of barb 26c is disposed at a third angle 78c that is smaller than second angle 78b. These angles (78a, 78b, and 78c) can be selected to manage the force required for insertion and minimize damage to tissue and/or an implant, while maintaining sufficient resistance to removal. For example, for a given barb length, as the angle of the leading edge increases, so does the distance the barb extends from the shaft and the resistance to removal. However, the farther the barb extends outward from the shaft, the greater the chances of tissue fibers being damaged by insertion of the fastener instead of simply permitting the barb to slip past those tissue fibers so they can be engaged by the barb's trailing edge. As such, in the depicted embodiment, the angles of the leading edges decrease with the length of the barbs. In particular, barb 26a has the shortest length (parallel to axis 62) and the greatest leading edge angle 78a, barb 26c has the longest length and the smallest leading edge angle 78c, and barb 26c has a length and a leading edge angle 78b between those of barbs 26a and 26c. In some embodiments, angle 78a is between 15 and 30 degrees, for example, between any two of: 15, 17.5, 20, 22.5, and/or 25 degrees (e.g., between 17.5 and 22.5 degrees); angle 78b is between 10 and 20 degrees, for example, between any two of 10, 12.5, 15, 17.5, and/or 20 degrees (e.g., between 12.5 and 17.5 degrees); and angle 78c is between 7.5 and 17.5 degrees, for example, between any two of 7.5, 10, 12.5, 15, and/or 17.5 degrees (e.g., between 10 and 15 degrees). In the depicted embodiment, angle 78a is between 19 and 20 degrees, angle 78b is between 15 and 16 degrees, and angle 78c is between 12 and 13 degrees.

Additionally, in the depicted embodiment, the trailing edges of the barbs are staggered along the length of shaft to increase the likelihood that at least one of the barbs will securely engage soft tissue. For example, when used with certain tendons (e.g., the supraspinatus tendon), the tendon may have different thicknesses in different regions or may have partial-thickness tears, such that barbs disposed at different distances from the head of the fastener make it more likely that at least one barb will encounter and engage soft tissue of sufficient integrity to resist removal of the fastener. More specifically, in the depicted embodiment, the barbs extend outward from shaft 14 by the same distance and, as a result of their different leading edge angles 78a, 78b, 78c, therefore have different lengths—i.e., trailing edges 74a, 74b, 74c are disposed at different points along the length of the shaft. For example, trailing edge 74b of barb 26b is closer to shaft proximal end 30 than is trailing edge 74a of barb 26a, and trailing edge 74c of barb 26c is closer to shaft proximal end 30 than is trailing edge 74b of barb 26b. As indicated in FIG. 1C, a proximal-most point or edge 82a of barb 26a is a distance 86 from shaft distal end 34, a proximal-most point or edge 82b of barb 26b is a distance 90 proximal of point or edge 82a, and a proximal-most point or edge 82c of barb 26c is a greater distance 94 proximal of point or edge 82a.

In the embodiment shown, barbs 26a, 26b, 26c are disposed at equiangular intervals around the shaft (i.e., around the cross-sectional perimeter of the shaft). Specifically, three barbs are disposed at angular intervals of 120 degrees. In other embodiments with a different number of barb and equiangular intervals, the equiangular intervals will necessarily also vary (e.g., four barbs would be disposed at angular intervals of 90 degrees. In other embodiments, barbs may be disposed at different angular intervals around the shaft; for example, three barbs could be disposed at 90 degree intervals, such that two of the three barbs would be spaced by 180 degrees.

In some embodiments, it can be advantageous for at least one of the barbs to not be radially aligned with any of the outriggers, such that if a barb cuts a slot or creates a tear in an implant when the distal end is inserted through the implant, then at least one outrigger is more likely to not be aligned with that slot or tear and thus reduce the changes of the slot or tear slipping over or around head 18 and outriggers 22. For example, as shown in FIG. 1B, only barb 26a is radially aligned with an outrigger 22, and therefore two of the three barbs (26b, 26c) are not radially aligned with any of the outriggers. Additionally, in some embodiments, the outriggers extend farther outward radially than the barbs, such that—even if all of the barbs cut or tear an implant through which the fastener is inserted—the outriggers (and particularly points 54) are more likely to engage portions of the implant that are outside those cuts or tears.

To further facilitate insertion through an implant and into soft tissue, an outer surface 98 of the shaft defines a tapered section 102 adjacent shaft distal end 34. Tapered section 102 extends from a first outer transverse dimension 106 at shaft distal end 34 and increases in size in a proximal direction to a larger outer transverse dimension 110 that may, as in the depicted embodiment, be substantially equal to an outer transverse dimension along a remainder of the length of the shaft between the tapered section and the head (18). In the embodiment shown, tapered section 102 is tapered linearly at a taper angle 114 relative to axis 62, but in other embodiments may be tapered in a non-linear fashion (e.g., along a curved path). Angle 114 may in some embodiments be equal to angle 78a, and/or may be between 15 and 30 degrees, for example, between any two of: 15, 17.5, 20, 22.5, and/or 25 degrees (e.g., between 17.5 and 22.5 degrees). For example, in the depicted embodiment, angle 114 is between 19 and 20 degrees and is equal to angle 78a such that tapered section 102 and leading edge 70a follow a continuous, linear path.

In the embodiment shown, the shaft (14) is also configured to receive a portion of a delivery tool (described below). In particular, an internal surface 118 of the shaft defines an internal passage 122 that extends through the length of the shaft along axis 62 and through both of proximal end 30 and distal end 34. Passage 122 is configured to receive a portion of a tool (e.g., a spike or trocar) such that that the tool extends through passage 122 and beyond distal end 34 to permit the tool to form a pilot hole in the tissue into which the tool (or a user of the tool) can simultaneously drive the fastener and, after the fastener is inserted into the tissue, the tool can thereafter be removed via the passage (122). In some embodiments, passage 122 has a first inner transverse dimension at the shaft proximal end (30) and a smaller second inner transverse dimension at the shaft distal end (34), such that the passage tapers (e.g., linearly) from smaller at the shaft distal end to larger as the passage approaches the shaft proximal end. For example, in the embodiment shown, passage 122 tapers linearly at an angle 124 of one degree. Such a taper can be advantageous in reducing the resistance to removal of a tool after insertion of the fastener. For example, during insertion of the fastener, soft tissue will be displaced and tend to exert an inward force around the perimeter of a tool in the passage. The provision of a taper, such that a proximal portion of the passage is larger than a distal portion of the passage, typically helps mitigate the compressive forces on a tool in the passage during insertion of the fastener and thereby typically reduces resistance to removal of the tool from the passage after such insertion. In some embodiments, such as the one shown, inner surface 118 and outer surface 98 meet at shaft distal end 34 to form an edge 126. Such an edge at the distal end of the shaft minimizes the cross-sectional area of fastener at the distal end to facilitate insertion of the fastener into tissue.

In the embodiment of FIGS. 1A-1H, shaft 14 has a circular cross-sectional shape, such that an outer transverse dimension 130 is the diameter of a circle that defines the outer perimeter of that shape. In some embodiments, transverse dimension 130 is between any two of: 1.25 mm, 1.35 mm, 1.45 mm, 1.55 mm, 1.65 mm, 1.75 mm, 1.85 mm, 1.95 mm, and/or 2.05 mm (e.g., between 1.55 mm and 1.75 mm). For example, in the embodiment shown, diameter 130 is between 1.6 and 1.7 mm. In other embodiments, the shaft can have other cross-sectional shapes, such as, for example, square, hexagonal, octagonal, or the like.

As described above, the barbs of the fastener extend outwardly from the shaft and therefore span a maximum transverse dimension that is larger than that of the shaft, such as, for example, the barbs extend radially outward to an imaginary circle (perpendicular to axis 62) having a maximum transverse dimension that is between any two of: 130%, 140%, 150%, 160%, 170%, 180%, 190%, 200%, 210%, 220%, and/or 230% of the maximum transverse dimension of the shaft (e.g., between 170% and 190% of the diameter of the shaft). For example, in the embodiment shown, barbs 26a, 26b, 26c each extend radially outward to a point between 1.4 and 1.5 mm from axis 62 (i.e., each of point/edge 82a, 82b, 82c is between 1.4 and 1.5 mm from axis 62).

As also described above, outriggers 22 extend outwardly from enlarged head 82 beyond the lateral extend of the barbs and therefore span a maximum transverse dimension 134 that is larger than that of the barbs, such as, for example, a maximum transverse dimension that is between any two of: 200%, 220%, 240%, 260%, 280%, and/or 300% of the maximum transverse dimension of the shaft (e.g., between 260% and 280% of the maximum transverse dimension of that shaft). For example, in the embodiment shown, outriggers 22 each extend radially outward to a point that is between 2.2 mm and 2.3 mm from axis 62.

In some embodiments, the overall length of the fastener is between 5 mm and 9 mm, such as, for example, between any two of 5 mm, 5.5 mm, 6 mm, 6.5 mm, 7 mm, 7.5 mm, 8 mm, and/or 8.5 mm (e.g., between 5.5 mm and 6.5 mm, between 6.5 mm and 7.5 mm, or between 7.5 mm and 8.5 mm). For example, in the embodiment shown, length 66 is nominally 7 mm, and therefore between 6.5 mm and 7.5 mm. In other embodiments, length 66 can be selected for a particular use. For example, when using a soft-tissue fastener with a tendon that overlies and must move relative to other anatomical structure, it is generally desirable that the distal end of the fastener not extend into the underlying anatomical structures. As an example of one type of tendon, for use with a relatively smaller person with a relatively thinner supraspinatus tendon, a fastener with nominal length of 6 mm may be appropriate; while, for use with a relatively larger person with a relatively thicker supraspinatus tendon, a fastener with a nominal length of 8 mm may be appropriate.

In at least some embodiments, the fastener (i.e., shaft 14, head 18, outriggers 22, and barbs 26a, 26b) are defined by a unitary piece of material. For example, it is sometimes desirable for soft-tissue fasteners to be bioresorbable and, in such instances, the fastener can be molded of a bioresorbable polymer such as poly lactic-co-glycolic acid (PLGA) or polylactic acid (PLA or PLLA). In some uses, it is desirable for complete resorption to occur in less than 9 months (e.g., between 3 months and 9 months).

Referring next to FIGS. 2A-2D, a first embodiment of the present bone fasteners 210 is shown. In the depicted example, fastener 210 is configured for coupling an implant to bone, such as the humerus (e.g., to repair the supraspinatus tendon or rotator cuff). As shown, fastener 210 comprises an elongated shaft 214, an enlarged head 218, a plurality of outriggers 222, a plurality of first barbs 226a, and a plurality of second barbs 226b.

Shaft 214 extends from a shaft proximal end 230 (and enlarged head 218) to a shaft distal end 234. Shaft distal end 234 is configured to be inserted (along with at least first barbs 226a) into bone of a patient such that the barbs resist removal of the fastener from the bone. For example, in at least some uses, the distal end can first be inserted through an implant such that inserting the distal end into bone couples the implant to the bone. To that end, outriggers 222 each extend outward from head 218 to resist removal of such an implant over the head. Outriggers 222 can be particularly advantageous when the fastener is used in conjunction with a fibrous (e.g., woven) or fabric-like implant, the flexibility of which may otherwise (without outriggers) be more-susceptible to slipping over the head.

As shown, head 218 includes a head proximal side 238, and a head distal side 242. In this configuration, at least a portion of the head distal side is longitudinally aligned with shaft proximal end 230, for example as shown in FIG. 2C.

In some embodiments, such as the one shown, a distal end 246 of each outrigger 222 tapers to an edge 250 and a point 254, which point is configured to assist with engaging an implant that is secured by fastener 210, for example by extending partially into or through the implant (e.g., between fibers of a fibrous implant). To further improve engagement with an underlying implant, outriggers 222 of the depicted embodiment are configured such that the respective distal ends—points 254—extend distally of another part of the distal side of the respective outrigger. For example, a distal surface of each outrigger is curved to from a concave surface. In this embodiment, points 254 are longitudinally even with distal side 242 of head 218; however, in other embodiments, points 254 may extend distally of the distal side (242) of head 218 by a distance (e.g., similar to outriggers 22 of fastener 10). Other embodiments omit edge 250 but retain point 254 and/or, instead of point 254, may include a rounded, flattened, or roughened distal end (e.g., which may still extend distally of head distal side 242). In the embodiment shown, outriggers 222 are disposed at equiangular intervals around the head. Specifically, four outriggers are disposed at angular intervals of 90 degrees. In other embodiments with a different number of outriggers and equiangular intervals, the equiangular intervals will necessarily also vary (e.g., three outriggers would be disposed at angular intervals of 120 degrees. In other embodiments, outriggers may be disposed at different angular intervals around the head; for example, if one outrigger 222 were omitted from fastener 210, it would leave three outriggers at 90 degree intervals. By way of example, a fastener so modified may be advantageous for use near an edge of an implant (e.g., so the two opposing outriggers separated by an angular interval of 180 degrees could be parallel to the implant edge and the third outrigger could extend inward away from the implant edge).

As shown, each of the first and second barbs (226a, 226b) extends longitudinally along a portion of a length 266 of the shaft. In this configuration, each barb extends linearly along the shaft, but in other embodiments, the barbs may be helical or otherwise curved or angled along the shaft. Each of the barbs has a respective distal leading edge 270a, 270b, and a respective proximal trailing edge 274a, 274b that is spaced from shaft proximal end 230. For each barb, the leading edge faces distally (toward shaft distal end 234) and is disposed between the shaft distal end and the respective trailing edge. As shown, each of the leading edges is disposed at an acute angle relative to longitudinal axis 262 to facilitate insertion into tissue, and each of the trailing edges is also disposed at an acute angle relative to longitudinal axis 262 to resist removal of the fastener once inserted.

In the embodiment shown, the leading edges of the first and second barbs are all disposed at a common angle 278. The angle or angles of the leading edges of the first and second barbs can be selected to manage the force required for insertion and minimize damage to bone tissue, while maintaining sufficient resistance to removal. For example, for a given barb length, as the angle of the leading edge increases, so does the distance the barb extends from the shaft and the resistance to removal. However, the farther the barb extends outward from the shaft, the greater the chances of tissue fibers being damaged by insertion of the fastener instead of simply permitting the barb to slip past those tissue fibers so they can be engaged by the barb's trailing edge. In some embodiments, angle 278 is between 7.5 and 17.5 degrees, for example, between any two of 7.5, 10, 12.5, 15, and/or 17.5 degrees (e.g., between 10 and 15 degrees). In the depicted embodiment, angle 278 is between 12 and 13 degrees. In other embodiments, the leading edges of the first barbs are disposed at a first angle, and the leading edges of the second barbs are disposed at a second angle that is different than the first angle. For example, the leading edges of first barbs 226a can be disposed at first angle that is between 7.5 and 17.5 degrees, for example, between any two of 7.5, 10, 12.5, 15, and/or 17.5 degrees (e.g., between 10 and 15 degrees, or between 12 and 13 degrees), and the leading edges of the second barbs 226b can be disposed at a second angle that is between 10 and 20 degrees, for example, between any two of 10, 12.5, 15, 17.5, and/or 20 degrees (e.g., between 12.5 and 17.5 degrees, or between 15 and 16 degrees).

Additionally, in the depicted embodiment, the trailing edges of the first barbs (226a) and the trailing edges of the second barbs (226b) are staggered along the length of shaft to increase the likelihood that at least one of the barbs will securely engage bone tissue. For example, when used to secure an implant over a portion of a bone (e.g., the humerus), the implant may have different thicknesses in different regions or may have not lay perfectly against the bone, such that barbs disposed at different distances from the head of the fastener make it more likely that at least one set of barbs will encounter and engage bone tissue underlying the implant to resist removal of the fastener. More specifically, in the depicted embodiment, first barbs 226a are disposed closer to shaft distal end 234 than to shaft proximal end 230, and second barbs 226b are disposed closer to the shaft proximal end 230 such that their trailing edges 274b are disposed between the trailing edges 274a of the first barbs and shaft and head 218. Stated another way, trailing edges 274b of second barbs 226b are closer to shaft proximal end 230 than are trailing edges 274a of first barbs 226a. As indicated in FIG. 2C, a proximal-most points or edges 282a of first barbs 226a are a distance 286 from shaft distal end 234, and proximal-most points or edges 282b of second barbs 226b are a greater distance 290 proximal of points or edges 282a.

In the embodiment shown, first barbs 226a are disposed at equiangular intervals around the shaft (i.e., around the cross-sectional perimeter of the shaft), and second barbs 226b are also disposed at equiangular intervals around the shaft. Specifically, four first barbs 226a are disposed at angular intervals of 90 degrees, and four second barbs 226b are disposed at angular intervals of 90 degrees. In other embodiments with a different number of barb and equiangular intervals, the equiangular intervals will necessarily also vary (e.g., three barbs would be disposed at angular intervals of 120 degrees. In other embodiments, barbs may be disposed at different angular intervals around the shaft; for example, three barbs could be disposed at 90 degree intervals, such that two of the three barbs would be spaced by 180 degrees.

In some embodiments, it can be advantageous for at least the first barbs or the second barbs to not be radially aligned with any of the outriggers, such that if a barb cuts a slot or creates a tear in an implant when the distal end is inserted through the implant, then the outriggers are more likely to not be aligned with that slot or tear and thus reduce the changes of the slot or tear slipping over or around head 218 and outriggers 222. For example, as shown in FIG. 2B, only first barbs 226a are radially aligned with outriggers 222, and second barbs 26b are not radially aligned with any of the outriggers. Additionally, in some embodiments, the outriggers extend farther outward radially than the barbs, such that—even if all of the barbs cut or tear an implant through which the fastener is inserted—the outriggers (and particularly points 254) are more likely to engage portions of the implant that are outside those cuts or tears. In other embodiments, all of the first and second barbs can be rotated relative to the outriggers such that none of the barbs are radially aligned with the outriggers.

To further facilitate insertion through an implant and into soft tissue, an outer surface 298 of the shaft defines a tapered section 302 adjacent shaft distal end 234. Tapered section 302 extends from a first outer transverse dimension 306 at shaft distal end 234 and increases in size in a proximal direction to a larger outer transverse dimension 310 that may, as in the depicted embodiment, be substantially equal to an outer transverse dimension along a remainder of the length of the shaft between the tapered section and the head (218). In the embodiment shown, tapered section 302 is tapered linearly at a taper angle 314 relative to axis 262, but in other embodiments may be tapered in a non-linear fashion (e.g., along a curved path). Angle 314 may in some embodiments be equal to angle 278, and/or may be between 7.5 and 17.5 degrees, for example, between any two of 7.5, 10, 12.5, 15, and/or 17.5 degrees (e.g., between 10 and 15 degrees, or between 12 and 13 degrees). For example, in the depicted embodiment, angle 314 is between 19 and 20 degrees and is equal to angle 278 such that tapered section 302 and leading edge 270 follow a continuous, linear path.

In the embodiment shown, the shaft (214) is also configured to receive a portion of a delivery tool (described below). In particular, an internal surface 318 of the shaft defines an internal passage 322 that extends through the length of the shaft along axis 262 and through both of proximal end 230 and distal end 234. Passage 322 is configured to receive a portion of a tool (e.g., a spike or trocar) such that that the tool extends through passage 322 and beyond distal end 234 to permit the tool to form a pilot hole in the tissue into which the tool (or a user of the tool) can simultaneously drive the fastener and, after the fastener is inserted into the tissue, the tool can thereafter be removed via the passage (322). In some embodiments, passage 322 has a first inner transverse dimension at the shaft proximal end (230) and a smaller second inner transverse dimension at the shaft distal end (234), such that the passage tapers (e.g., linearly) from smaller at the shaft distal end to larger as the passage approaches the shaft proximal end. For example, in the embodiment shown, passage 322 tapers linearly at an angle 324 of one degree. Such a taper can be advantageous in reducing the resistance to removal of a tool after insertion of the fastener. For example, during insertion of the fastener, soft tissue will be displaced and tend to exert an inward force around the perimeter of a tool in the passage. The provision of a taper, such that a proximal portion of the passage is larger than a distal portion of the passage, typically helps mitigate the compressive forces on a tool in the passage during insertion of the fastener and thereby typically reduces resistance to removal of the tool from the passage after such insertion. In some embodiments, such as the one shown, inner surface 318 and outer surface 298 meet at shaft distal end 234 to form an edge 326. Such an edge at the distal end of the shaft minimizes the cross-sectional area of fastener at the distal end to facilitate insertion of the fastener into tissue.

In the embodiment of FIGS. 2A-2E, shaft 214 has a circular cross-sectional shape, such that an outer transverse dimension 330 is the diameter of a circle that defines the outer perimeter of that shape. In some embodiments, transverse dimension 330 is between 1.75 mm and 2.5 mm, for example, between any two of: 1.75 mm, 1.85 mm, 1.95 mm, 2.05 mm, 2.15 mm, 2.25 mm, 2.35 mm, 2.45 mm, and/or 2.5 mm (e.g., between 2.05 mm and 2.25 mm). For example, in the embodiment shown, diameter 330 is between 2.1 and 2.2 mm. In other embodiments, the shaft can have other cross-sectional shapes, such as, for example, square, hexagonal, octagonal, or the like.

As described above, the barbs of the fastener extend outwardly from the shaft and therefore span a maximum transverse dimension that is larger than that of the shaft, such as, for example, the barbs extend radially to an imaginary circle (perpendicular to axis 62) having a maximum transverse dimension that is between any two of: 110%, 120%, 130%, 140%, 150%, 160%, 170%, 180%, 190%, and/or 200% of the maximum transverse dimension of the shaft (e.g., between 130% and 140% of the diameter of the shaft). For example, in the embodiment shown, barbs 226a, 226b each extend radially outward to a point between 1.4 and 1.5 mm from axis 262 (i.e., each of point/edge 282a, 282b is between 1.4 and 1.5 mm from axis 262).

As also described above, outriggers 222 extend outwardly from enlarged head 282 beyond the lateral extend of the barbs and therefore span a maximum transverse dimension 334 that is larger than that of the barbs, such as, for example, a maximum transverse dimension that is between any two of: 220%, 230%, 240%, 250%, 260%, 270%, 280%, 290%, 300%, 310%, and/or 320% of the maximum transverse dimension of the shaft (e.g., between 260% and 270% of the maximum transverse dimension of that shaft). For example, in the embodiment shown, outriggers 222 each extend radially outward to a point that is between 2.8 mm and 2.9 mm from axis 262.

In some embodiments, the overall length of the fastener is between 9 mm and 15 mm, such as, for example, between any two of 9 mm, 10 mm, 11 mm, 12 mm, 13 mm, 14 mm, and/or 15 mm (e.g., between 10 mm and 13 mm). For example, in the embodiment shown, length 266 is nominally 11.5 mm, and therefore between 11 mm and 12 mm. In other embodiments, length 266 can be selected for a particular use. For example, when using a bone fastener with an implant through which the bone fastener extends, it is generally desirable that the fastener have a shaft length sufficient to permit the fastener to extend through the implant and into the bone a sufficient distance for the trailing edges of all of the barbs to engage bone.

In at least some embodiments, the fastener (i.e., shaft 214, head 218, outriggers 222, and barbs 226a, 226b) are defined by a unitary piece of material. For example, it is sometimes desirable for bone fasteners to be durable and non-bioresorbable and, in such instances, the fastener can be molded of a non-bioresorbable polymer such as polyether ether ketone (PEEK).

Figure 2D:
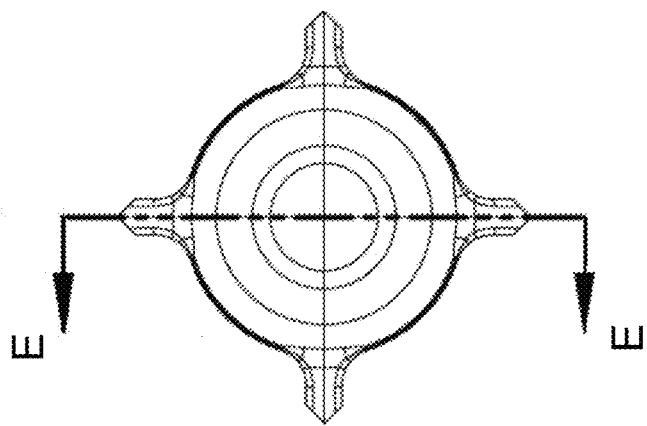
FIG. 2D depicts proximal end view of the fastener of FIG. 2A.
Figure 2E:
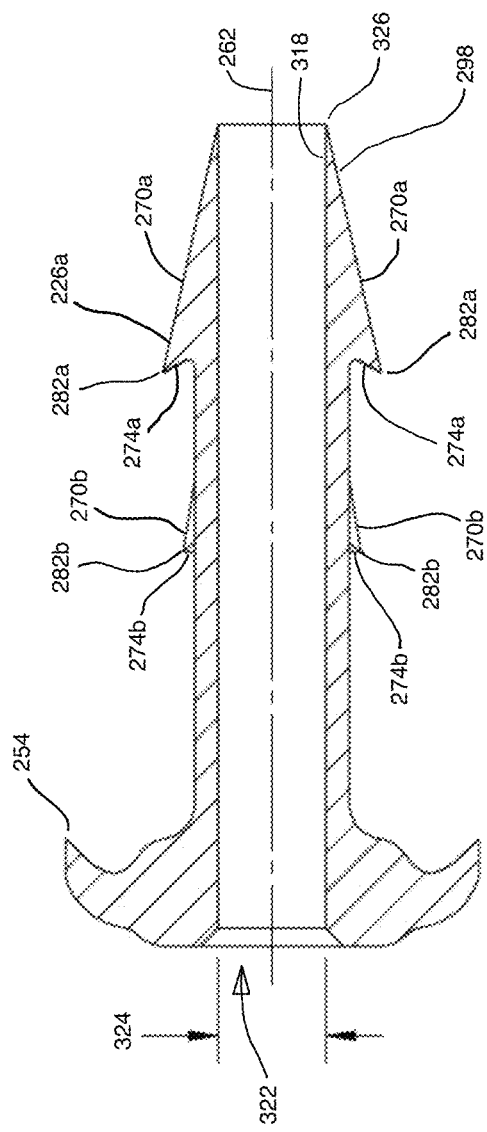
FIG. 2E depicts a side cross-sectional view along the plane D-D of FIG. 2C.
Figure 2F:
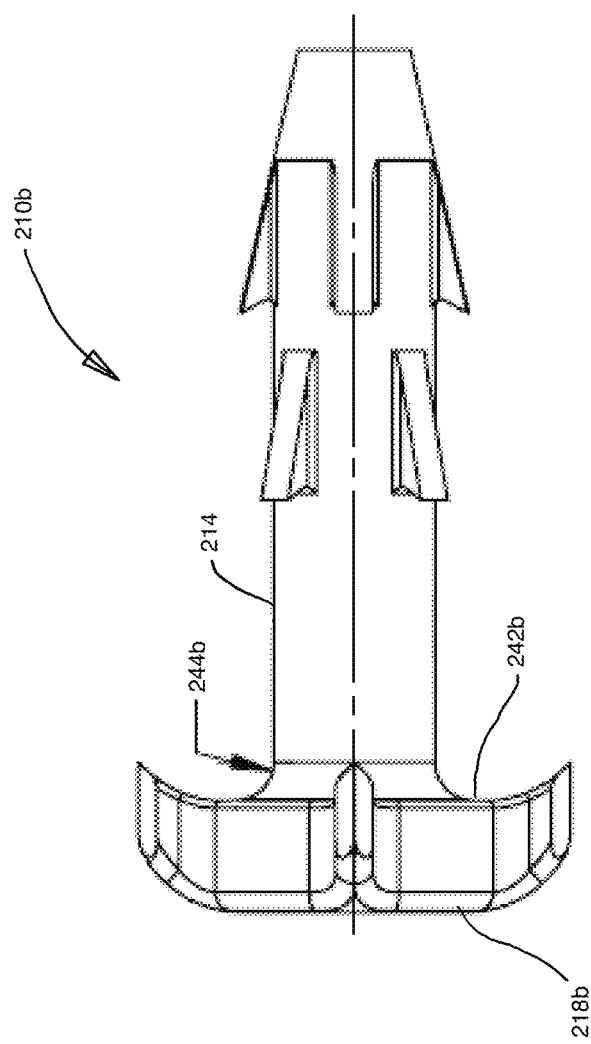
FIG. 2F depicts a side view of a variation of the fastener of FIG. 2A.

FIG. 2F depicts a side view of a variation 210b of the fastener of FIG. 2A. Fastener 210b is substantially similar to fastener 210a with the primary difference being that distal side 42b of head 18b is entirely concave and forms a continuous concave surface with the distal side of outriggers 22, as shown. Specifically, in the depicted embodiment, a radius 44b forms a concave surface that meets the nominal diameter of shaft 214.

Figures 3D, 3E:
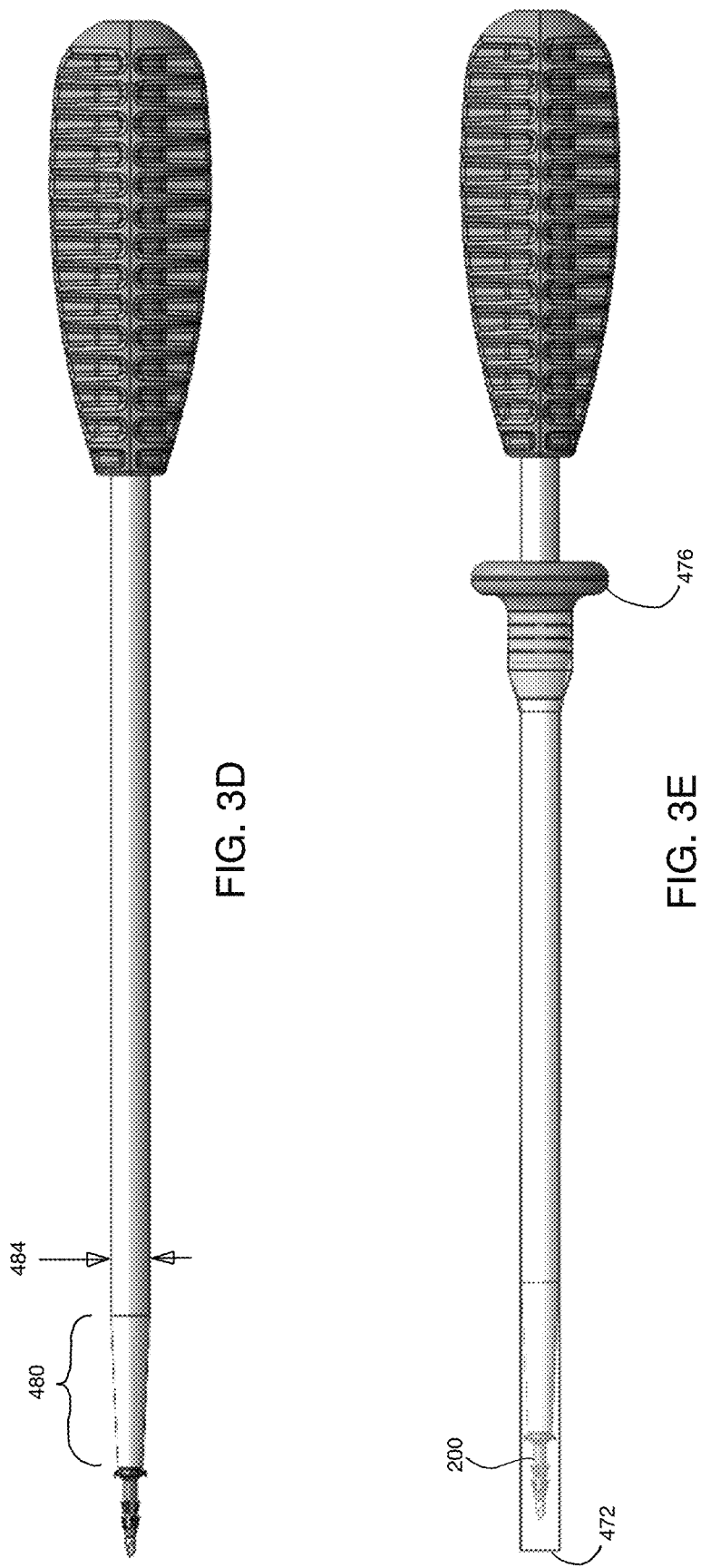
FIG. 3D depicts a side view of the tool of FIG. 3A with a shield of the tool omitted.
FIG. 3E depicts the tool of FIG. 3A, with the shield included and disposed in an extended position covering the fastener.
Figure 4D:
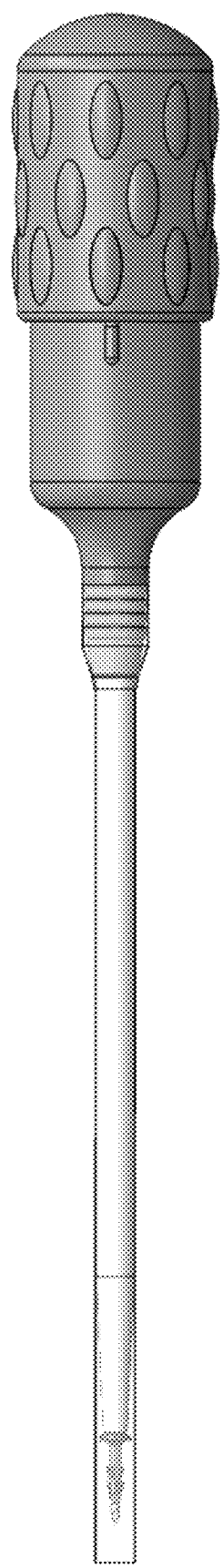
FIG. 4D depicts the tool of FIG. 4A, with the shield disposed in an extended position covering the fastener.

Referring now to FIGS. 3A-3E, a first embodiment of a tool 400 for delivery of a fastener 10 (FIGS. 1A-1H) or fastener 210 (FIGS. 2A-2E), shown with a fastener 210 coupled to a distal end of the tool. In the embodiment shown, tool 400 comprises an elongated body 404, a spike 408, and a handle 412, and a movable a shield assembly 416. Body 404 has a proximal end 420 and a distal end 424. Spike 408 has a spike proximal end 432 coupled to body distal end 424, and a spike distal end 436 extending from the body distal end. In the embodiment shown, spike 408 is unitary (formed of a single piece of material) with body 404. For example, body 404 and spike 408 may be machined from a single piece of material (e.g., stainless steel). As shown, spike 408 is sized to extend through the central passage (e.g., 122, 322) of a fastener that the tool is configured to deliver. For example, for a fastener with a passage having a minimum internal diameter of 1 mm, the spike may have an outer diameter of 0.90 mm or 0.95 mm. Additionally, the interface between spike 408 and body 404 is configured to allow a user to push or drive the fastener into tissue (soft tissue or bone). For example, as shown in FIG. 3C, spike proximal end 432 has a transverse dimension 440 that is smaller than a transverse dimension 444 of the body distal end, such that a shoulder 448 is defined at the spike proximal end. Shoulder 448 configured to abut a head (e.g., 18, 218) of a fastener received over the spike, such as is illustrated for fastener 210.

Spike 408 has a length 452 that is greater than a length (e.g., 66, 266) of a fastener with which tool 400 is configured to be used, such that distal end 436 extends beyond the fastener distal end to allow spike distal end 436 to create a pilot hole in tissue (soft tissue or bone tissue) into which the fastener can follow. In some embodiments, spike length 452 is between 3 mm and 8 mm longer than the length (e.g., 66, 266) of a fastener intended for use with the tool, such as, for example, between any two of: 3 mm, 4 mm, 5 mm, 6 mm, 7 mm, 8 mm, and/or 9 mm (e.g., between 4 mm and 6 mm) longer than the corresponding fastener length. For example, in the depicted embodiment, tool 400 is configured to deliver bone fasteners 210 with an overall length of 11.5 mm, and spike 408 is configured to extend 5 mm beyond fastener distal end, such that spike 408 has a length 452 of 16.5 mm (e.g., between 16 mm and 17 mm). In other embodiments, such as those configured solely for delivery of soft-tissue fasteners (e.g., 10) having a length of 6, 7, and/or 8 mm, spike length 452 may be 5 mm longer than the a single intended fastener length (e.g., 11, 12, or 13 mm) for use with a single intended fastener configuration, or may be 5 mm longer than the longest intended fastener length (e.g., 13 mm) for use with any of several intended fastener lengths.

In the embodiment shown, which is configured to deliver a bone fastener, spike distal end 436 is configured as a conventional trocar tip, in which three or four planar surfaces converge at the spike distal end to form a point or chisel tip. In testing of the present fasteners, trocar tips have demonstrated particularly effective performance in forming an initial pilot hole into which the tool (via shoulder 444) can drive bone fastener 210 (e.g., without separately drilling a pilot hole prior to insertion of the spike distal end 436 and fastener 210 together). In other embodiments of tool 400, such as those configured solely for delivery of soft-tissue fasteners (e.g., 10), spike distal end 436 can be configured with a conical point.

In the depicted embodiment, handle 412 is coupled to body proximal end 420. In this configuration, handle 412 is generally symmetrical around a longitudinal axis so that use is not dependent on rotational position. Handle 412 is coupled to body 404 with sufficient rigidity to permit a user to strike (e.g., with a mallet) a proximal end 456 of handle 412 to drive a bone fastener (e.g., 210) into bone. Handle can be machined or molded from a material sufficiently rigid to receive such a strike and that is capable of sterilization, such as, for example, metals and metal alloys such as aluminum or stainless steel, or any of various polymers such as polyphenylsulfone (PPSU).

Shield assembly 416 comprises an elongated tubular shield 460 coupled in fixed relation to a hub 464. Shield 460 has a proximal end 468 coupled to hub 464 and a distal end 472 extending from hub 464. Hub 464 also defines a flange 476 configured to be engaged by a user to retract the shield assembly. More particularly, shield assembly 416 is disposed around body 404 and movable (e.g., slideable) between a retracted position (FIGS. 3A, 3B) in which shield distal end 472 is proximal to shoulder 448, and an extended position (FIG. 3E) in which shield distal end 472 extends past (distal of) spike distal end 436. In use, such as during arthroscopic surgery, the shield can be disposed in the extended position when the fastener is first passed through a cannula or port to a surgical site, such as to protect the fastener and prevent tissue from engaging or "catching" on the fastener before the fastener reaches a desired insertion position. Once the spike distal end 436 and fastener are disposed near a desired insertion position, a user can engage flange 476 to pull shield assembly 416 proximally relative to body 404 and handle 412 (e.g., from the extended position of FIG. 3A to the retracted position of FIG. 3E). A user can, simultaneously or subsequently, press or strike handle 408 in a distal direction to drive the spike distal end (436) and fastener (e.g., 210) into a desired location in soft tissue or bone tissue.

To facilitate insertion of a fastener and the ability of the shield to move relative to the body and fastener, the depicted configuration of body 404 includes a tapered section 480 at shoulder 448. Specifically, tapered section 480 tapers from a nominal transverse dimension (diameter) 484 to the relatively smaller transverse dimension (diameter) 444 at shoulder 448. In this configuration, dimension 444 is larger than the corresponding maximum transverse dimension of the fastener shaft (e.g., 130, 330) but smaller than the corresponding maximum transverse dimension of the outriggers (e.g., 134, 334), such that the outriggers are permitted a degree of flexibility in the longitudinal direction during insertion (e.g., to account for variations in underlying surfaces and facilitate full insertion of the fastener shaft and barbs). Of course, to facilitate the described movement of the shield relative to body 404 and a fastener disposed thereon, shield 460 has an inner transverse dimension (e.g., diameter) that is larger than corresponding maximum transverse dimensions of the fastener (e.g., dimension 134 or 334 of the outriggers) and of the body 404. To facilitate user visibility during use, shield 460 is transparent in at least some embodiments to enable a user to perceive the position of the fastener and spike distal end relative to the distal end of the shield. For example, shield 460 may be formed of polycarbonate or other suitably durable polymers that are capable of being sterilized and/or are transparent or sufficiently translucent to permit a user to perceive the position of a fastener within the shield.

FIGS. 4A-4D depict a second embodiment 400*a* of a tool for delivery of a fastener 10 (FIGS. 1A-1H) or fastener 210 (FIGS. 2A-2E), shown with a fastener 210 coupled to a distal end of the tool. Tool 400*a* is substantially similar to tool 400, with the primary difference being that tool 400*a* includes a handle 412*a* that is shaped to interact with an elongated shield hub 464*a*. More particularly, handle 412*a* defines an annular recess 488 facing distally and configured to receive a proximal portion 492 of hub 464*a*. In the depicted embodiment, tool 400*a* is particularly well-suited for implementations in which the tool is provided to a user with the tool pre-loaded with a corresponding fastener (e.g., 210). For example, the longitudinal overlap of hub 464*a* and handle 412*a* facilitates the inclusion of a frangible pin 496 (shown broken in FIG. 4C) that extends through the handle and into or proximal to the hub when the shield is in the extended position (FIG. 4D) to resist movement of the shield until a user applies sufficient longitudinal compressive force between the handle and the hub to break the pin, and thereby retract the shield and expose the fastener. In other embodiments, instead of the frangible pin, a detent or other structure can be used that resists inadvertent retraction of the shield but still permits a user to overcome that resistance by hand when ready to deploy the fastener. With tools in a pre-loaded state, the present kits can comprise a plurality of (e.g., three to five) bone tools (e.g., 400*a*) pre-loaded with bone fasteners (e.g., 210) and having their respective shield assemblies in an extended position, and/or a plurality of (e.g., six to eight) soft-tissue tools (e.g., 400*a*) pre-loaded with soft-tissue fasteners (e.g., 10) and having their respective shield assemblies in an extended position. Such a kit can be sterile and enclosed in a sealed package (e.g., sealed tray or a blister pack).

Figure 5D:
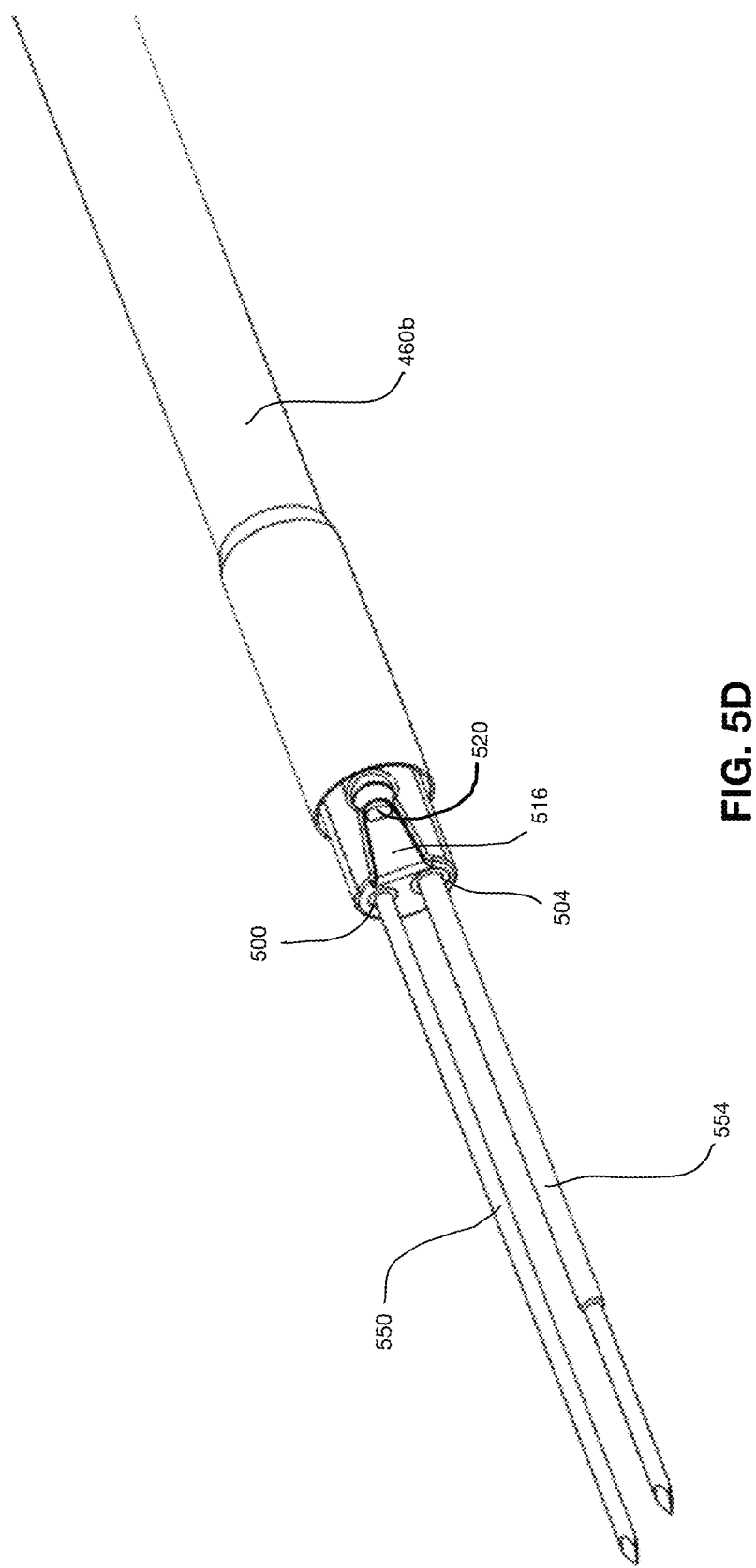
FIG. 5D depicts a perspective view of the distal end of the tool, without the cartridge but with a guidewire and a trocar.

Referring now to FIGS. 5A-5F, FIGS. 5A-5C depict a third embodiment of a tool 400*b* including a cartridge 600 for delivery of a bone fastener of FIG. 2A with a bone fastener of FIG. 2A coupled to a distal end of the cartridge; FIG. 5D depicts tool 400*b* without the cartridge but with a guidewire and a trocar; and FIGS. 5E-5G show enlarged views of the cartridge. Tool 400*b* is similar in several respects to tool 400, with the primary differences being that tool 400*b* is configured to facilitate pre-drilling or pre-formation of pilot holes in bone with a spatial reference provided by a guidewire, after which a fastener cartridge 600 can be slipped laterally over the guidewire and engaged by a distal end of the tool to align the fastener with, and insert the fastener into, the pilot hole.

More particularly, body 404*b* of tool 400*b* extends from a body proximal end 420*b* to a body distal end 424*b*. In this configuration, body 404*b* defines internally a first body passage 500 and a second body passage 504, both of which extend through and between body proximal end 420 and body distal end 424. First body passage 500 has a central, longitudinal first axis, and second body passage 504 has a central, longitudinal second axis separated from the first axis by a distance that remains constant along the body length (i.e., such that the first axis (of the first body passage) is parallel to the second axis (of the second body passage). In the embodiment shown, first body passage 500 is configured to receive a guidewire (e.g., 550), and second body passage 504 configured to receive a trocar (e.g., 554) or rod (e.g., 636). The trocar or rod may be larger than the guidewire, and therefore second body passage 504 may be larger than first body passage 500. Handle 412*b* is similar to handle 412, with the primary exception that handle 412*b* is configured to permit access to the first and second body passages 500, 504 through the body proximal end (i.e., through a portion of the handle). More particularly, in this configuration, the handle defines corresponding first and second passages 508, 512 that correspond to (and align with) ones of the first and second passages 500, 504 of the body such that first body passage 500 and first handle passage 508 cooperate to define an essentially continuous first passage between and through handle proximal side 456 and body distal end 424, and such that second body passage 504 and second handle passage 512 cooperate to define an essentially continuous second passage between and through handle proximal side 456 and body distal end 424.

In the embodiment shown, body distal end 424*b* is configured to engage a proximal end (604) of the cartridge. More particularly, an outer surface of body 404*b* defines a recess 516 that extends longitudinally inward from body distal end 424*b* and radially inward from outermost portions of the cross-sectional perimeter of the body. Recess 516 narrows at it extends proximally to facilitate rotational alignment of the cartridge relative to body 404*b*, and recess 516 further includes a radially deeper portion 520 at a proximal portion of the recess to receive a detent or portion of a projection (612) of the cartridge, as described below, to resist inadvertent longitudinal separation of the cartridge from body distal end 424.

In the depicted embodiment, cartridge 600 includes a proximal end 604 and a distal end 608. Proximal end 604 is configured to engage body distal end 424, and distal end 608 is configured to receive a bone fastener (e.g., 210). Proximal end 604 is configured to engage body distal end 424 via a projection 612 that extends longitudinally outward from a longitudinal engagement surface 616. As shown, projection 612 narrows to a proximal end 620 in a way that corresponds to that of recess 516 to ensure radial alignment of the cartridge relative to body 404 as the cartridge and tool body are pushed together. Projection 612 also includes a radial projection or detent 624 that is configured to extend into the radially deeper portion 520 to resist separation of the cartridge from body distal end 424.

Cartridge 600 defines a longitudinally extending cartridge groove 628 that extends through and between proximal end 604 and distal end 608 of the cartridge, and is open to a lateral external surface of the cartridge such that the cartridge can be laterally slipped over guidewire 550 (such that guidewire 550 is received in groove 628) while a first end of the guidewire is disposed in tissue and a second end of the guidewire extends into first body passage 500 of the tool. Additionally, cartridge 600 comprises a spike 632 coupled to and extending distally from distal end 608 of the cartridge, and a rod 636 coupled to and extending proximally from proximal end 604 of the cartridge. Spike 632 has a spike proximal end 640 coupled to the distal end 608 of the cartridge, and a spike distal end 644 extending from distal end 608 of the cartridge. As described above for spike 408 of tool 400, proximal end 640 of spike 632 has a transverse dimension that is smaller than a transverse dimension of a corresponding portion of distal end 608 of the cartridge, such that a shoulder 648 is defined at spike proximal end 640. And, as with shoulder 448 of tool 400, shoulder 648 is configured to abut a head of a fastener received over the spike (632). Rod 636 has a proximal end 652 extending from cartridge proximal end 608, as shown. In this configuration, the cartridge is configured such that when guidewire 550 is fully received in cartridge groove 628, rod 636 is coaxial with first body passage 504, and cartridge can therefore be moved toward body distal end 424 to insert rod 636 into first body passage 504 and seat cartridge projection 612 into recess 516 to engage tool body 400. Once seated in the respective structures of tool body 400, guidewire 550, rod 636, and projection 612 cooperate to resist movement of cartridge 600 relative to tool body 400. In some embodiments, such as the one shown, spike 632 and rod 636 are unitary (i.e., formed of a single piece of material, such as stainless steel); but in other embodiments may be distinct pieces of material. In some embodiments spike distal end 644 can be configured as a conventional trocar tip, in which three or four planar surfaces converge at the spike distal end to form a point or chisel tip. However, particularly when the cartridge embodiment is primarily configured for separately forming a pilot hole with a distinct trocar, spike distal end 644 can alternatively be configured with conical point.

As with spike 408 described above, spike 632 has a length that is greater than a length (e.g., 66, 266) of a fastener with which tool cartridge 600 is configured to be used, such that the distal end extends beyond the fastener distal end to allow spike distal end 644 to guide the fastener into a pilot hole in bone tissue. In some embodiments, the spike length (from shoulder 648 to spike distal end 644) is between 3 mm and 8 mm longer than the length (e.g., 66, 266) of a fastener intended for use with the tool, such as, for example, between any two of: 3 mm, 4 mm, 5 mm, 6 mm, 7 mm, 8 mm, and/or 9 mm (e.g., between 4 mm and 6 mm) longer than the corresponding fastener length. For example, in the depicted embodiment, cartridge 600 is configured to deliver bone fasteners 210 with an overall length of 11.5 mm, and spike 632 is configured to extend 5 mm beyond fastener distal end, such that spike 408 has a length 452 of 16.5 mm (e.g., between 16 mm and 17 mm).

As described above for body 404, to facilitate insertion of a fastener and the ability of the shield to move relative to the body and fastener, the depicted configuration of cartridge 600 includes a tapered section 656 at shoulder 648. Specifically, tapered section 656 tapers from a nominal transverse dimension of the cartridge to the relatively smaller transverse dimension 644 at shoulder 648. In this configuration, dimension 644 is larger than the corresponding maximum transverse dimension of the fastener shaft (e.g., 130, 330) but smaller than the corresponding maximum transverse dimension of the outriggers (e.g., 134, 334), such that the outriggers are permitted a degree of flexibility in the longitudinal direction during insertion (e.g., to account for variations in underlying surfaces and facilitate full insertion of the fastener shaft and barbs). Of course, to facilitate the described movement of the shield assembly 416b (including shield 460b and hub 464b) relative to body 404b and a fastener disposed thereon, shield 460b has an inner transverse dimension (e.g., diameter) that is larger than corresponding maximum transverse dimensions of the fastener (e.g., dimension 134 or 334 of the outriggers) and of the body 404b. To facilitate user visibility during use, shield 460b is transparent in at least some embodiments to enable a user to perceive the position of the fastener and spike distal end relative to the distal end of the shield. For example, shield 460b may be formed of polycarbonate or other suitably durable polymers that are capable of being sterilized and/or are transparent or sufficiently translucent to permit a user to perceive the position of a fastener within the shield.

In use, distal end 424b of body 404b (without cartridge 600) is disposed at a position at which a user desires to insert a bone fastener (e.g., 210). A guidewire is then inserted through first handle passage 508 and first body passage 500 into bone tissue adjacent the targeted fastener position. The tool is then rotated around the guidewire, if needed, to align the second body passage 504 with the targeted fastener position, and a trocar 554 is inserted through second handle passage 512 and second body passage 508 pushed and/or rotated into the bone tissue to form a pilot hole in the bone tissue. In some embodiments, trocar 554 has a diameter (at its distal end) that is equal to or slightly smaller than the nominal diameter of the shaft (excluding barbs) of a fastener for which a pilot hole is drilled. For example, the trocar diameter may be between 85% and 100% (e.g., between 90% and 95%) of the fastener shaft diameter. FIG. 5D shows both the guidewire and trocar extending from body distal end 424b. Next, trocar 554 is removed, and body 404b retracted sufficiently to permit cartridge 600 to be laterally positioned over guidewire 550 with rod 636 aligned with second body passage 504. Cartridge 600 and tool body 404b are then moved longitudinally together such that rod 636 is inserted into first body passage 504 and cartridge projection 612 is inserted into recess 516 to engage tool body 404b. A user can then align spike 632 with the pilot hole in the underlying bone tissue, and advance the tool and cartridge toward the bone tissue, to drive the fastener (210) into the pilot hole and seat the fastener in the bone. If desired, shield assembly 416b can be moved to the extended position before positioning the fastener at or near the pilot hole (to protect the fastener and resist unintended engagement of the fastener with tissue during such positioning), and then shield assembly 416b can be retracted before or while the fastener is driven into the pilot hole.

With cartridges in a pre-loaded state (e.g., cartridge 600 with a fastener 210 pre-loaded on spike 632), the present kits can comprise a plurality of (e.g., three to five) cartridges 600 pre-loaded with bone fasteners (e.g., 210) and a single tool 400b. Some such kits can further comprise at least one guidewire 550 and/or at least one trocar 554. Such a kit can be sterile and enclosed in a sealed package (e.g., sealed tray or a blister pack).

Referring now to FIGS. 6A-6G, a second embodiment 10a of the present soft-tissue fasteners is shown. In the depicted example, fastener 10a is configured for coupling an implant to soft tissue, such as a tendon (e.g., the supraspinatus tendon or rotator cuff). As shown, fastener 10a comprises two elongated shafts 14a, 14b, an enlarged head 18a, and a plurality of barbs 26b on each of the shafts 14a, 14b.

Each shaft 14a, 14b extends from a respective shaft proximal end 30a, 30b (and enlarged head 181) to a respective shaft distal end 34a, 34b. Shaft distal ends 34a, 34b are configured to be inserted (along with their respective barbs 26b) into soft tissue of a patient such that the barbs resist removal of the fastener from the soft tissue. For example, in at least some uses, the distal ends can first be inserted through an implant such that inserting the distal ends into soft tissue couples the implant to the soft tissue. To that end, enlarged head 18a extends between proximal ends 30a, 30b of the respective shafts to resist removal of such an implant over the proximal ends of the shafts. As shown, shaft 14b is longer than shaft 14a—i.e., length 66b of shaft 14b is larger than length 66a of shaft 14a. As a result, during insertion into soft tissue, distal end 34b of shaft 14b will enter the tissue before distal end 34a of shaft 14a, thereby reducing (relative to a similar structure with two similar shafts of the same length the cross-sectional area of fastener 10a being pushed into the tissue.

As shown, head 18a includes a head proximal side 38a, and a head distal side 42a. In this configuration, at least a portion of the head distal side is longitudinally aligned with shaft proximal ends 30a, 30b, for example as shown in FIG. 6B. In the embodiment shown, head 18a is substantially planar in that proximal side 38a is defined by a planar surface spanning a majority of a region between the shafts, and distal side 42a is defined by a planar surface spanning a majority of a region between the shafts.

As shown, each of barbs 26b extends longitudinally along a portion of a length 66a, 66b of the respective shaft. In this configuration, each barb extends linearly along the shaft, but in other embodiments, the barbs may be helical or otherwise curved or angled along the shaft. Each of the barbs has a respective distal leading edge 70b and a respective proximal trailing edge 74b that is spaced from the respective shaft proximal end 30a, 30b. For each barb, the leading edge faces distally (toward the respective shaft distal end 34a, 34b) and is disposed between the shaft distal end and the respective trailing edge. As shown, each of the leading edges is disposed at an acute angle relative to longitudinal axis 62a, 62b to facilitate insertion into tissue, and each of the trailing edges is also disposed at an acute angle relative to longitudinal axis 62a, 62b to resist removal of the fastener once inserted. In the embodiment shown, the leading edges of the barbs are disposed at a common angle relative to the respective longitudinal axis. For example, leading edges 70b of barbs 26b are disposed at an angle 78b. In some embodiments, angle 78b is between 10 and 20 degrees, for example, between any two of 10, 12.5, 15, 17.5, and/or 20 degrees (e.g., between 12.5 and 17.5 degrees). In the depicted embodiment, angle 78b is between 14.5 and 15.5 degrees. In other embodiments, the leading edge angles can be varied for different barbs, such as to manage the force required for insertion and minimize local tissue damage, while maintaining sufficient resistance to removal. For example, for a given barb length, as the angle of the leading edge increases, so does the distance the barb extends from the shaft and the resistance to removal. However, the farther the barb extends outward from the shaft, the greater the chances of tissue fibers being damaged by insertion of the fastener instead of simply permitting the barb to slip past those tissue fibers so they can be engaged by the barb's trailing edge. For example, in some embodiment, each shaft 14a, 14b can include a set of three barbs with three different leading edge angles, such as those used for fastener 10 described above.

Additionally, in the depicted embodiment, the trailing edges of the barbs on shaft 14b are staggered along the length of shaft relative to those on shaft 14a to increase the likelihood that at least some of the barbs will securely engage soft tissue. For example, when used with certain tendons (e.g., the supraspinatus tendon), the tendon may have different thicknesses in different regions or may have partial-thickness tears, such that barbs disposed at different distances from the head of the fastener make it more likely that at least one barb will encounter and engage soft tissue of sufficient integrity to resist removal of the fastener. More specifically, in the depicted embodiment, the longer second shaft 14b places trailing edges 74b on the first shaft closer to head 18a than are the barbs on first shaft 14a. As indicated in FIG. 6B, a proximal-most point or edge 82a of each barb 26b on shaft 14a is a distance 86a distal of shaft proximal end 30a, and a proximal-most point or edge 82a of each barb 26b on shaft 14b is a larger distance 90a distal of shaft proximal end 30b.

In the embodiment shown, barbs 26b on first shaft 14a are disposed at equiangular intervals around one half of that shaft, and barbs 26b on second shaft 14b are disposed at equiangular intervals around an opposing half of that shaft (i.e., such that two of the barbs on a shaft are separated by 180 degrees, and the barbs on each shaft do not extend toward the other shaft). Specifically, on shaft 14a, three barbs 26b are disposed at angular intervals of 90 degrees and on shaft 14b, three barbs 26b are disposed at angular intervals of 90 degrees. In other embodiments with a different number of barbs and equiangular intervals, the equiangular intervals will necessarily also vary (e.g., four barbs in one half of a shaft perimeter would be disposed at angular intervals of 60 degrees. In other embodiments, barbs may be disposed at different angular intervals around the shaft.

To further facilitate insertion through an implant and into soft tissue, an outer surface 98a, 98b of each shaft defines a tapered section 102a, 102b adjacent a respective one of shaft distal ends 34a, 34b. Each tapered section 102a, 102b extends from a first outer transverse dimension 106a, 106b at the respective shaft distal end (34a, 34b) and increases in size in a proximal direction to a larger outer transverse dimension 110a, 110b that may, as in the depicted embodiment, be substantially equal to an outer transverse dimension along a remainder of the length of the shaft between the tapered section and the head (18a). In the embodiment shown, each tapered section 102a, 102b is tapered linearly at a taper angle 114a relative to respective axis 62a, 62b, but in other embodiments may be tapered in a non-linear fashion (e.g., along a curved path). Angle 114b may in some embodiments be equal to angle 78b, and/or may be between 10 and 20 degrees, for example, between any two of 10, 12.5, 15, 17.5, and/or 20 degrees (e.g., between 12.5 and 17.5 degrees). For example, in the depicted embodiment, angle 114a is between 14.5 and 15.5 degrees, and is equal to angle 78b such that tapered section 102 and leading edge 70b follow a continuous, linear path.

In the embodiment shown, each shaft (14a, 14b) is also configured to receive a portion of a delivery tool (described below). In particular, an internal surface 118a, 118b of the respective shaft defines an internal passage 122a, 122b that extends through the length of the shaft along axis 62a, 62b and through both of the respective proximal and distal ends. Each passage 122a, 122b is configured to receive a portion of a tool (e.g., a spike or trocar) such that that the tool extends through passages 122a, 122b and beyond distal ends 34a, 34b to permit the tool to form a pilot hole in the tissue into which the tool (or a user of the tool) can simultaneously drive the fastener and, after the fastener is inserted into the tissue, the tool can thereafter be removed via the passages (122a, 122b). In some embodiments, each passage 122a, 122b has a first inner transverse dimension at the respective shaft proximal end (30a, 30b) and a smaller second inner transverse dimension at the respective shaft distal end (34a, 34b), such that the passage tapers (e.g., linearly) from smaller at the shaft distal end to larger as the passage approaches the shaft proximal end. For example, in the embodiment shown, each passage 122a, 122b tapers linearly at an angle 124a, 124b, each of one degree. Such a taper can be advantageous in reducing the resistance to removal of a tool after insertion of the fastener. For example, during insertion of the fastener, soft tissue will be displaced and tend to exert an inward force around the perimeter of a tool in the passage. The provision of a taper, such that a proximal portion of the passage is larger than a distal portion of the passage, typically helps mitigate the compressive forces on a tool in the passage during insertion of the fastener and thereby typically reduces resistance to removal of the tool from the passage after such insertion. In some embodiments, such as the one shown, each inner surface 118a, 118b and respective outer surface 98a, 98b meet at the respective shaft distal end 34a, 34b to form an edge 126a, 126b. Such an edge at the distal end of the shaft minimizes the cross-sectional area of fastener at the distal end to facilitate insertion of the fastener into tissue.

In the embodiment of FIGS. 6A-6F, each shaft 14a, 14b has a circular cross-sectional shape, such that an outer transverse dimension 110a, 110b is the diameter of a circle that defines the outer perimeter of that shape. In some embodiments, transverse dimensions 110a, 110b are each between any two of: 1.25 mm, 1.35 mm, 1.45 mm, 1.55 mm, 1.65 mm, 1.75 mm, 1.85 mm, 1.95 mm, and/or 2.05 mm (e.g., between 1.55 mm and 1.75 mm). For example, in the embodiment shown, diameters 110a, 110b are each between 1.6 and 1.7 mm. In other embodiments, the shaft can have other cross-sectional shapes, such as, for example, square, hexagonal, octagonal, or the like.

As described above, the barbs of the fastener extend outwardly from the shaft and therefore span a maximum transverse dimension that is larger than that of the shaft, such as, for example, a maximum transverse dimension that is between any two of: 130%, 140%, 150%, 160%, 170%, 180%, 190%, 200%, 210%, 220%, and/or 230% of the maximum transverse dimension of the shaft (e.g., between 170% and 190% of the diameter of the corresponding shaft). For example, in the embodiment shown, barbs 26b each extend radially outward to a point between 1.4 and 1.6 mm from the respective axis 62a, 62b (i.e., each of point/edge 82b is between 1.4 and 1.6 mm from the respective axis 62a, 62b).

In some embodiments, the overall length of the fastener is between 5 mm and 9 mm, such as, for example, between any two of 5 mm, 5.5 mm, 6 mm, 6.5 mm, 7 mm, 7.5 mm, 8 mm, and/or 8.5 mm (e.g., between 5.5 mm and 6.5 mm, between 6.5 mm and 7.5 mm, or between 7.5 mm and 8.5 mm). For example, in the embodiment shown, length 66b second shaft 14b is nominally 7.1 mm, and therefore between 6.5 mm and 7.5 mm, and length 66a of first shaft 14a is nominally 6.1 mm. In other embodiments, lengths 66a, 66b can be selected for a particular use. For example, when using a soft-tissue fastener with a tendon that overlies and must move relative to other anatomical structure, it is generally desirable that the distal end of the fastener not extend into the underlying anatomical structures. As an example of one type of tendon, for use with a relatively smaller person with a relatively thinner supraspinatus tendon, a fastener with maximum nominal length 66b of 6 mm may be appropriate; while, for use with a relatively larger person with a relatively thicker supraspinatus tendon, a fastener with a maximum nominal length 66b of 8 mm may be appropriate.

In at least some embodiments, the fastener (i.e., shafts 14a and 14b, head 18a, and barbs 26a) are defined by a unitary piece of material. For example, it is sometimes desirable for soft-tissue fasteners to be bioresorbable and, in such instances, the fastener can be molded of a bioresorbable polymer such as poly lactic-co-glycolic acid (PLGA) or polylactic acid (PLA or PLLA). In some uses, it is desirable for complete resorption to occur in less than 9 months (e.g., between 3 months and 9 months).

Figure 7D:
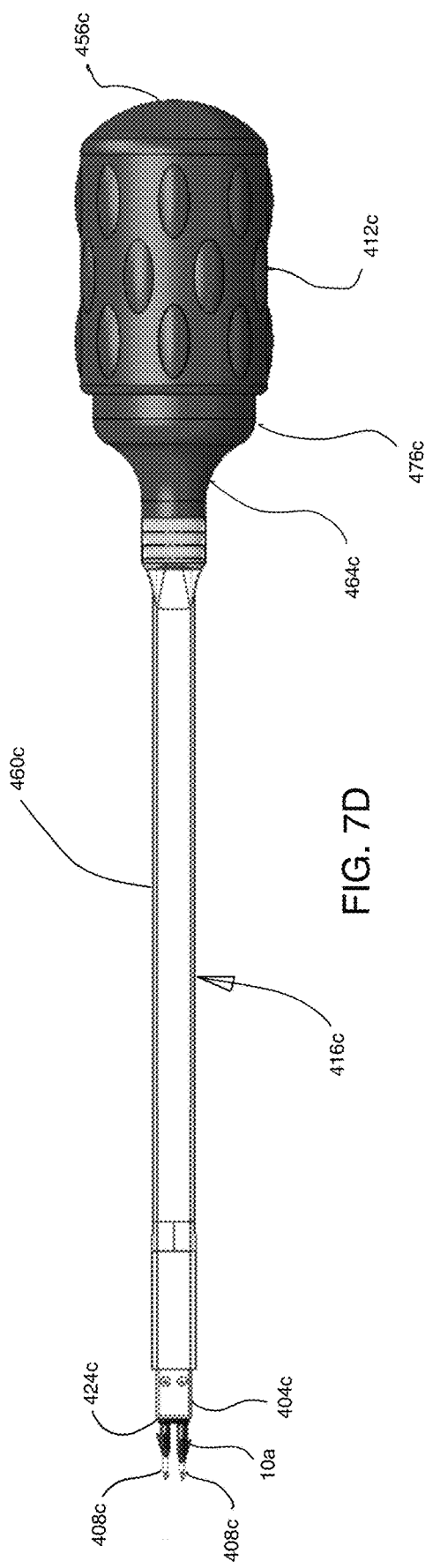
FIG. 7D depicts an additional side view of the tool of FIG. 3A.

Referring now to FIGS. 7A-7D, an embodiment of a tool 400c for delivery of a fastener 10a of FIG. 6A is shown, with a fastener 10a shown adjacent a distal end of the tool (FIGS. 7A-7C) or coupled to a distal end of the tool (FIG. 7D). Tool 400c is substantially similar to tool 400a, with the primary difference being that tool 400c comprises two spikes 408c that are spaced apart and parallel to each other to receive a fastener 10a with one of spikes 408c in each of passages 122a, 122b of respective fastener shafts 14a, 14b. Of course, to facilitate use of tool 400c to drive a fastener into soft tissue, each spike proximal end 432c has a transverse dimension 440c that is smaller than a corresponding transverse dimension 444c of the body distal end such that a shoulder 448c is defined at each spike proximal end 432c. And, as described above for shoulder 448 of tool 400a, the shoulder(s) (448c) is/are configured to abut a head of a fastener received over the pair of spikes.

As described above for tool 400a, tool 400c is also particularly well-suited for implementations in which the tool is provided to a user with the tool pre-loaded with a corresponding fastener (e.g., 10a). For example, the longitudinal overlap of hub 464a and handle 412a facilitates the inclusion of a frangible pin 496 (shown broken in FIG. 7C) that extends through the handle and into or proximal to the hub when the shield is in the extended position (in which distal end 472c of shield 460c extends beyond distal ends 436c of spikes 408c) to resist movement of the shield until a user applies sufficient longitudinal compressive force between the handle and the hub to break the pin, and thereby retract the shield and expose the fastener. In other embodiments, instead of the frangible pin, a detent or other structure can be used that resists inadvertent retraction of the shield but still permits a user to overcome that resistance by hand when ready to deploy the fastener. With tools 400c in a pre-loaded state, the present kits can comprise a plurality of (e.g., three to five) soft-tissue tools (e.g., 400c) pre-loaded with soft-tissue fasteners (e.g., 10a) and having their respective shield assemblies in an extended position, and/or a plurality of (e.g., six to eight) bone tools (e.g., 400a) pre-loaded with bone fasteners (e.g., 210a, described below) and having their respective shield assemblies in an extended position. Such a kit can be sterile and enclosed in a sealed package (e.g., sealed tray or a blister pack).

Figures 8C, 8D, 8E:
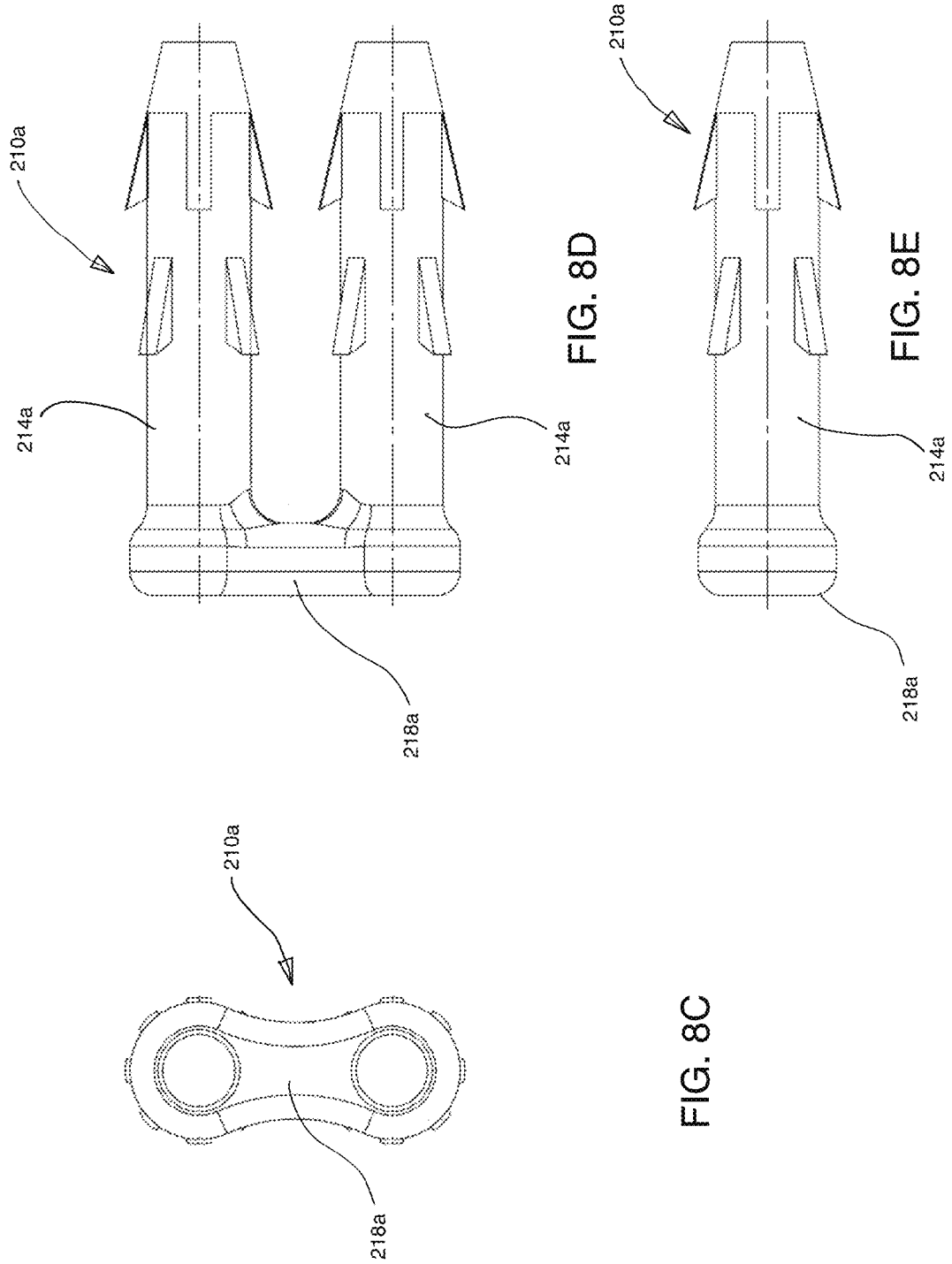
FIG. 8C depicts a proximal end view of the fastener of FIG. 8A.
FIG. 8D depicts a first side view of the fastener of FIG. 8A.
FIG. 8E depicts a second side view of the fastener of FIG. 8A.

Referring now to FIGS. 8A-8C, a second embodiment 210a of the present bone fasteners is shown. Fastener 210a is substantially similar to fastener 210 with the primary difference being that fastener 210a includes two shafts 214a and an enlarged head 218a that spans both shafts 214a, and that fastener 210a omits outriggers 22. Each of shafts 214a is substantially similar to shaft 214.

Referring now to FIGS. 9A-9G and FIGS. 10A-10K; FIGS. 9A-9G depict an embodiment of a tool 400d for delivery of a fastener 210a via a cartridge 600a, with a fastener 210a coupled to a distal end of the cartridge (FIGS. 9A, 9D-9F), and the cartridge coupled to a distal end of the tool; and FIGS. 10A-10K depict an exemplary sequence of steps for deployment of a fastener 210a via tool 400d.

Tool 400d is substantially similar to tool 400b, with the primary exception being that tool 400d includes two trocar passages aligned with handle passages 512a, 512b in addition to guidewire aligned with handle passage 508.

Cartridge 600a is substantially similar to cartridge 600, with the primary exception being that cartridge 600a includes two spikes 632, and two rods 636, and that groove 628a opens laterally in a direction that opposes projection 612 and is perpendicular to a plane passing through both of spikes 632a, 632b. As shown, spikes 632 are spaced apart and parallel to each other to receive a fastener 210a with one of spikes 632 in each of passages 322 of respective fastener shafts 214a, 214b. As described above for shoulder 648 of cartridge 600, shoulder(s) (648a) is/are configured to abut a head of a fastener received over the pair of spikes.

Figure 10A:
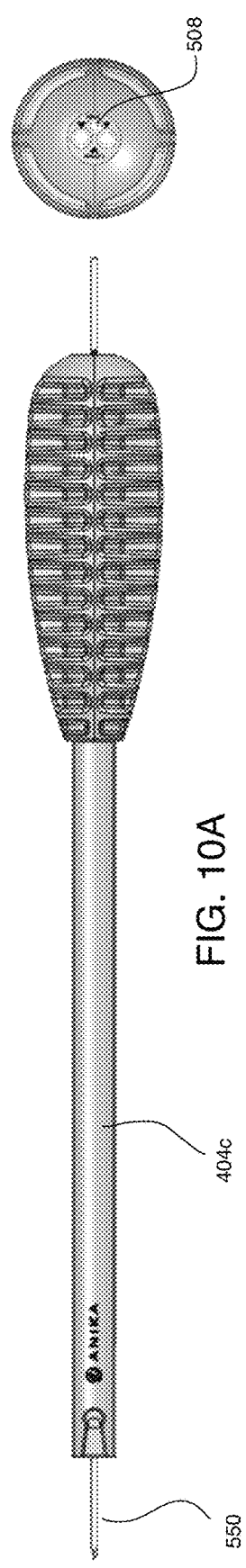
FIGS. 10A-10K depict an exemplary sequence of steps for deployment of a fastener of FIG. 8A via the tool of FIG. 9A.
Figure 10B:
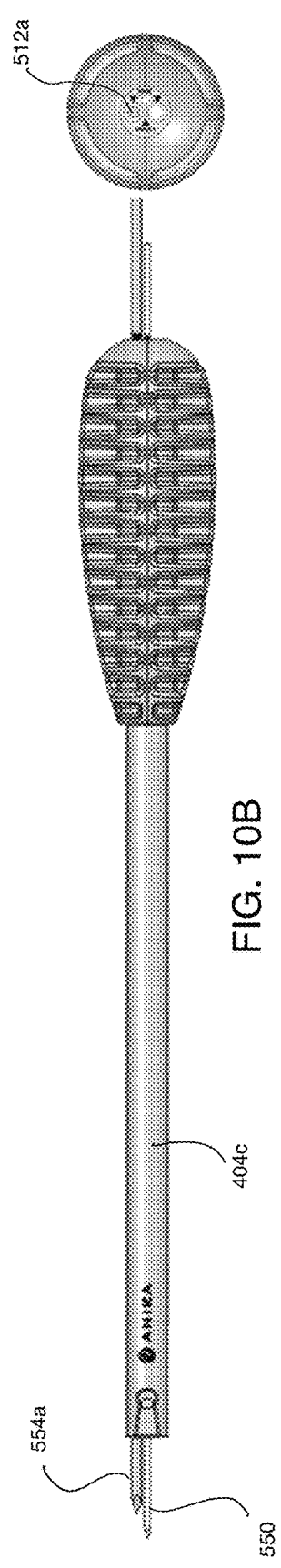
Figure 10C:
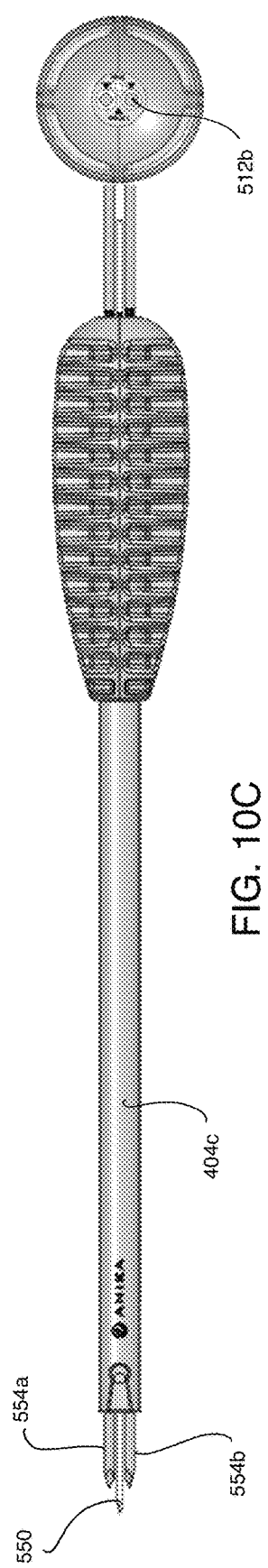
Figure 10D:
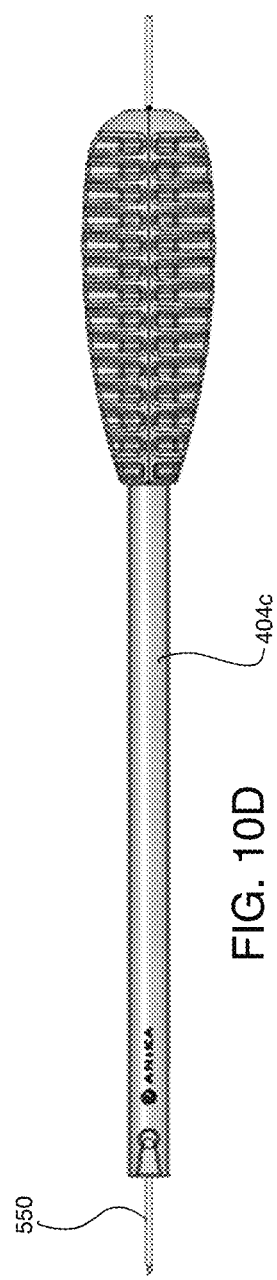
Figure 10E:
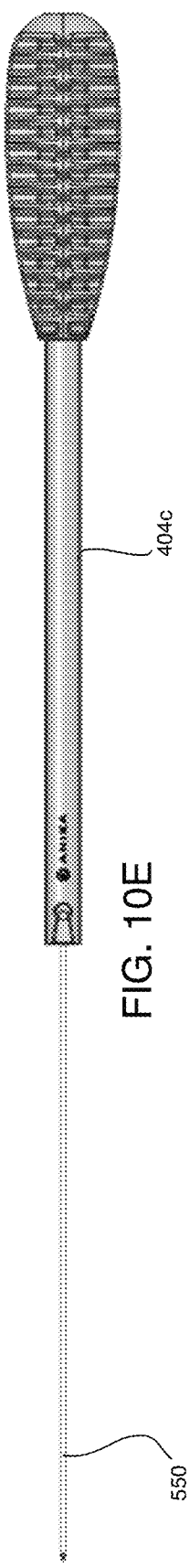
Figure 10F:
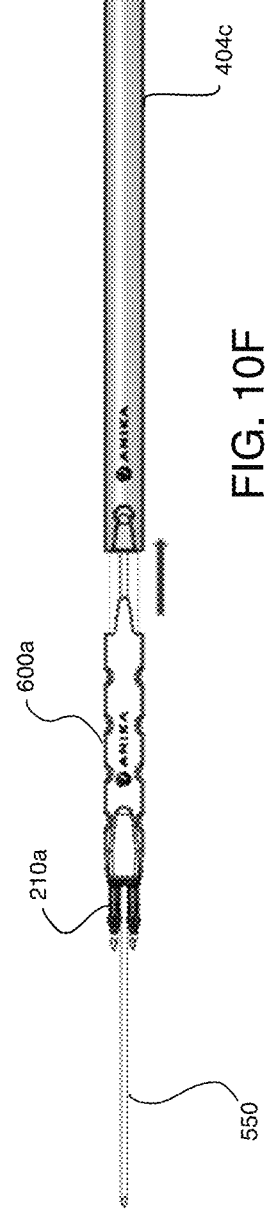
Figure 10G:
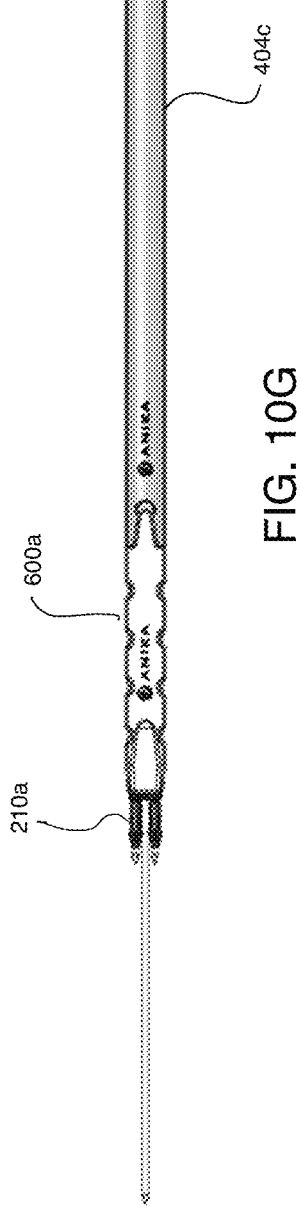
Figure 10H:
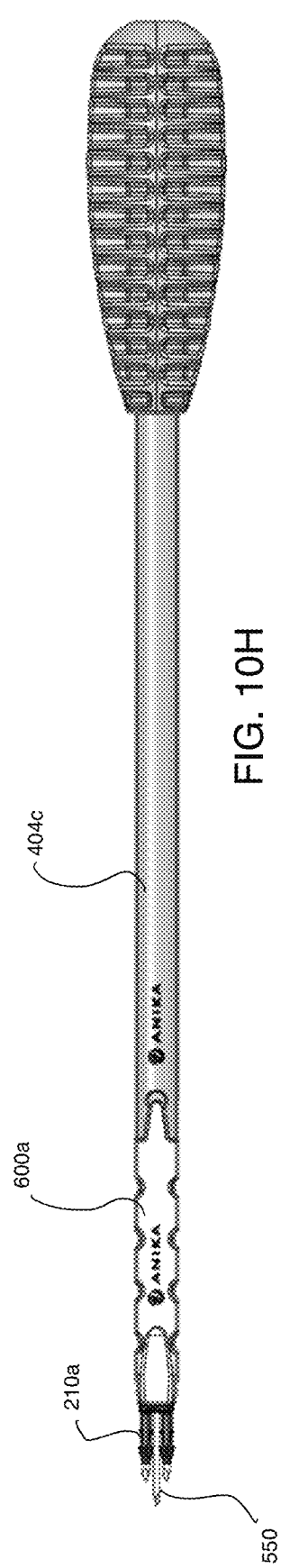
Figure 10I:
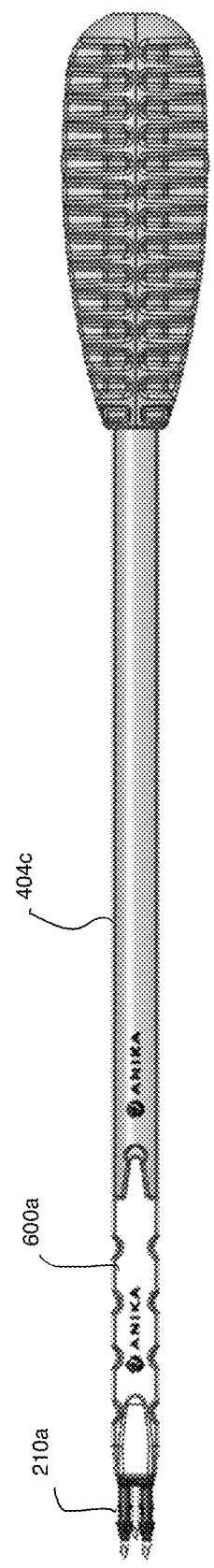
Figure 10J:
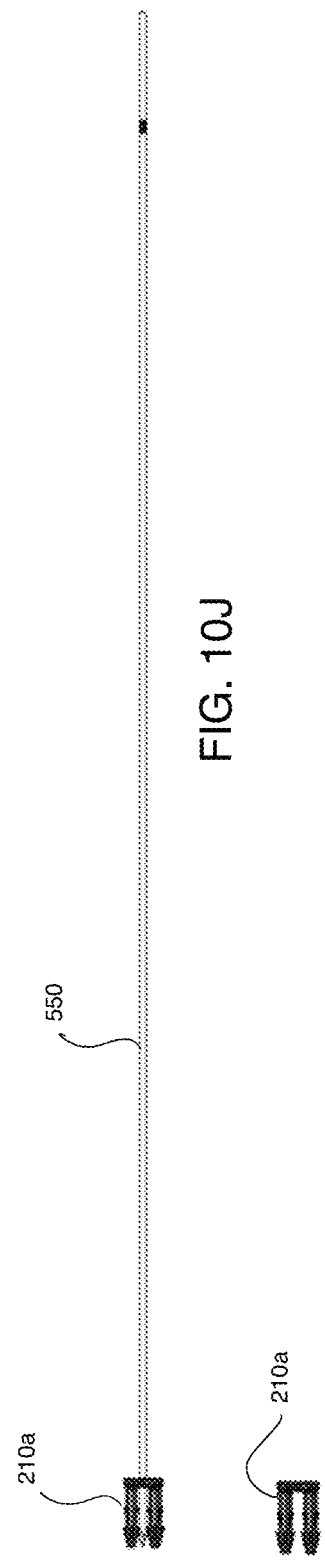
Figure 10K:
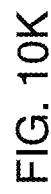

In use, distal end 424c of body 404c (without cartridge 600a) is disposed at a position at which a user desires to insert a bone fastener (e.g., 210a). A guidewire 550 is then inserted through first handle passage 508 and the corresponding guidewire passage in body 404c into bone tissue adjacent the targeted fastener position (FIG. 10A). The tool is then rotated around the guidewire, if needed, to align the trocar passages (and handle passages 512a, 512b) with the targeted fastener position, and a first trocar 554a is inserted through handle passage 512a and the corresponding passage in body 404c, and pushed and/or rotated into the bone tissue to form a first pilot hole in the bone tissue (FIG. 10B). A second trocar 554b is inserted through handle passage 512b and the corresponding passage in 404c, and pushed and/or rotated into the bone tissue to form a second pilot hole in the bone tissue (FIG. 10C). Next, trocars 554a, 554b are removed (FIG. 10D), and body 404c retracted in a proximal direction sufficiently to permit cartridge 600a to be laterally positioned over the guidewire with guidewire 550 in groove 628a with rods 636 aligned with the corresponding passages in body 404c (FIG. 10F). Cartridge 600a and tool body 404b are then moved longitudinally together such that rods 636 are inserted into the corresponding passages in body 404c and cartridge projection 612 is inserted into recess 516 to engage tool body 404c (FIG. 10G). A user can then align spikes 632 with the pilot holes in the underlying bone tissue, and advance the tool and cartridge toward the bone tissue (FIG. 10H), to drive the fastener (210) into the pilot hole and seat the fastener in the bone (FIG. 10I). If desired, shield assembly 416c (FIGS. 9A-9C) can be moved to the extended position before positioning the fastener at or near the pilot hole (to protect the fastener and resist unintended engagement of the fastener with tissue during such positioning), and then shield assembly 416c can be retracted before or while the fastener is driven into the pilot hole. The tool can then be retracted in a proximal direction to slide the tool 404c and cartridge 600a over and off of guidewire 550 (FIG. 10J), after which the guidewire can be removed, leaving fastener 210 in place (FIG. 10K).

With cartridges in a pre-loaded state (e.g., cartridge 600a with a fastener 210a pre-loaded on spikes 632), the present kits can comprise a plurality of (e.g., three to five) cartridges 600a pre-loaded with bone fasteners (e.g., 210a) and a single tool 400d. Some such kits can further comprise at least one guidewire 550 and/or at least two trocars 554. Such a kit can be sterile and enclosed in a sealed package (e.g., sealed tray or a blister pack).

Figure 11:
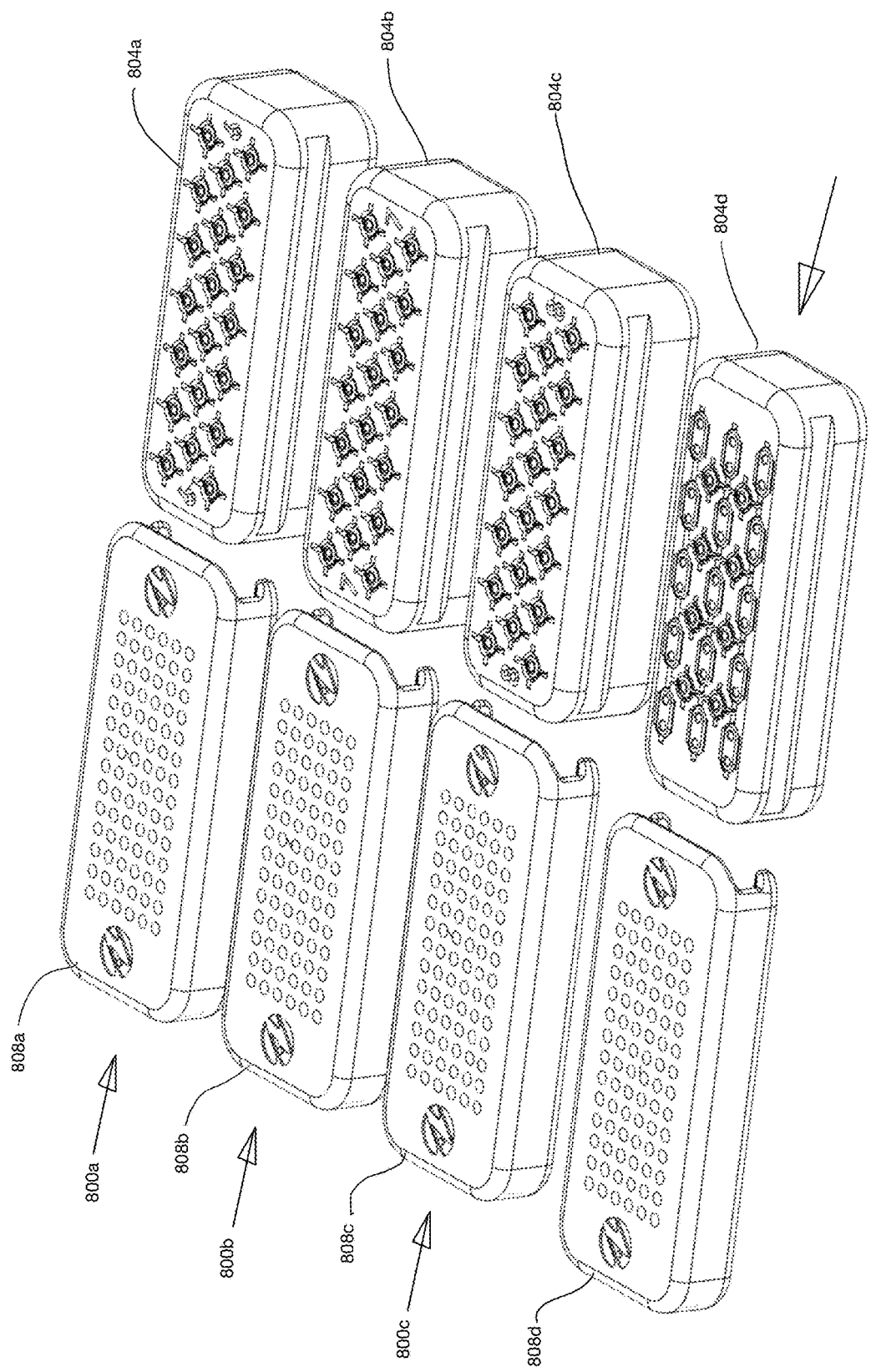
FIG. 11 depicts a perspective view of a number of examples of trays or caddies each configured to hold a plurality of the present fasteners.

Referring now to FIG. 11, several examples of trays or caddies 800a, 800b, 800c, 800d are shown, each configured to hold a plurality of the present fasteners (e.g., 10, 10a, 210, 210a). Each of the trays or caddies includes a respective base 804a, 804b, 804c, 804d configured to receive the respective plurality of fasteners, and a respective lid or cover 808a, 808b, 808c, 808d to enclose the fasteners. Each of trays/caddies 800a, 800b, 800c are configured to hold a plurality of single-shaft fasteners (e.g., 10 and/or 210), while tray/caddy 800d is configured to hold a plurality of single-shaft fasteners (e.g., 10 and/or 210) and a plurality of dual-shaft fasteners (e.g., 10a and/or 210a). As shown, the bases are configured to receive and support the fasteners with the respective fastener proximal ends (e.g., 30, 30a, 230, 230a) facing upward to facilitate loading each fastener onto a spike of a corresponding tool.

Figure 12A:
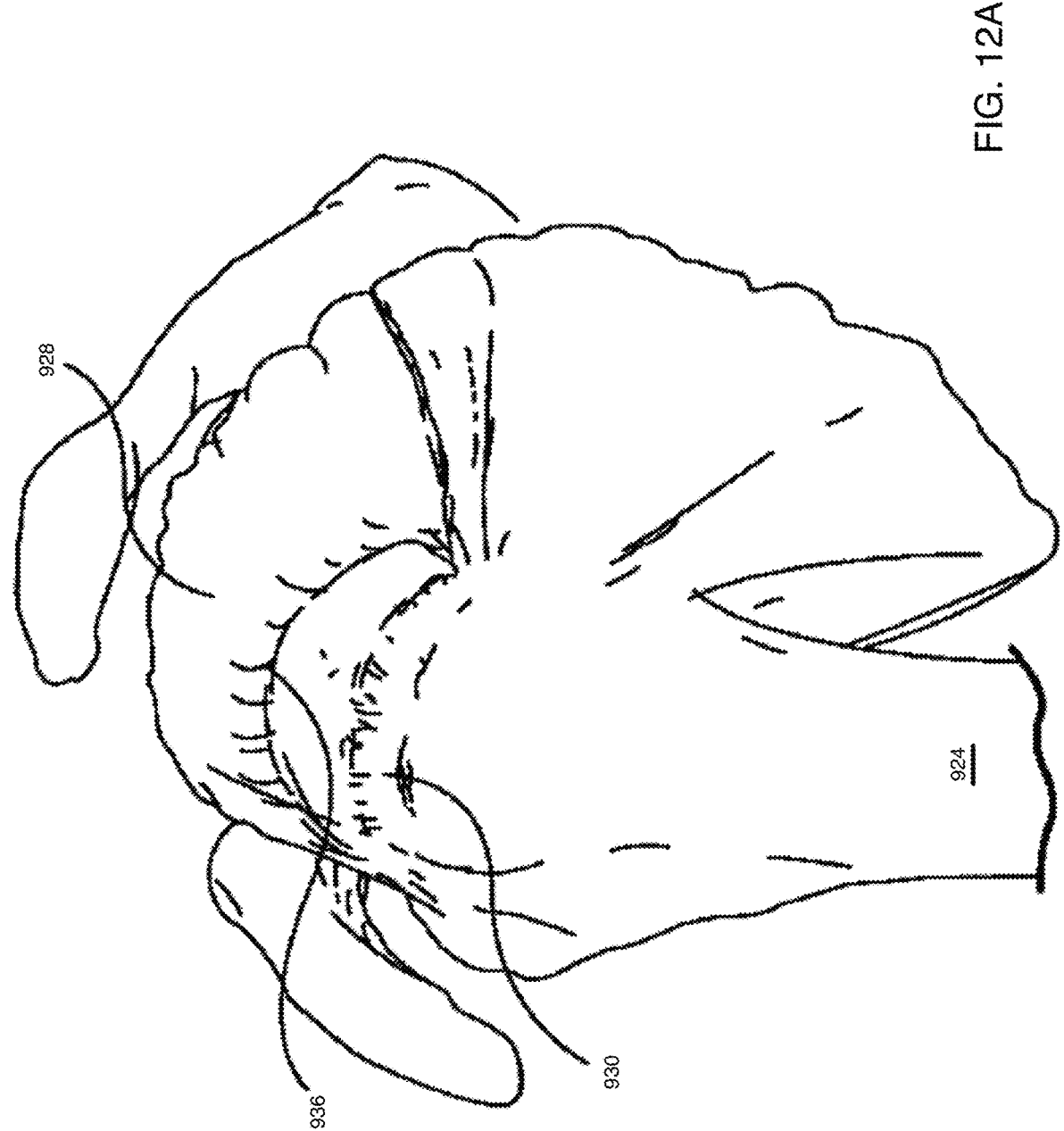
FIG. 12A depicts a perspective, cutaway view of the connection of a damaged supraspinatus tendon to the humerus in a human shoulder.
Figure 12B:
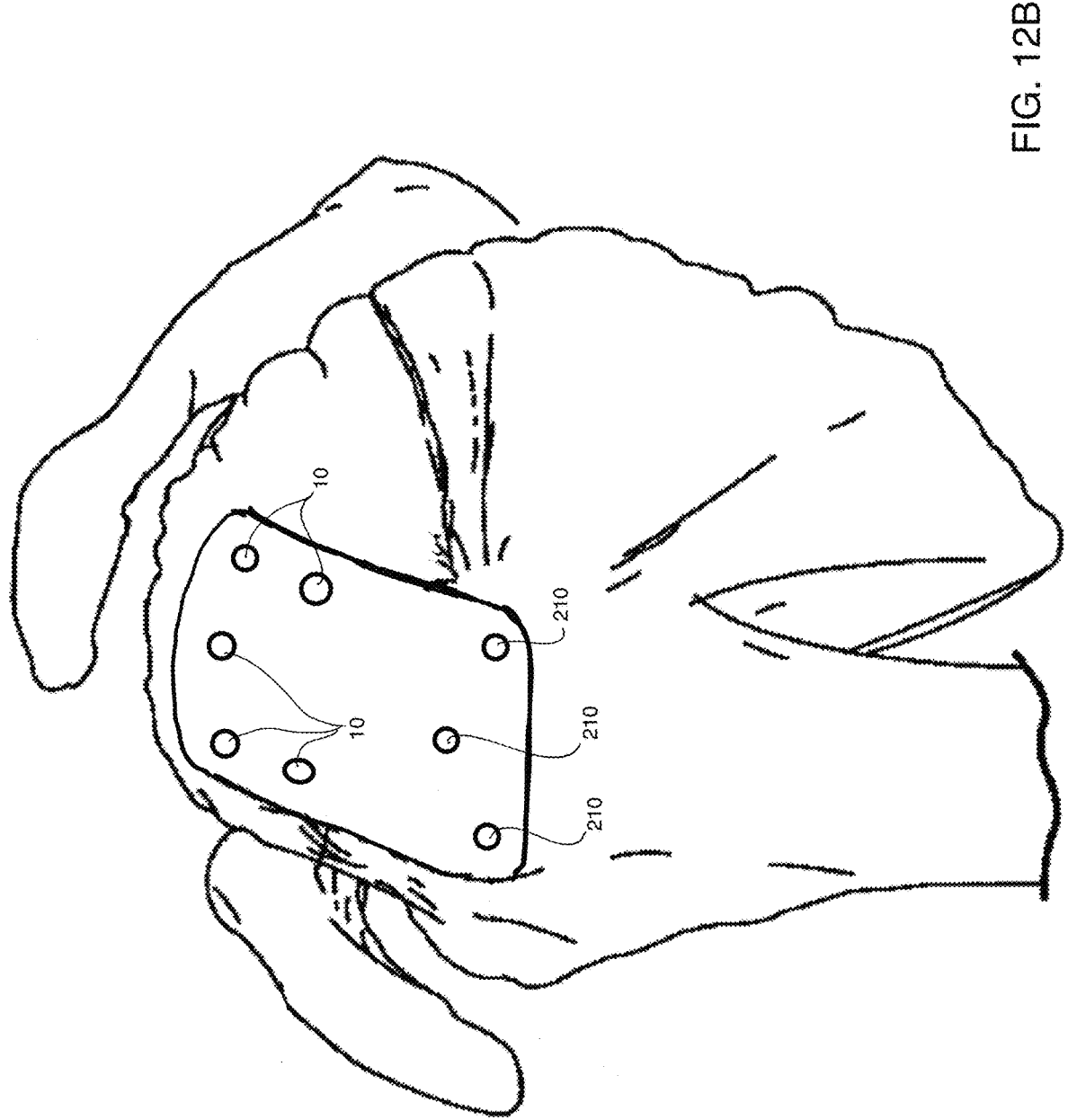
FIG. 12B depicts a perspective, cutaway view of the connection of a damaged supraspinatus tendon to the humerus in a human shoulder, showing a repair in accordance with an example of the present methods.

Referring now to FIGS. 12A and 12B, FIG. 12A depicts a perspective, cutaway view of the connection of a damaged supraspinatus tendon to the humerus in a human shoulder; and FIG. 12B depicts a perspective, cutaway view of the connection of a damaged supraspinatus tendon to the humerus in a human shoulder, showing a repair in accordance with an example of the present methods.

As shown in FIG. 12A, and described in United States Patent Application No. US 2008/0188936, the rotator cuff is the complex of four muscles that arise from the scapula and whose tendons blend in with the subjacent capsule as they attach to the tuberosities of the humerus. The subscapularis arises from the anterior aspect of the scapula and attaches over much of the lesser tuberosity. The supraspinatus muscle arises from the supraspinatus fossa of the posterior scapula, passes beneath the acromion and the acromioclavicular joint, and attaches to the superior aspect of the greater tuberosity. The infraspinatus muscle arises from the infraspinous fossa of the posterior scapula and attaches to the posterolateral aspect of the greater tuberosity. The teres minor arises from the lower lateral aspect of the scapula and attaches to the lower aspect of the greater tuberosity. Proper functioning of the rotator, 3 to 4 millimeters thick, depends on the fundamental centering and stabilizing role of the humeral head with respect to sliding action during anterior and lateral lifting and rotation movements of the arm.

In rotator cuff injuries, and shown in FIG. 12A, suprasinatus 928 frequently tears away from the humerus 924 due to high stress activity or traumatic injury. Supraspinatus 928 has separated from humerus 924 along its lateral edge 936 away from its attachment surface or "footprint" in the greater tuberosity 930.

As shown in FIG. 12B, the present methods of repairing a torn rotator cuff, and in some particular implementations, a torn supraspinatus tendon can comprise disposing an implant (e.g., a fibrous implant) 940 over a torn supraspinatus tendon 928; securing a first portion of the implant 940 to the supraspinatus tendon 928 with a plurality of soft-tissue fasteners (e.g., 10, 10a), for example using one of the present tools (e.g., 400, 400a, 400b, 400c, 400d); and securing a second portion of implant 940 to the humerus (924) with a plurality of bone fasteners (e.g., 210, 210a), for example using one of the present tools (e.g., 400, 400a, 400b, 400c, 400d). In some implementations of the present methods, the first portion of the implant 940 (e.g., an edge of the first portion of implant 940) is also sutured to the supraspinatus tendon, for example, to ensure more-continuous engagement between the implant and the tendon and thereby encourage tissue growth to and into the implant.

Figure 13B:
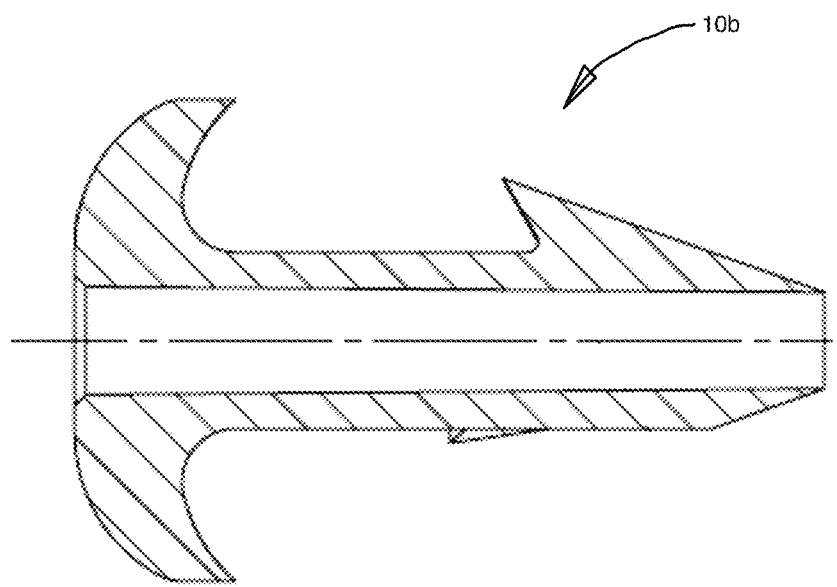
FIG. 13B depicts a side cross-sectional view of the fastener of FIG. 13A, taken along the plane B-B of FIG. 13A.
Figure 13A:
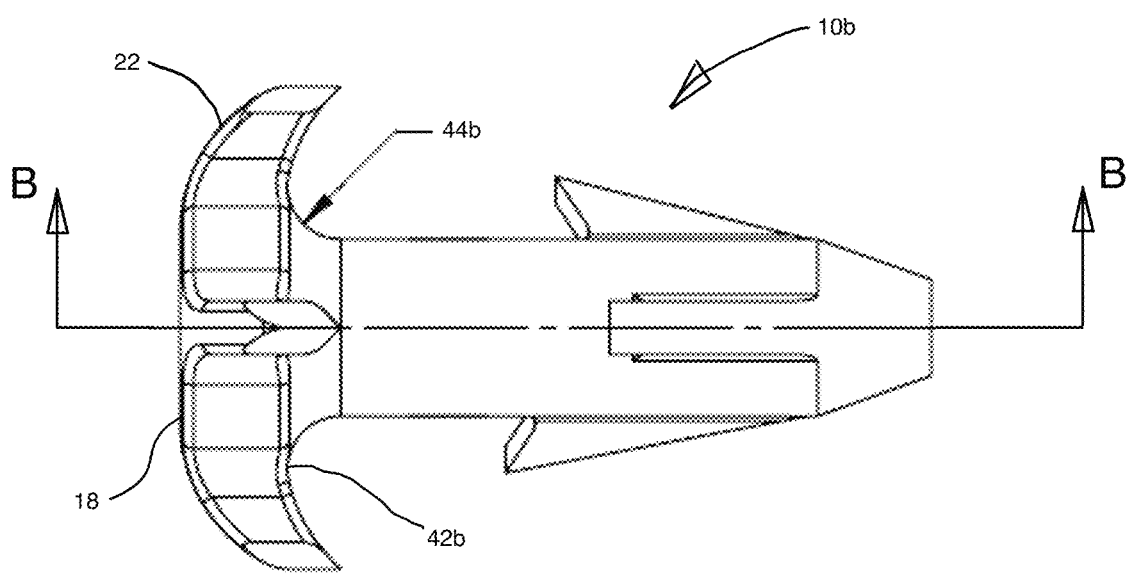
FIG. 13A depicts a side view of a third embodiment of the present soft-tissue fasteners.

Referring now to FIGS. 13A and 13B, FIG. 13A depicts a side view of a third embodiment 10b of the present soft-tissue fasteners, and FIG. 13B depicts a side cross-sectional view of fastener 10b, taken along the plane B-B of FIG. 13A. Fastener 10b is substantially similar to fastener 10 of FIGS. 1A-1H, with the primary difference being that distal side 42b of head 18b is entirely concave and forms a continuous concave surface with the distal side of outriggers 22, as shown. Specifically, in the depicted embodiment, a radius 44b forms a concave surface that meets the nominal diameter of shaft 14.

Figures 14A, 15A:
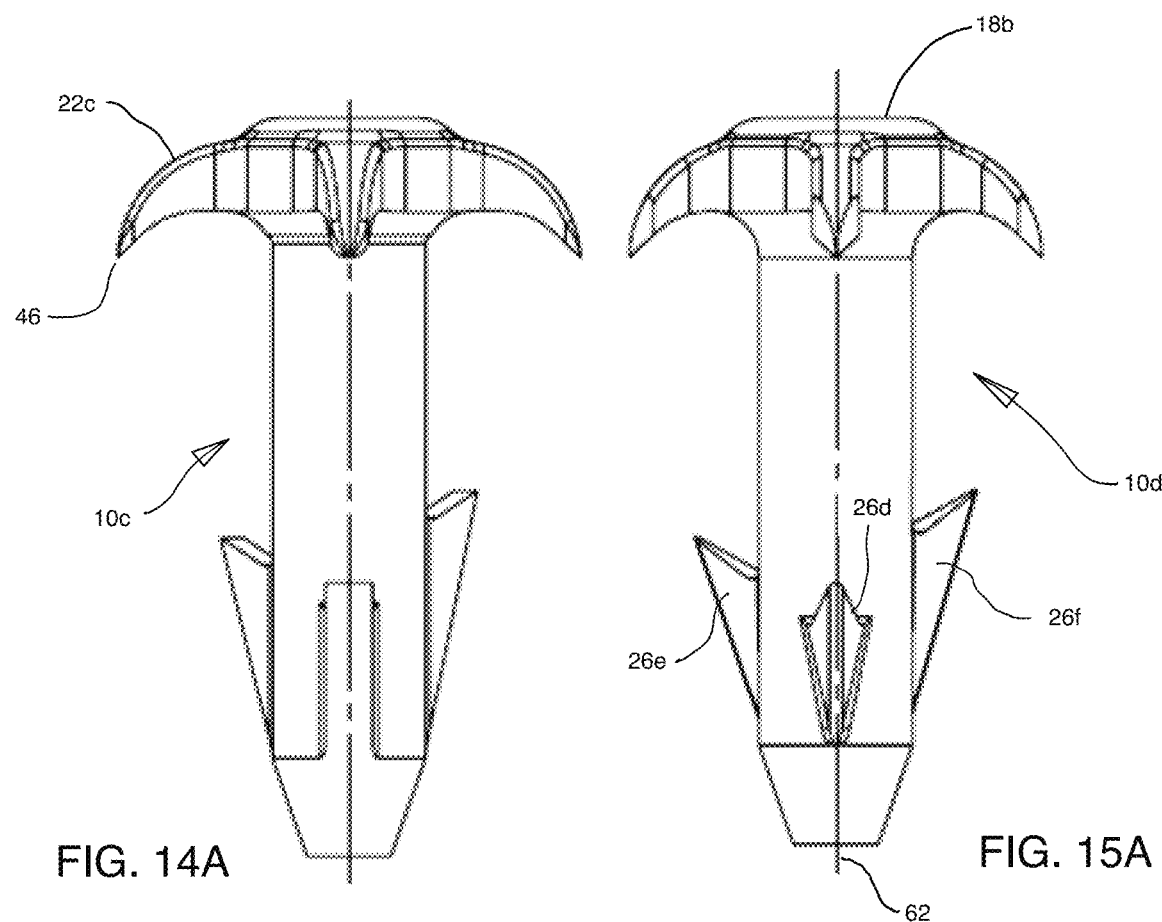
FIG. 14A depicts a side view of a fourth embodiment of the present soft-tissue fasteners.
FIG. 15A depicts a side view of a fifth embodiment of the present soft-tissue fasteners.
Figures 14B, 15B:
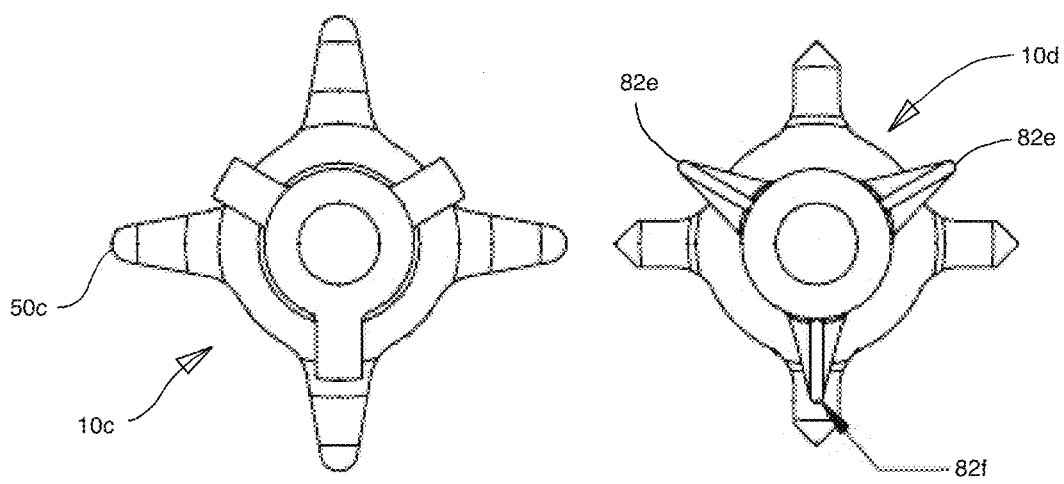
FIG. 14B depicts a distal end view of the fastener of FIG. 14A.
FIG. 15B depicts a distal end view of the fastener of FIG. 15A.

Referring now to FIGS. 14A and 14B, FIG. 14A depicts a side view of a fourth embodiment 10c of the present soft-tissue fasteners, and FIG. 14B depicts a distal end view of fastener 10c. Fastener 10c is substantially similar to fastener 10b of FIGS. 13A-13B, with the primary difference being that each outrigger 22c of fastener 10c taper to a distal end 46 that is not pointed (omits point 54) and instead curves to an edge 50c that is oriented substantially radially rather than longitudinally. In this configuration of outriggers 22c, distal ends 46c are less likely to tear or cut into an implant or underlying tissue.

Referring now to FIGS. 15A and 15B, FIG. 15A depicts a side view of a fifth embodiment 10d of the present soft-tissue fasteners, and FIG. 15B depicts a distal end view of fastener 10d. Fastener 10d is substantially similar to fastener 10b of FIGS. 13A-13B, with the primary differences being that barbs 26d, 26e, 26f are shaped differently than barbs 26a, 26b, 26c, and that barbs 26d, 26e, 26f extend farther radially outward from longitudinal axis 62 than do barbs 26a, 26b, 26c. More particularly, barbs 26d, 26e, 26f each have a substantially triangular profile. Specifically, unlike barbs 26a, 26b, 26c that are each defined by a respective pair of planar sides that are parallel to each other (see FIG. 1B), barbs 26d, 26e, 26f are each defined by a respective pair of planar sides that angle toward each other (both laterally and longitudinally, such that each barb narrows with increasing distance from axis 62 and with increasing distance from head 18) and are joined by a radius that provides a curved outer surface along the apex of the respective barb (see FIG. 15B) rather than an edge. This substantially triangular cross-sectional profile is configured to facilitate insertion of the fastener by reducing insertion force (relative to a rectangular profile with a similar radial dimension), and the absence of a sharp edge configured to reduce the likelihood that the barbs will cut a fabric like implant through which the fastener is inserted.

As described above for fastener 10, the barbs of fastener 10d extend outwardly from the shaft and therefore extend to an imaginary circle (perpendicular to axis 62) having a maximum transverse dimension that is larger than that of the shaft. For fastener 10d, however, that maximum transverse dimension is between any two of: 160%, 170%, 180%, 190%, 200%, 210%, 220%, 230%, 240%, 250%, 260%, and/or 270% of the maximum transverse dimension of the shaft (e.g., between 210% and 220% of the diameter of the shaft). For example, in the embodiment shown, barbs 26d, 26e, 26f each extend radially outward to a point between 1.7 and 1.8 mm from axis 62 (i.e., each of point/edge 82d, 82e, 82f is between 1.7 and 1.8 mm from axis 62). This increased radial dimension is configured to engage more tissue and resist removal of the fastener from tissue. While the increased radial dimension also increases the force required for insertion (relative to a similar profile with smaller radial dimension), the substantially triangular profile discussed above offsets the increase due to the larger radial extent and ultimately makes for an insertion force similar to or slightly less than that of fastener 10.

Referring now to FIGS. 16A and 16B, FIG. 16A depicts a side view of a sixth embodiment 10e of the present soft-tissue fasteners, and FIG. 16B depicts a distal end view of fastener 10e. Fastener 10e is substantially similar to fastener 10b of FIGS. 13A-13B, with the primary differences being that barbs 26g, 26h, 26i are shaped differently than barbs 26a, 26b, 26c, that barbs 26d, 26e, 26f extend farther radially outward from longitudinal axis 62 than do barbs 26a, 26b, 26c, and that the fastener includes outriggers 22c like those of fastener 10c of FIGS. 14A-14B. More particularly, barbs 26g, 26h, 26i each have a substantially triangular profile like that of barbs 26d, 26e, 26f, except barbs 26g, 26h, 26i have a larger radius at their respective apexes. As with barbs 26d, 26e, 26f, the cross-sectional profile of barbs 26g, 26h, 26i is configured to facilitate insertion of the fastener by reducing insertion force relative to a rectangular profile with a similar radial dimension, and the absence of a sharp edge configured to reduce the likelihood that the barbs will cut a fabric like implant through which the fastener is inserted.

As described above for fastener 10, the barbs of fastener 10e extend outwardly from the shaft and therefore extend to an imaginary circle (perpendicular to axis 62) having a maximum transverse dimension that is larger than that of the shaft. For fastener 10e, however, that maximum transverse dimension is between any two of: 140%, 150%, 160%, 170%, 180%, 190%, 200%, 210%, 220%, 230%, and/or 240% of the maximum transverse dimension of the shaft (e.g., between 180% and 190% of the diameter of the shaft). For example, in the embodiment shown, barbs 26dg, 26h, 26i each extend radially outward to a point between 1.5 and 1.6 mm from axis 62 (i.e., each of point/edge 82g, 82h, 82i is between 1.5 and 1.6 mm from axis 62). This increased radial dimension is configured to engage more tissue and resist removal of the fastener from tissue. While the increased radial dimension also increases the force required for insertion (relative to a similar profile with smaller radial dimension), the profile discussed above offsets the increase due to the larger radial extent and ultimately makes for an insertion force similar to or slightly less than that of fastener 10.

Referring now to FIGS. 17A-17B, FIG. 17A depicts a side view of a seventh embodiment 10f of the present soft-tissue fasteners, FIG. 17B depicts a distal end view of fastener 10f, and FIG. 19C depicts a side cross-sectional view of fastener 10f, taken along the plane C-C of FIG. 17A. Fastener 10f is substantially similar to fastener 10d of FIGS. 15A-15B, with the primary difference being that fastener 10f includes hollowed portions 138 extending into shaft 14f at the base of each barb 26d, 26e, 26f. More particularly, each hollowed portion 138 is defined by a planar surface extending from a proximal end 142 that is a first distance (equal to diameter 130) from axis 62, and a distal end 146 that is a second distance 150 from axis 62, with second distance 146 being less than diameter 130 such that the planar surface tapers toward axis 62 with increasing distance from head 18b. In this configuration, the radial distance of the proximal side of each barb available to engage tissue is increased without increasing the maximum radial extent of the barb. In other embodiments surface 138 may be non-planar (e.g., curved). In the embodiment shown, distal end 146 of each hollowed portion is joined to the proximal side of the respective barb via a curve or radius.

Figures 18A, 19A:
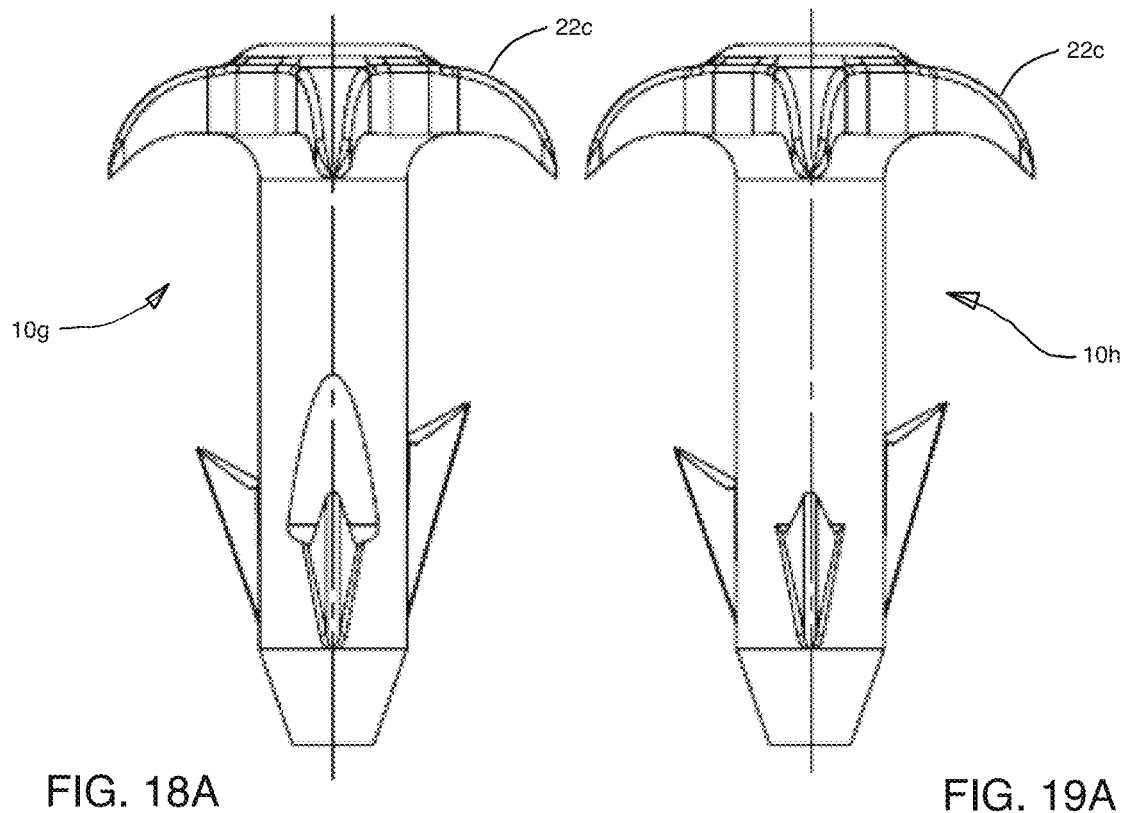
FIG. 18A depicts a side view of an eighth embodiment of the present soft-tissue fasteners.
FIG. 19A depicts a side view of a ninth embodiment of the present soft-tissue fasteners.
Figures 18B, 19B:
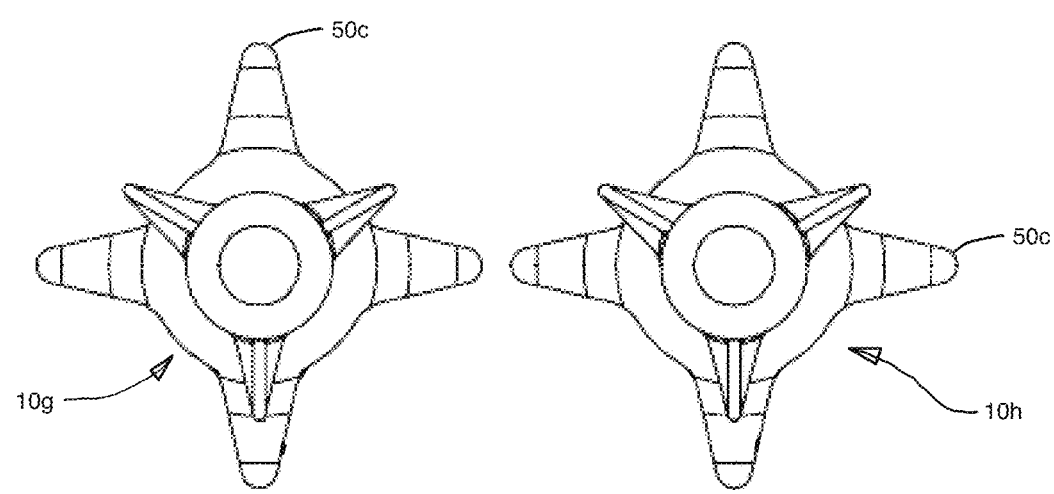
FIG. 18B depicts a distal end view of the fastener of FIG. 18A.
FIG. 19B depicts a distal end view of the fastener of FIG. 19A.

Referring now to FIGS. 18A and 18B, FIG. 18A depicts a side view of an eighth embodiment 10g of the present soft-tissue fasteners, and FIG. 18B depicts a distal end view of fastener 10g. Fastener 10g is substantially similar to fastener 10f of FIGS. 17A-17C, with the primary differences being that fastener 10g includes outriggers 22c that like those of fastener 10c of FIGS. 14A-14B.

Referring now to FIGS. 19A and 19B, FIG. 19A depicts a side view of a ninth embodiment 10h of the present soft-tissue fasteners, and FIG. 19B depicts a distal end view of fastener 10h. Fastener 10h is substantially similar to fastener 10d of FIGS. 15A-15B, with the primary differences being that fastener 10h includes outriggers 22c that like those of fastener 10c of FIGS. 14A-14B.

Figure 20:
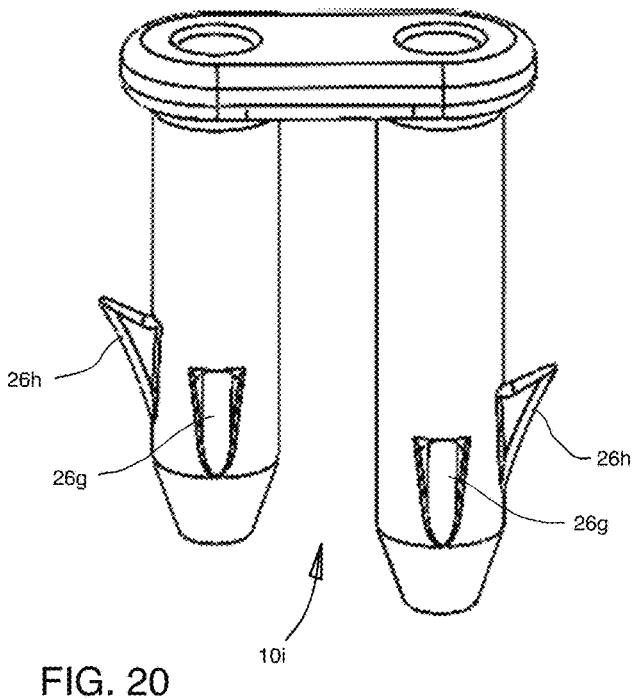
FIG. 20 depicts a side view of a tenth embodiment of the present soft-tissue fasteners.

Referring now to FIG. 20, shown therein is a tenth embodiment 10*i* of the present soft-tissue fasteners. Fastener 10*i* is substantially similar to 10*a* of FIGS. 6A-6F, with the primary difference being that each of shafts 14*a*, 14*b* includes barbs 26*g*, 26*h*, 26*i* (not shown but 180° opposite barb 26*g*) like those of fastener 10*e* of FIGS. 16A-16B, instead of three barbs 26*b*.

Figures 21, 22:
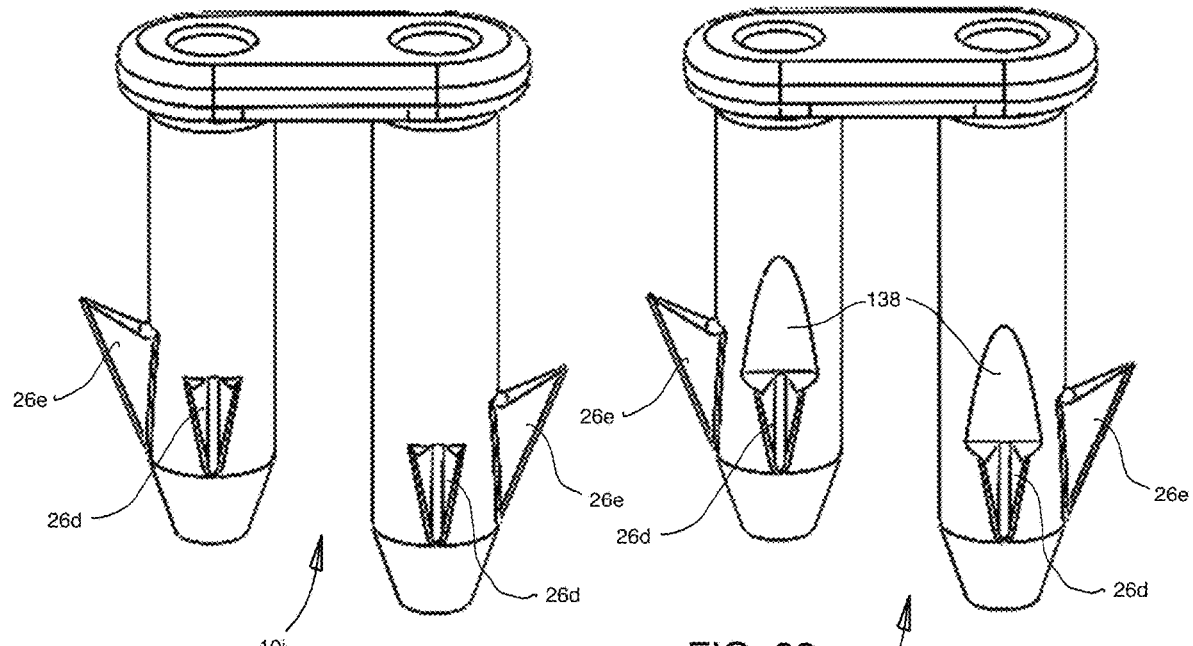
FIG. 21 depicts a side view of an eleventh embodiment of the present soft-tissue fasteners.
FIG. 22 depicts a side view of a twelfth embodiment of the present soft-tissue fasteners.

Referring now to FIG. 21, shown therein is an eleventh embodiment 10*j* of the present soft-tissue fasteners. Fastener 10*j* is substantially similar to 10*a* of FIGS. 6A-6F, with the primary difference being that each of shafts 14*a*, 14*b* includes barbs 26*d*, 26*e*, 26*f* (not shown but 180° opposite barb 26*d*) like those of fastener 10*d* of FIGS. 15A-15B), instead of three barbs 26*b*.

Referring now to FIG. 22, shown therein is a twelfth embodiment 10*k* of the present soft-tissue fasteners. Fastener 10*k* is substantially similar to 10*a* of FIGS. 6A-6F, with the primary difference being that each of shafts 14*a*, 14*b* includes barbs 26*d*, 26*e*, 26*f* (not shown but 180° opposite barb 26*d*) like those of fastener 10*d* of FIGS. 15A-15B, and hollowed portions 138 like those of fastener 10*f* of FIGS. 17A-17C corresponding to barbs 26*d*, instead of three barbs 26*b*. In other embodiments, fastener 10*k* can include hollowed portions 138 for each of barbs 26*e* and/or 26*f* (additional or alternative to the depicted hollowed portions for each of barbs 26*d*).

Referring now to FIGS. 23A-23C, FIGS. 23A, 23B, and 23C depict perspective, end, and plan views, respectively, of a flexible, fibrous, fabric-like implant 940 for use with the present fasteners. In the embodiment shown, implant 940 has a first end edge 944, a second end edge 948, and a pair of lateral edges 952*a*, 952*b* that extend between the first and second end edges. As shown, implant 940 is substantially planar when in a flattened state in which the first end edge is separated from the second end edge under a first tension of 5 Newtons (N) applied perpendicular to each of the end edges, and in which the lateral edges are separated from each other under a tension of 5 N applied perpendicular to each of the lateral edges. In this embodiment, implant 940 comprises a woven layer 956 and a nonwoven layer 960 coupled to the woven layer. More particularly, in the embodiment shown, nonwoven layer 960 is stitched to the woven layer 956 with a (mono- or multi-filament) thread 964 along a peripheral path 968 that is offset inward from the peripheral edges (944, 948, 952*a*, 952*b*) of the implant, as well as internal cross paths 968*a*, 968*b*, 968*c*, 968*d* that are offset further inwardly of each of the peripheral edges of the implant. In the depicted embodiment, both of layers 956 and 960 comprise a biocompatible polymer.

Figure 24:
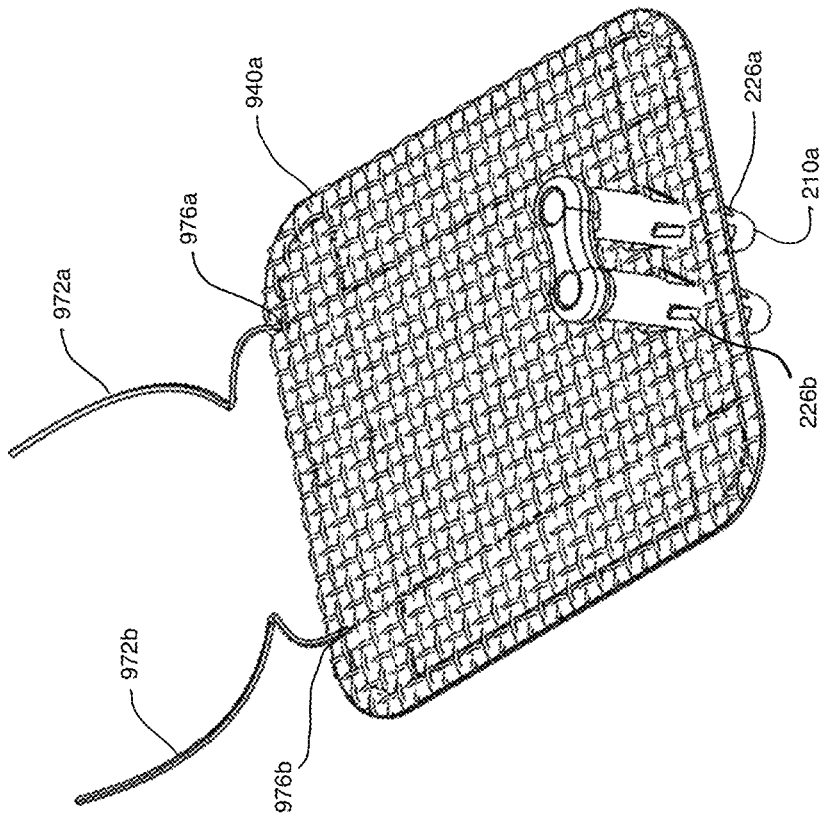
FIG. 24 depicts one of the present implants in combination with a fastener of FIGS. 8A-8E.

Referring now to FIG. 24, an implant 940*a* is shown in combination (e.g., preloaded) with a fastener 210*a* of FIGS. 8A-8E. Implant 940*a* is substantially similar to implant 940, with the exception that implant 940*a* further comprises at least one suture leg coupled to the implant at a point that is closer to the second end edge than to the first end edge, the suture leg having a free portion that is configured to extend beyond the second end edge. For example, in the embodiment shown, implant 940 comprises: a first suture leg 972*a* coupled to the implant at a first point 976*a* that is closer to second end edge 948 than to first end edge 944, with first point 976*a* also being closer to first lateral edge 952*a* than to second lateral edge 952*b*; and a second suture leg 972*b* coupled to the implant at a second point 976*b* that is closer to second end edge 948 than to first end edge 944, with second point 976*b* also being closer to the second lateral edge 952*b* of the lateral edges than to first lateral edge 952*a*. As shown, first suture leg 972*a* has a first free portion 980*a* that is configured to extend beyond second end edge 948, and second suture leg 972*b* has a second free portion 980*b* that is configured to extend beyond second end edge 948. In the embodiment shown, shaft 214*a* of fastener 210*a* extends through implant 940 such that the trailing edge of each of barbs 226*b* are disposed on a first side of the implant, and at least a portion of the leading edges of each of barbs 226*a* are disposed on a second side of the implant. In other embodiments, all or a portion (e.g., the leading edges) of barbs 226*b* may also be disposed on the second side of the implant. In the embodiment shown, each suture leg 972*a*, 972*b* comprises a single strand extending from the implant and may, for example, be unitary with thread 964. In other embodiments, each suture leg can comprise a loop of thread that passes through or is otherwise secured to the implant at the respective first or second point 976*a*, 976*b* such that each free portion 980*a*, 980*b* is defined by the remaining portion of the respective loop.

Figure 25:
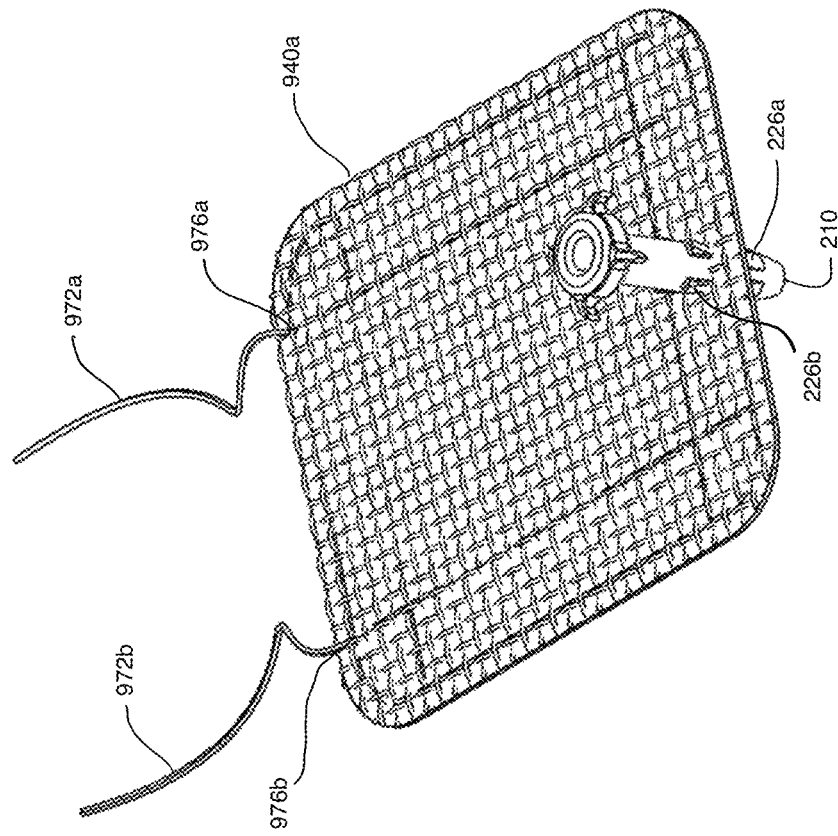
FIG. 25 depicts one of the present implants in combination with a fastener of FIGS. 2A-2E.

Referring now to FIG. 25, an implant 940*a* is shown in combination (e.g., preloaded) with a fastener 210 of FIGS. 2A-2E. As with the embodiment of FIG. 24, in the embodiment of FIG. 25, shaft 214 of fastener 210 extends through implant 940 such that the trailing edge of each of barbs 226*b* are disposed on a first side of the implant, and at least a portion of the leading edges of each of barbs 226*a* are disposed on a second side of the implant. In other embodiments, all or a portion (e.g., the leading edges) of barbs 226*b* may also be disposed on the second side of the implant.

Figure 26A:
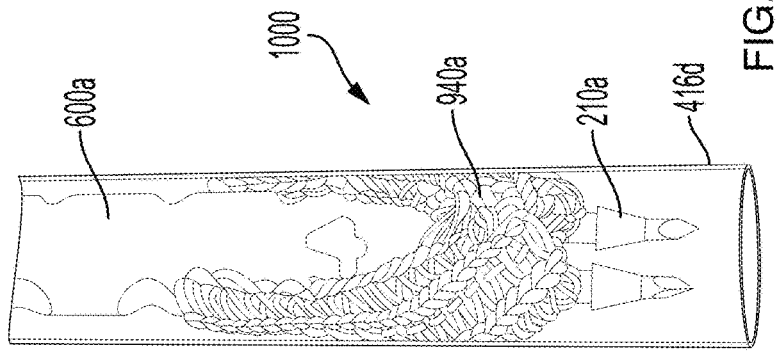
FIGS. 26A and 26B depict first and second side views of one of the present assemblies with the fastener and implant of FIG. 24 preloaded onto a cartridge of FIGS. 9D-9G with a shield around the implant and cartridge.
Figure 26B:
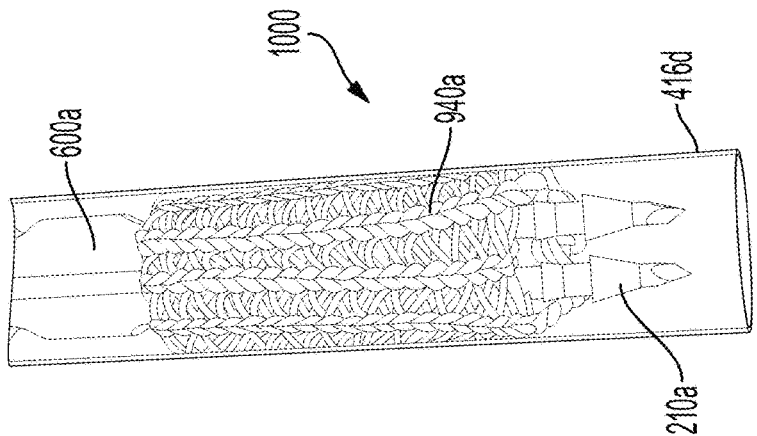

Referring now to FIGS. 26A and 26B, FIGS. 26A and 26B depict first and second side views of one of the present assemblies 1000 with fastener 210*a* and implant 940*a* of FIG. 24 preloaded onto a cartridge 600*a* of FIGS. 9D-9G with a shield 416*d* around the implant and cartridge. Shield 416*d* is substantially similar to shield 416*c* with the primary exception that shield 416*d* does not include a hub (464*a*). In the embodiment shown, fastener 210 is disposed through point 976*a* that is closer to first end edge 944 than to second end edge 948, and the implant extends proximally (toward the proximal end of cartridge 600*a*) such that second end edge 948 is closer to the proximal end of the cartridge 600*a* with a first portion of the implant wrapped around a corresponding portion of the cartridge. As shown, the first portion of the implant is disposed between the cartridge and shield 416*d* such that the shield contains the implant around the cartridge. In the embodiment shown, shield 416*d* is transparent to permit a user to view the implant and fastener during use, for example, to facilitate placement and insertion of the fastener (and implant) to and at a desired position (e.g., at a portion of the humerus when used for repair of a rotator cuff tear). In other embodiments, the shield may be translucent or opaque. In the depicted configuration, the shield is in an extended state in which a distal end of the shield extends distally beyond the distal end of the fastener shafts and the corresponding spikes of the cartridge, for example, to prevent the spikes from snagging or catching on tissue before the fastener is disposed at a desired insertion/fastening point.

Figure 27:
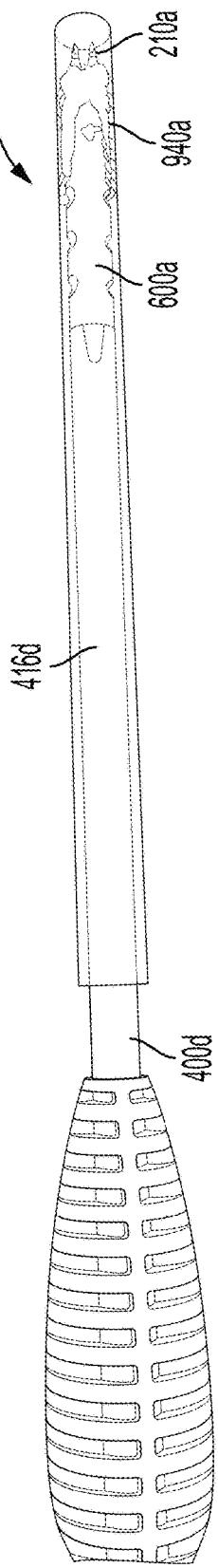
FIG. 27 depicts the assembly of FIGS. 26A and 26B coupled to an apparatus of FIGS. 9A-9C.

Referring now to FIG. 27 depicts assembly 1000 of FIGS. 26A and 26B coupled to an apparatus or tool 400*d* of FIGS. 9A-9C. While assembly 1000 is shown with fastener 210*a* and cartridge 600*a*, any of the present fasteners can be preloaded with an implant in similar fashion with a shield retaining the implant around a corresponding cartridge or tool. For example, fastener 210*a* can be preloaded with an implant as shown in FIG. 24 and the fastener and implant can be coupled to and around an apparatus 400*c* of FIGS. 7A-7D. By way of further example, a fastener 210 can be preloaded with an implant as shown in FIG. 25 and the fastener and implant can be coupled to and around cartridge 600 or an apparatus 400 or 400a with a corresponding shield retaining the implant around the cartridge or apparatus. Additionally, while shown with bone fasteners 210 and 210a, other embodiments of the present assemblies can include soft-tissue fasteners (e.g., 10, 10a-10k) and a corresponding cartridge or apparatus/tool.

Figure 28C:
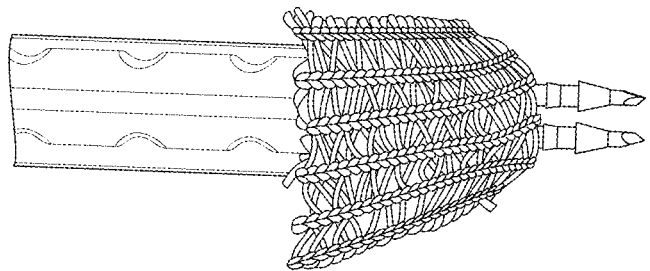
FIG. 28A-28C depicts the deployment of a fastener from the assembly of FIGS. 26A and 26B, with the fastener not inserted into tissue for illustrative purposes.
Figure 28B:
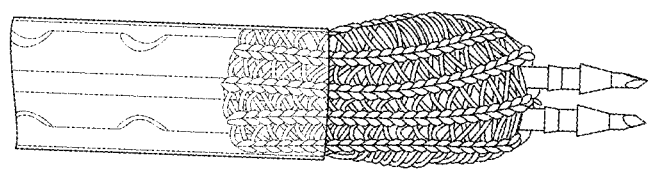
Figure 28A:
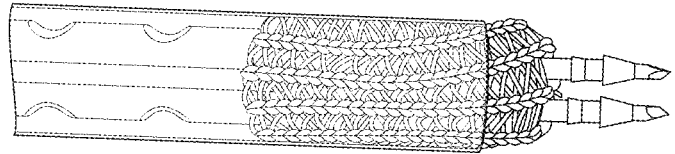
Figure 29C:
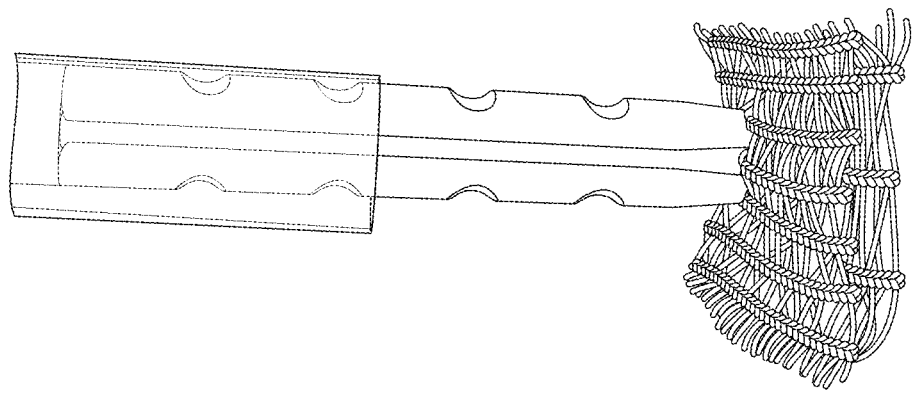
FIG. 29A-29C depicts the deployment of a fastener from the assembly of FIGS. 26A and 26B.
Figure 29B:
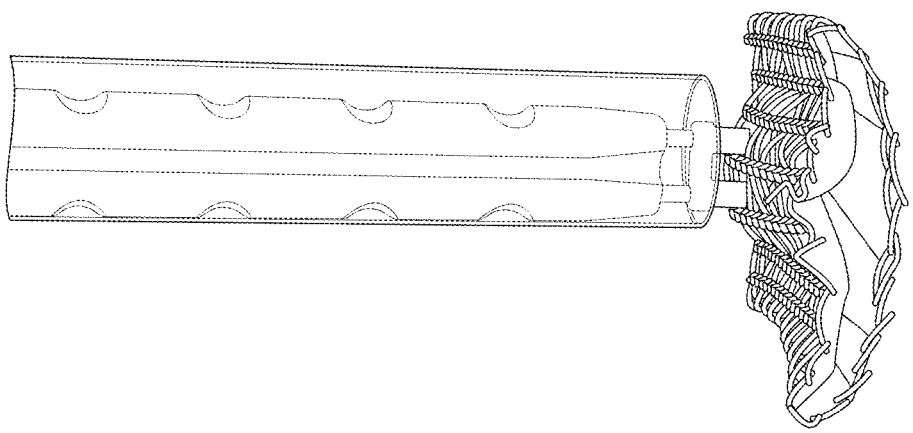
Figure 29A:
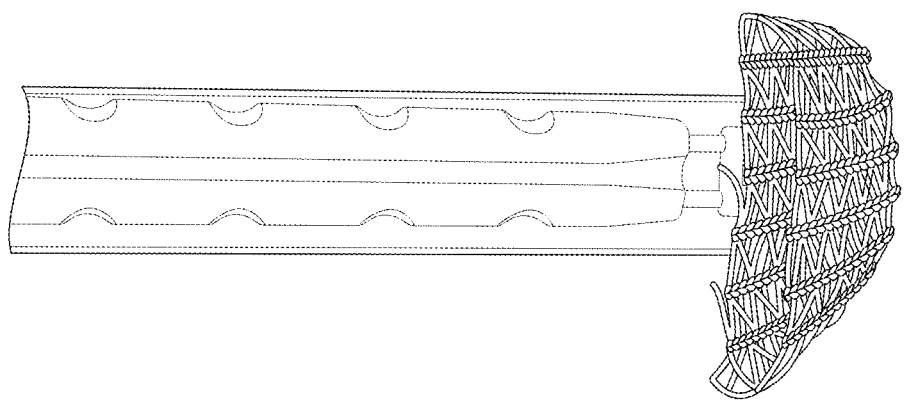

Referring now to FIGS. 28A-28C and 29A-29C, FIG. 28A-28C depicts the deployment of a fastener from the assembly of FIGS. 26A and 26B, with the fastener not inserted into tissue for illustrative purposes, and FIG. 29A-29C depicts the deployment of a fastener from the assembly of FIGS. 26A and 26B. In use, the assembly is disposed at a position in which the shafts of the fastener are to be inserted into a first portion of tissue (e.g., bone) of a patient; the shield (e.g., 416d) is retracted (as illustrated by the progression of FIGS. 28A-28C or of FIGS. 29A-29C) to a position that permits the second end edge of the implant to exit the shield (as shown in FIGS. 28C and 29C); the implant is spread along a second portion of tissue (e.g., soft tissue) of the patient (e.g., as shown in FIG. 24). The implant is coupled to the first portion of tissue via fastener 210 (either before or after retraction of the shield and/or spreading of the implant), and the implant is coupled to the second portion of tissue via the suture legs and/or via one or more soft tissue fasteners (e.g., 10, 10a-10k). Once fastener 210 is inserted into the first portion of tissue, the cartridge is decoupled from the fastener such that the spikes of the cartridge are removed from the internal passages of the shafts of the fastener. By way of example, when used to repair a rotator cuff tear (as illustrated in FIG. 12B), fastener 210 is inserted into a portion of the humerus to secure the implant to the humerus, and the suture legs and/or one or more soft-tissue fasteners secure the implant to the supraspinatus tendon.

The above specification and examples provide a complete description of the structure and use of exemplary embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the present devices are not intended to be limited to the particular forms disclosed. Rather, they include all modifications and alternatives falling within the scope of the claims, and embodiments other than the one shown may include some or all of the features of the depicted embodiment. For example, components may be combined as a unitary structure, and/or connections may be substituted. Further, where appropriate, aspects of any of the examples described above may be combined with aspects of any of the other examples described to form further examples having comparable or different properties and addressing the same or different problems. Similarly, it will be understood that the benefits and advantages described above may relate to one embodiment or may relate to several embodiments.

The claims are not intended to include, and should not be interpreted to include, means-plus- or step-plus-function limitations, unless such a limitation is explicitly recited in a given claim using the phrase(s) "means for" or "step for," respectively.

The invention claimed is:

1. An assembly for delivery of a fastener, the assembly comprising:
   a fastener cartridge having a body with a proximal end, and a distal end, the proximal end configured to be removably coupled to a distal end of an apparatus to deliver a fastener coupled to the cartridge, the cartridge comprising:
      a spike having a spike proximal end coupled to the distal end of the cartridge, and a spike distal end extending from the distal end of the cartridge, the spike proximal end having a transverse dimension that is smaller than a transverse dimension of the distal end of the cartridge such that a shoulder is defined at the spike proximal end, the shoulder configured to abut a head of a fastener received over the spike;
   a fastener received over the spike, the fastener comprising:
      an elongated shaft having a shaft length extending from a shaft proximal end to a shaft distal end, and defining an internal passage extending along the shaft length;
      an enlarged head coupled to the proximal end of the shaft and abutting the shoulder of the cartridge;
      a plurality of outriggers extending from the enlarged head in a direction away from the internal passage; and
      a plurality of first barbs each extending along a portion of the shaft length, each first barb having a leading edge and trailing edge spaced from the proximal end of the shaft, the leading edge of each first barb being disposed between the trailing edge of that first barb and the distal end of the shaft; and
      where the shaft, head, outriggers, and first and second barbs are defined by a unitary piece of polymer; and
   a flexible, fibrous implant having a first end edge, a second end edge, and a pair of lateral edges extending between the first and second end edges, where the implant is substantially planar when in a flattened state in which the first end edge is separated from the second end edge under a first tension of 5 Newtons (N) applied perpendicular to each of the end edges, and in which the lateral edges are separated from each other under a tension of 5 N applied perpendicular to each of the lateral edges;
   an elongated, tubular shield disposed over the implant, at least a portion of the fastener, and at least a portion of the cartridge;
   where the shaft extends through the implant at a point that is closer to the first end edge than to the second end edge, a first portion of the implant extends proximally around at least a portion of the cartridge, and the first portion of the implant is disposed between the cartridge and the shield.

2. The assembly of claim 1, where the fastener further comprises:
   a plurality of second barbs that are unitary with the shaft, each of the second barbs extending along a portion of the shaft length, each of the second barbs having a leading edge and a trailing edge disposed between the head and the trailing edges of the first barbs, the leading edge of each second barb being disposed between the trailing edge of that second barb and the distal end of the shaft.

3. The assembly of claim 1, where the implant comprises a woven layer and a nonwoven layer coupled to the woven layer.

4. The assembly of claim 1, where the implant further comprises at least one suture leg coupled to the implant at a point that is closer to the second end edge than to the first end edge, the suture leg having a free portion that is configured to extend beyond the second end edge.

5. The assembly of claim 4, where the implant comprises:
a first suture leg coupled to the implant at a first point that is closer to the second edge than to the first end edge, the first point being closer to a first one of the lateral edges than to a second one of the lateral edges, the first suture leg having a first free portion that is configured to extend beyond the second end edge; and
a second suture leg coupled to the implant at a second point that is closer to the second edge than to the first end edge, the second point being closer to the second one of the lateral edges than to the first one of the lateral edges, the second suture leg having a second free portion that is configured to extend beyond the second end edge.

6. An assembly for delivery of a fastener, the assembly comprising:
a fastener cartridge having a body with a proximal end, and a distal end, the proximal end configured to be removably coupled to a distal end of an apparatus to deliver a fastener coupled to the cartridge, the cartridge comprising:
a pair of spikes each having a spike proximal end coupled to the distal end of the cartridge, and a spike distal end extending from the distal end of the cartridge, the spike proximal end having a transverse dimension that is smaller than a corresponding transverse dimension of the distal end of the cartridge body such that a shoulder is defined at the spike proximal end, the shoulder configured to abut a head of a fastener received over the spikes;
a fastener received over the spikes, the fastener comprising:
a first elongated shaft having a first shaft length extending from a first shaft proximal end to a first shaft distal end, and defining an internal first passage extending along the first shaft length;
a second elongated shaft having a second shaft length extending from a second shaft proximal end to a second shaft distal end, and defining an internal second passage extending along the second shaft length;
an enlarged head coupled to the proximal ends of the first shaft and the second shaft, the had abutting the shoulder of the cartridge;
a plurality of first barbs each extending along a portion of the first shaft length, each first barb having a leading edge and trailing edge spaced from the proximal end of the first shaft, the leading edge of each first barb being disposed between the trailing edge of that first barb and the first shaft distal end;
a plurality of second barbs each extending along a portion of the second shaft length, each second barb having a leading edge and trailing edge spaced from the proximal end of the second shaft, the leading edge of each second barb being disposed between the trailing edge of that second barb and the second shaft distal end; and
where the shafts, head, and barbs are defined by a unitary piece of polymer,
a flexible, fibrous implant having a first end edge, a second end edge, and a pair of lateral edges extending between the first and second end edges, where the implant is substantially planar when in a flattened state in which the first end edge is separated from the second end edge under a first tension of 5 Newtons (N) applied perpendicular to each of the end edges, and in which the lateral edges are separated from each other under a tension of 5 N applied perpendicular to each of the lateral edges;
an elongated, tubular shield disposed over the implant, at least a portion of the fastener, and at least a portion of the cartridge;
where the at least one of the first and second shafts of the fastener extends through the implant at a point that is closer to the first end edge than to the second end edge, a first portion of the implant extends proximally around at least a portion of the cartridge, and the first portion of the implant is disposed between the cartridge and the shield.

7. The assembly of claim 6, where each of the first and second shafts of the fastener extends through the implant at a point that is closer to the first end edge than to the second end edge, a first portion of the implant extends proximally around at least a portion of the cartridge, and the first portion of the implant is disposed between the cartridge and the shield.

8. The assembly of claim 6, where the fastener further comprises:
a plurality of third barbs each extending along a portion of the first shaft length, each of the third barbs having a leading edge and a trailing edge disposed between the head and the trailing edges of the first barbs, the leading edge of each third barb being disposed between the trailing edge of that third barb and the first shaft distal end; and
a plurality of fourth barbs each extending along a portion of the second shaft length, each of the fourth barbs having a leading edge and a trailing edge disposed between the head and the trailing edges of the second barbs, the leading edge of each fourth barb being disposed between the trailing edge of that fourth barb and the second shaft distal end.

9. The assembly of claim 6, where the implant comprises a woven layer.

10. The assembly of claim 9, where the implant further comprises a nonwoven layer coupled to the woven layer.

11. The assembly of claim 10, where the nonwoven layer is stitched to the woven layer.

12. The assembly of claim 6, where the implant further comprises at least one suture leg coupled to the implant at a point that is closer to the second end edge than to the first end edge, the suture leg having a free portion that is configured to extend beyond the second end edge.

13. The assembly of claim 12, where the implant comprises:
a first suture leg coupled to the implant at a first point that is closer to the second edge than to the first end edge, the first point being closer to a first one of the lateral edges than to a second one of the lateral edges, the first suture leg having a first free portion that is configured to extend beyond the second end edge; and
a second suture leg coupled to the implant at a second point that is closer to the second edge than to the first end edge, the second point being closer to the second one of the lateral edges than to the first one of the lateral edges, the second suture leg having a second free portion that is configured to extend beyond the second end edge.

14. The assembly of any claim 6, where the polymer of the fastener is not bioresorbable.

15. The assembly of claim 6, where at least one of the third barbs of the fastener is not radially aligned with any of the first barbs; and at least one of the fourth barbs of the fastener is not radially aligned with any of the second barbs.

16. The assembly of claim 6, where at least a portion of the leading edge of at least one of the first barbs of the fastener is disposed at first barb angle relative to the central, longitudinal axis of the first shaft; and at least a portion of the leading edge of at least one of the third barbs of the fastener is disposed at a second barb angle relative to the central, longitudinal axis of the first shaft.

17. The assembly of claim 6, where an outer surface of the first shaft of the fastener defines a tapered section having an first outer transverse dimension at the first shaft distal end and tapering toward the first shaft proximal end to a second outer transverse dimension that is larger than the first outer transverse dimension; and the tapered section of the first shaft of the fastener tapers at a first taper angle relative to a central, longitudinal axis of the first shaft, and the first taper angle is substantially equal to the first barb angle.

18. The assembly of claim 17, where the inner surface and outer surface of the first shaft of the fastener define an edge at the first shaft distal end.

19. A method utilizing an assembly of claim 6 and an apparatus having a distal end coupled to a proximal end of the fastener body, the method comprising:
   inserting the shafts of the fastener into a first portion of tissue of a patient;
   retracting the shield to a position that permits the second end edge of the implant to exit the shield;
   spreading the implant along a second portion of tissue of the patient;
   coupling the implant to the second portion of tissue;
   decoupling the cartridge from the fastener such that the spikes of the cartridge are removed from the internal passages of the shafts of the fastener.

20. The method of claim 19, where the implant comprises a first suture leg coupled to the implant at a first point that is closer to the second edge than to the first end edge, the first point being closer to a first one of the lateral edges than to a second one of the lateral edges, the first suture leg having a first free portion that is configured to extend beyond the second end edge; and
   where spreading the implant comprises pulling the first suture leg laterally away from the fastener.

* * * * *